(12) United States Patent
Takahashi

(10) Patent No.: US 6,985,245 B1
(45) Date of Patent: Jan. 10, 2006

(54) IMAGE PROCESSING APPARATUS AND SYSTEM AND CONTROL METHOD THEREFOR, IMAGE DATA PROCESSING METHOD, IMAGE FORMING APPARATUS AND CONTROL METHOD THEREFOR, CONTROLLER THEREFOR, AND STORAGE MEDIUM STORING THE CONTROL METHOD FOR PROCESSING IMAGE DATA HAVING DIFFERENT PRINTING ATTRIBUTES

(75) Inventor: Hiroyuki Takahashi, Yokohama (JP)

(73) Assignee: Canon Kabushiki Kaisha, (JP)

( * ) Notice: Subject to any disclaimer, the term of this patent is extended or adjusted under 35 U.S.C. 154(b) by 894 days.

(21) Appl. No.: 09/705,055

(22) Filed: Nov. 2, 2000

(30) Foreign Application Priority Data

Nov. 2, 1999 (JP) ................................. 11-312961

(51) Int. Cl.
 *G06F 15/00* (2006.01)
 *G06K 1/00* (2006.01)
(52) U.S. Cl. ...................... 358/1.15; 359/1.9; 359/1.11
(58) Field of Classification Search ...... 358/1.13–1.18, 358/1.1, 1.41, 1.11, 1.9, 1.6, 407, 468; 400/61, 400/70, 76; 382/303–304; 710/8, 14, 62
See application file for complete search history.

(56) References Cited

U.S. PATENT DOCUMENTS

| 6,348,971 B2 * | 2/2002 | Owa et al. ................ 358/1.15 |
| 2002/0101604 A1 * | 8/2002 | Mima et al. .............. 358/1.15 |

FOREIGN PATENT DOCUMENTS

| EP | 0917 042 A2 | 5/1999 |
| EP | 0917 045 A2 | 5/1999 |

* cited by examiner

*Primary Examiner*—Gabriel Garcia
*Assistant Examiner*—Thierry L. Pham
(74) *Attorney, Agent, or Firm*—Rossi, Kimms & McDowell, LLP

(57) ABSTRACT

An image processing system having a plurality of image forming apparatuses and a method thereof separate a group of image data to be printed into a plurality of groups and transmitting the groups to the plurality of image forming apparatuses. A first image process is executed on the image data to be transmitted, and depending on printing attributes of the image forming apparatuses to which the image data are to be transmitted, a second process, which can be the same as or different from the first process, is executed. Further, the image data having the first attribute are formed on sheets from a first feeding unit while sheets from another feeding unit are inserted into the sheets with the first attribute at pages corresponding to image data of the group of image data having the second attribute.

21 Claims, 36 Drawing Sheets

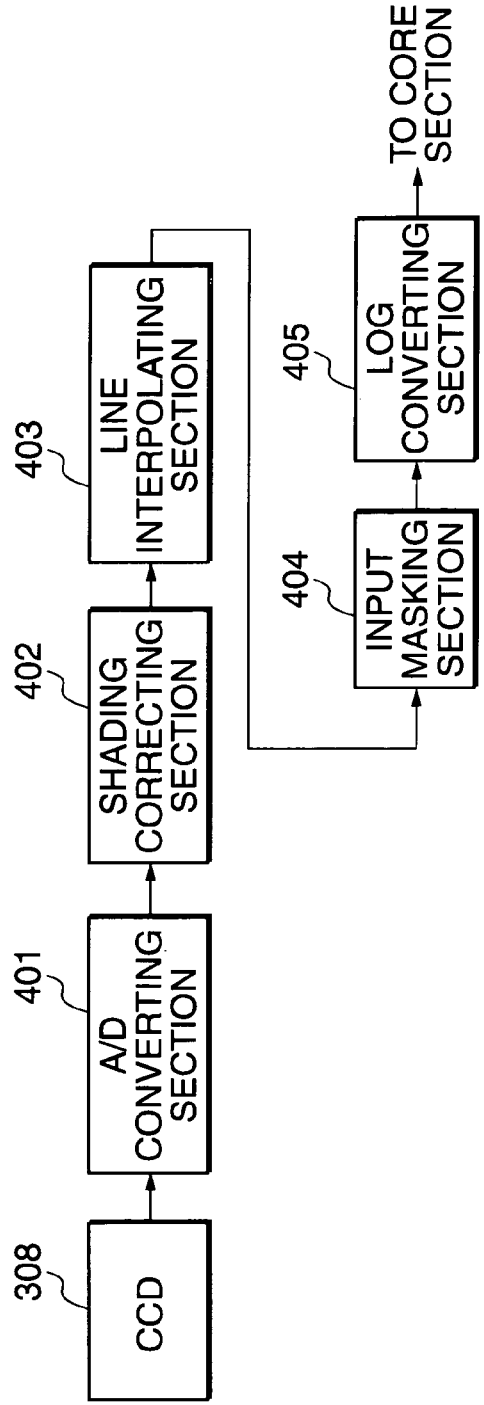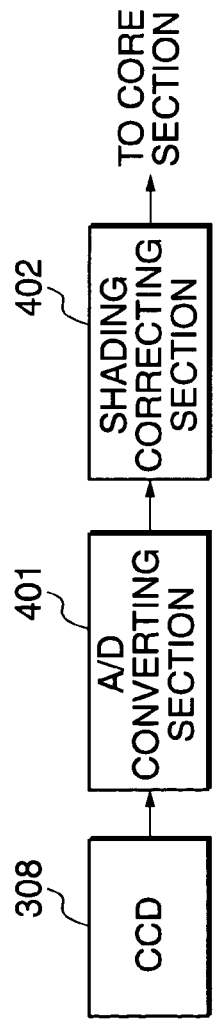

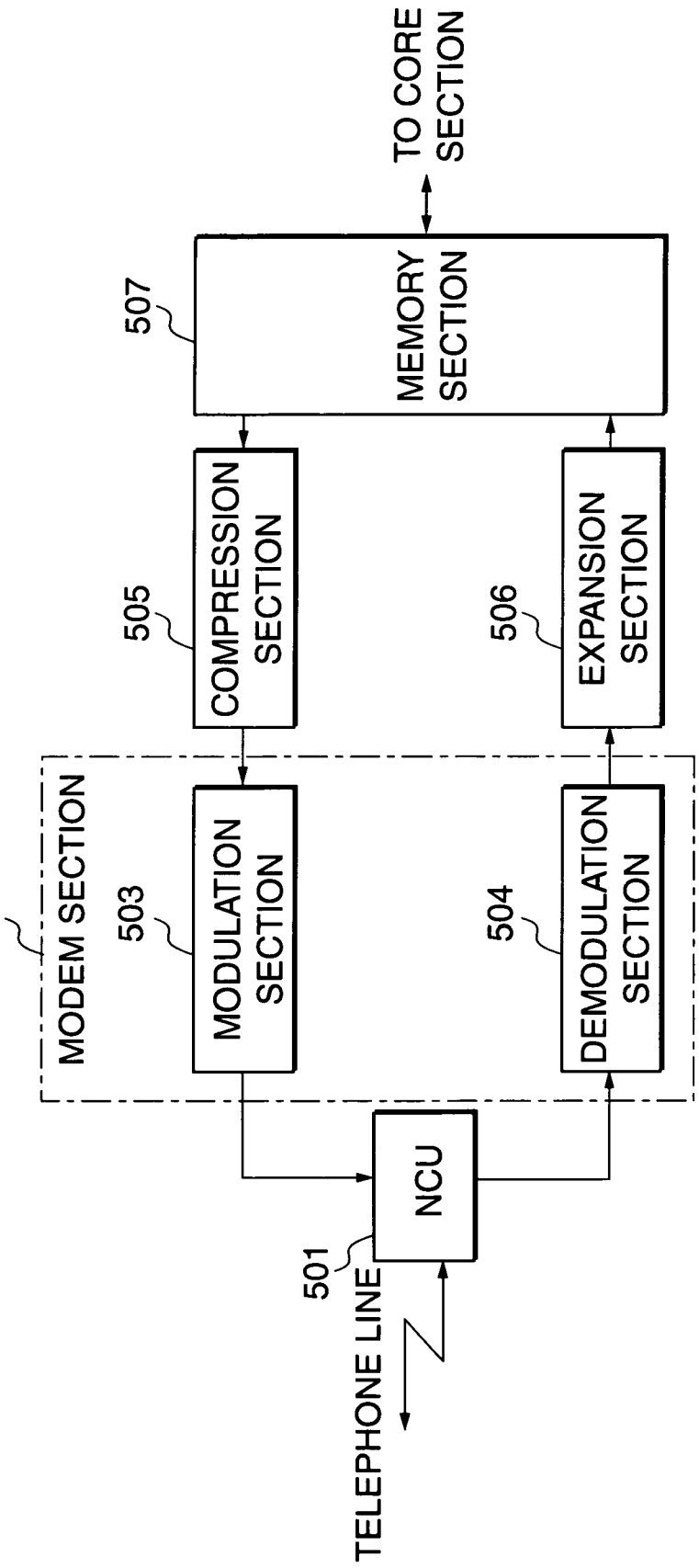

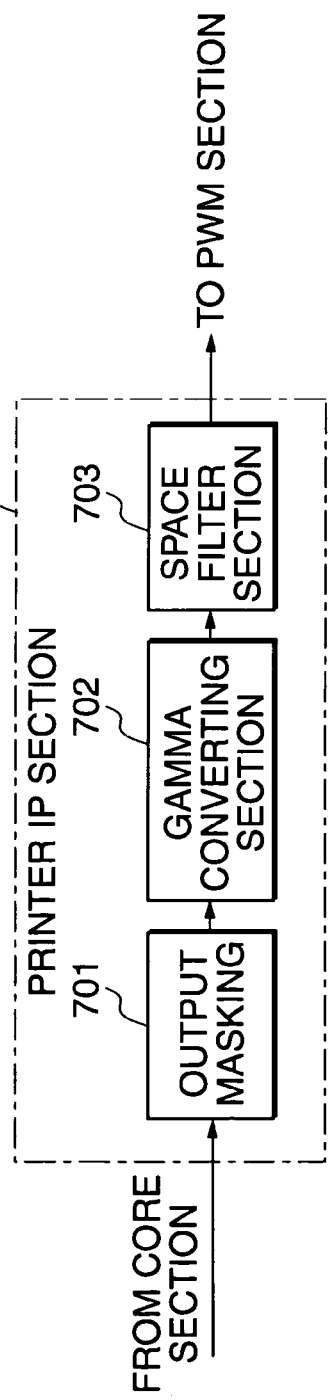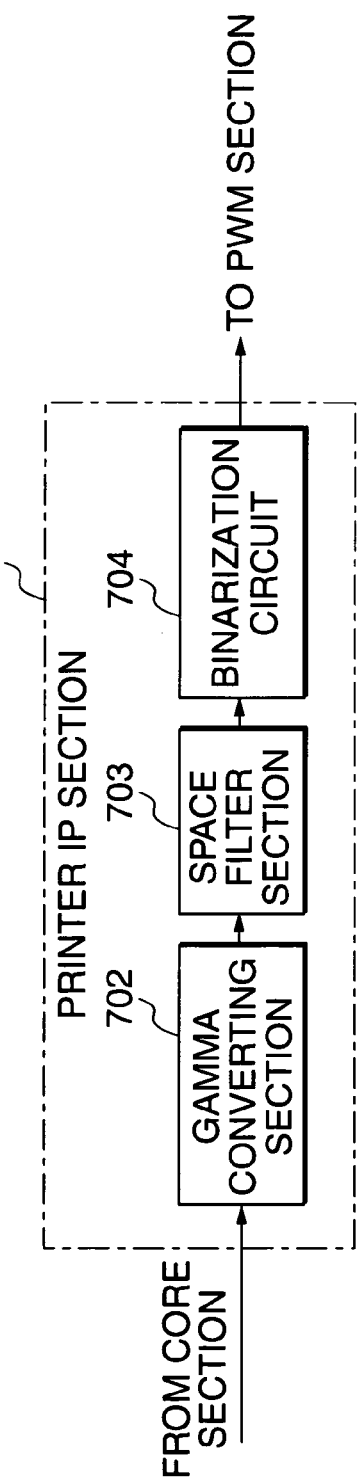

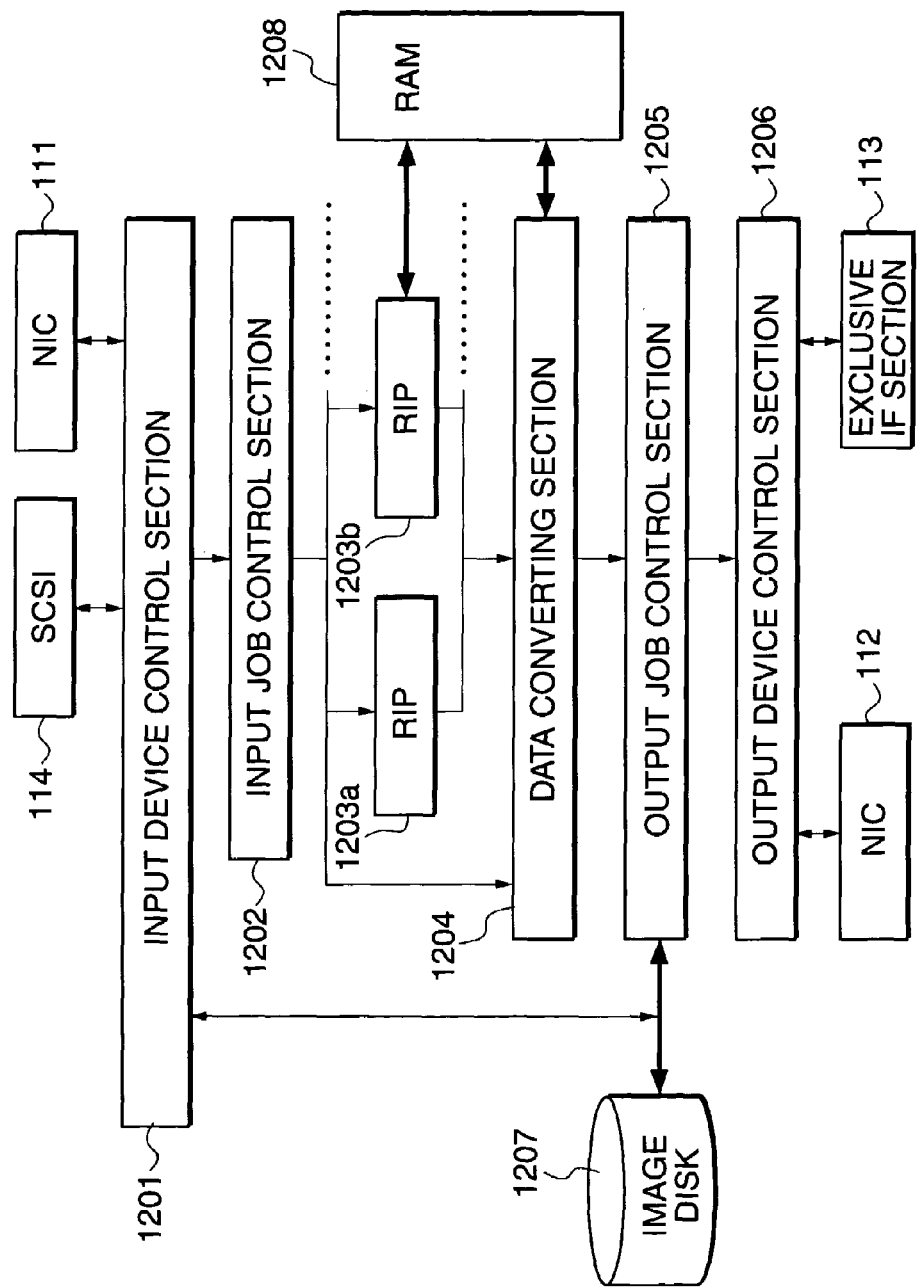

FIG.15A

[DESCRIPTION OF R1301]
char_color={0.0,0.0,0.0,1.0};          ←L1311
string1="IC";                           ←L1312
put_char(0.0,0.0,0.3,0.1,string1);      ←L1313

FIG.15B

[DESCRIPTION OF R1302]
line_color={1.0,0.0,0.0,0.0};           ←L1321
put_line(0.9,0.0,0.9,1.0,0.1)           ←L1322

FIG.15C

[DESCRIPTION OF R1303]
image1={CMYK,8,5,5,C0,M0,Y0,K0,         ←L1331
                   C1,M1,Y1,K1
                      ⋮
                   C24,M24,Y24,K24}
put_image(0.0,0.5,0.5,0.5,image1)       ←L1332

FIG.24

Job Status

Job Status

| | Job Name | Status | Priority | Pages | Copies | Paper |
|---|---|---|---|---|---|---|
| 1 | File-6 | Ripping | High | 200 | 20 | Letter |
| 2 | File-7 | Ripping | Low | 120 | 30 | 11x17 |
| 3 | File-8 | Waiting | Medium | 300 | 15 | Letter |
| 4 | File-9 | Waiting | Medium | 20 | 350 | Letter |
| 5 | File-10 | Waiting | Medium | 155 | 10 | 11x17 |

Printing Status

| | Job Name | Status | Printer | Pages | Copies | Paper |
|---|---|---|---|---|---|---|
| 1 | File-1 | Printing | Cluster 1&2 | 120 | 130 | Letter |
| 2 | File-2 | Printing | Printer3 | 80 | 240 | Letter |
| 3 | File-3 | Waiting | Printer1 | 230 | 15 | Letter |
| 4 | File-4 | Waiting | Printer2 | 40 | 25 | 11x17 |
| 5 | File-5 | Waiting | Printer3 | 35 | 10 | 11x17 |

History of finished job

| | Job Name | Status | Job ID | Pages | Copies | Paper |
|---|---|---|---|---|---|---|
| 1 | File-E | Printed | # 00122 | 110 | 30 | Letter |
| 2 | File-D | Canceled | # 00121 | 25 | 20 | 11x17 |
| 3 | File-C | Printed | # 00120 | 35 | 150 | Letter |
| 4 | File-B | Printed | # 00119 | 110 | 40 | Letter |
| 5 | File-A | Canceled | # 00118 | 240 | 35 | 11x17 |

IMAGE PROCESSING APPARATUS AND SYSTEM AND CONTROL METHOD THEREFOR, IMAGE DATA PROCESSING METHOD, IMAGE FORMING APPARATUS AND CONTROL METHOD THEREFOR, CONTROLLER THEREFOR, AND STORAGE MEDIUM STORING THE CONTROL METHOD FOR PROCESSING IMAGE DATA HAVING DIFFERENT PRINTING ATTRIBUTES

BACKGROUND OF THE INVENTION

1. Field of the Invention

The present invention relates to an image processing apparatus for selecting a desired one of a plurality of image forming apparatuses and issuing an output command to the selected image forming apparatus, an image processing system including the image forming apparatuses, an image data processing method of processing image data, and a storage medium storing a program for executing the method.

2. Description of the Related Art

An image processing system has been known, which is comprised of a plurality of image forming apparatuses including monochrome or color printers, a computer, and a network such as a LAN, the image forming apparatuses and the computer being connected to each other via the network or an exclusive interface so that a user can select a desired one of the plurality of image forming apparatuses on the computer to carry out a printing process using the selected image forming apparatus.

A client server image processing system has also been widely known, which is comprised of a client computer (hereinafter referred to as "the client") directly operated by a user, a document server computer (hereinafter referred to as "the document server") for carrying out a predetermined process in response to a request from the client, a plurality of image forming apparatuses as mentioned above, and a network, the client, the document server and the image forming apparatuses being connected to each other via the network so that a printing job designated by the user is transferred from the client via the document server to a desired one of the image processing apparatuses, which then executes a printing process.

In the market of light printing, that is, print on demand, systems for causing an image forming apparatus to print a large amount of printing jobs based on a command from a computer have been proposed. It has thus been important how a large amount of printing jobs can be processed inexpensively and efficiently.

With the above conventional image processing system, however, the same printing job is processed by a single image processing apparatus, so that in processing a printing job comprising printing both color image data (hereinafter simply referred to as "color data") and black-and-white image data (hereinafter simply referred to as "black-and-white data"), even black-and-white data are processed by an image forming apparatus adapted for color printing, thereby disadvantageously leading to increased running costs. That is, the color printing has a higher unit price (printing cost) than the black-and-white printing, but if the printing job comprises printing both color data and black-and-white data, a color image forming apparatus is selected for the printing process and even the black-and-white data in the printing job are thus processed by the color image forming apparatus, thereby leading to degraded efficiency of the printing process and increased running costs. Thus, the conventional image processing system is not suitable for processing a large amount of printing jobs. For such a system, it is desirable to prevent inconveniences such as complicated operations required of an operator, generate desired data for the operator, and allow the operator to work more efficiently.

SUMMARY OF THE INVENTION

It is an object of the present invention to provide an image processing apparatus and an image processing system and a control method therefor, an image data processing method, an image forming apparatus and a control method therefor, a controller, and a storage medium storing programs for executing the methods, which are all free of the above described problems.

It is another object of the present invention to provide an image processing apparatus and an image processing system and a control method therefor, an image data processing method, an image forming apparatus and a control method therefor, a controller, and a storage medium storing programs for executing the methods, wherein images are processed depending on printing attributes of the image forming apparatus and printing jobs are distributed to a plurality of image forming apparatuses depending on the printing attributes to enable a large amount of printing jobs to be efficiently carried out with low running costs, thereby preventing inconveniences such as complicated operations required of an operator, generating desired data for the operator, and allowing the operator to work more efficiently.

To attain the above objects, in a first aspect of the present invention, there is provided an image processing apparatus which selects at least one image forming apparatus from a plurality of image forming apparatuses including at least two types of image forming apparatuses having different printing attributes, the at least one image forming apparatus having predetermined printing attributes, and outputs image data to the selected at least one image forming apparatus, the image processing apparatus comprising input means for inputting a group of image data, distributing means for distributing the input group of image data depending on printing attributes of the group of image data, a plurality of image processing means for executing image processes corresponding respectively to printing attributes of the distributed image data, on the group of image data, selecting means for selecting at least two image forming apparatuses from the plurality of image forming apparatuses, which have printing attributes compatible with results of the image processes executed by the image processing means, and output means for outputting the image data on which the image processes have been executed, to the selected at least two image forming apparatuses.

Preferably, the printing attributes comprise at least a first printing attribute, and a second printing attribute, and the image processing means comprises first and second image processing means for executing image processes depending on the first printing attribute and the second printing attribute, respectively, and the image processing apparatus further comprises judging means for judging whether or not each of the image data of the group belongs to the first printing attribute after the first image processing means have executed the image process on all the image data of the group, and image process re-executing means for determining that each of the image data belongs to the second printing attribute and causing the second image processing means to again execute the image process on the each of the image data when a result of the judgment by the judging means is negative, and the output means outputs the image data on which the image processes have been executed by the first image processing means and the second image processing means, to the selected at least two image forming apparatuses, respectively.

In an alternative preferred form of the first aspect, the printing attributes comprise at least a first printing attribute, and a second printing attribute, and the image processing means comprises first image processing means, and second and third image processing means for executing image processes depending on the first printing attribute and the second printing attribute, respectively, and the image processing apparatus further comprises judging means for judging whether or not each of the image data of the group belongs to the first printing attribute after the first image processing means have executed the image process on all the image data of the group, first image process re-executing means for determining that each of the image data belongs to the first printing attribute and causing the second image processing means to again execute the image process on the each of the image data when a result of the judgment by the judging means is affirmative, and second image process re-executing means for determining that each of the image data belongs to the second printing attribute and causing the third image processing means to again execute the image process on the each of the image data when a result of the judgment by the judging means is negative, and the output means outputs the image data on which the image processes have been executed by the second image processing means and the third image processing means, to the selected at least a two image forming apparatuses, respectively.

In this preferred form, the first image processing means has a lower resolution than resolutions of the second and third image processing means.

Preferably, the image processing means comprises first image processing means for executing an image process corresponding to a first resolution, and second image processing means for executing an image process corresponding to a second resolution, and the output means outputs the image data on which the image processes have been executed by the first image processing means and the second image processing means, respectively, to the selected at least two image forming apparatuses which have printing attributes compatible to a result of the execution of the image process corresponding to the first resolution and a result of the execution of the image process corresponding to the second resolution, respectively.

In a preferred form of the first aspect, the printing attributes comprise at least a first printing attribute, and a second printing attribute, and the distributing means distributes the input group of image data as a first group of image data having the first printing attribute and a second group of image data having the second printing attribute, and the output means comprises first output means for outputting the first group of image data having the first printing attribute to a first image forming apparatus, second output means for outputting the second group of image data having the second printing attribute to a second image forming apparatus, and delimiter paper supply commanding means for issuing a command instructing supply of delimiter paper to at least one of the first and second image forming apparatuses, at at least one portion of the first and second groups of image data where printing attributes are to be switched.

More preferably, the at least one of the first and second image forming apparatuses comprises a plurality of feeding sections, and the output means comprises control means for providing such control that the delimiter paper is fed from a feeding section different from a feeding section from which recording paper for the first group of image data or the second group of image data is fed.

In another preferred form of the first aspect, the printing attributes comprise at least a first printing attribute, and a second printing attribute, and the distributing means distributes the input group of image data as a first group of image data having the first printing attribute and a second group of image data having the second printing attribute, and the output means comprises first output means for outputting the first group of image data having the first printing attribute to a first image forming apparatus, second output means for outputting the second group of image data having the second printing attribute to a second image forming apparatus, and paper supply commanding means for issuing a command instructing supplying to at least one of the first and second image forming apparatuses a predetermined number of sheets of recording paper corresponding to one of the first and second groups of image data output to another of the first and second image forming apparatuses, at at least one portion of the first and second groups of image data where printing attributes are to be switched.

More preferably, the at least one of the first and second image forming apparatuses comprises a plurality of feeding sections, and the output means comprises control means for providing such control that the predetermined number of sheets of recording paper are fed from a feeding section different from a feeding section from which recording paper for the first group of image data or the second group of image data is fed.

Also preferably, the image processing apparatus of this preferred form comprises judging means for judging whether or not images are to be formed on the predetermined number of sheets of recording paper, and wherein the output means comprises image formation commanding means for issuing a command instructing an image forming process to be executed on the predetermined number of sheets of recording paper using a printing attribute of one of the first and second image forming apparatuses if a result of the judgment by the judging means is affirmative.

Also preferably, the image processing apparatus of the preferred form comprises judging means for judging whether or not images are to be formed on the predetermined number of sheets of recording paper, and wherein the output means comprises non-image formation commanding means for issuing a command instructing a non-image forming process to be executed on the predetermined number of sheets of recording paper if a result of the judgment by the judging means is negative.

Preferably, the output means comprises partition paper supply commanding means for issuing a command instructing partition paper to be supplied between the first group of image and the second group of image data.

Preferably, image processing apparatus according to the first aspect comprises managing means for managing the group of image data for each page, and wherein the distributing means distributes the group of image data for each page.

In this case, preferably, the image processing apparatus comprises conversion means for converting the group of image data into a format that enables the group of image data to be managed for each page.

Typically, the printing attributes include at least color printing, and black-and-white printing.

To attain the above objects, in a second aspect of the present invention, there is provided an image processing system comprising an information processing apparatus directly operated by a user, a plurality of image forming apparatuses including at least two types of image forming apparatuses having different printing attributes, and an image processing apparatus for controlling the plurality of image forming apparatuses in response to a request from the information processing apparatus, the information processing apparatus, the plurality of image forming apparatuses, and the image processing apparatus being connected to each other, the image processing apparatus selecting at least one image forming apparatus from the plurality of image forming apparatuses, and outputting image data to the selected at least one image forming apparatus, wherein the image processing apparatus comprises input means for inputting a group of image data, distributing means for distributing the input group of image data depending on printing attributes of the group of image data, a plurality of image processing means for executing image processes corresponding respectively to printing attributes of the distributed image data, on the group of image data, selecting means for selecting at least two image forming apparatuses from the plurality of image forming apparatuses, which have printing attributes compatible with results of the execution of the image processes executed by the image processing means, and output means for outputting the image data on which the image processes have been executed, to the selected at least two image forming apparatuses.

To attain the above objects, in a third aspect of the present invention, there is provided an image data processing method of processing image data using an image processing apparatus connected to a plurality of image forming apparatuses including at least two types of image forming apparatuses having different printing attributes, for controlling the plurality of image forming apparatuses, the image processing apparatus selecting at least one image forming apparatus having predetermined printing attributes from the plurality of image forming apparatuses, and outputting image data to the selected at least one image forming apparatus, the image data processing method comprising the steps of inputting a group of image data, executing a distribution process of distributing the input group of image data depending on printing attributes of the group of image data, executing a plurality of image processes corresponding respectively to printing attributes of the distributed image data, on the group of image data, selecting at least two image forming apparatuses from the plurality of image forming apparatuses, which have printing attributes compatible with results of the execution of the image processes, and executing an output process of outputting the image data on which the image processes have been executed, to the selected at least two image forming apparatuses.

To attain the above objects, in a fourth aspect of the present invention, there is provided a controller for controlling an image processing system comprising a plurality of image forming apparatuses, comprising separated transmission control means for separating a group of image data to be printed into a plurality of groups and transmitting the groups to the plurality of image forming apparatuses, wherein the separated transmission control means provides such control that image processes are executed on the image data to be transmitted depending on printing attributes of the image forming apparatuses to which the image data are to be transmitted, in a manner such that different processes are executed for respective ones of the groups and the image data that have been processed for the respective ones of the groups are transmitted to respective corresponding ones of the image forming apparatuses.

Preferably, the plurality of image forming apparatuses include a first image forming apparatus, and a second image forming apparatus, and the separated transmission control means transmits image data of the group of image data which are contained in a group to be transmitted to the first image forming apparatus, to the first image forming apparatus with a resolution which is suitable for the first image forming apparatus, and transmits image data of the group of image data which are contained in a group to be transmitted to the second image forming apparatus, to the second image forming apparatus with a resolution which is suitable for the second image forming apparatus.

Typically, the first image forming apparatus is a black-and-white image forming apparatus, the second image forming apparatus is a color image forming apparatus, the group of image data to be printed include color image data, and black-and-white image data, and the separated transmission control means determines, for each page, whether the image data contained in the group of image data are colored or black and white, and transmits the black-and-white image data of the group of image data to the first image forming apparatus, while transmitting the color image data of the group of image data to the second image forming apparatus.

Preferably, the separated transmission control means determines whether the image data for all pages in the group of image data to be printed are colored or black and white, with the resolution suitable for the second image forming apparatus, and transmits image data that have been determined to be black and white with the resolution suitable for the first image forming apparatus, while transmitting image data that have been determined to be colored to the second image forming apparatus as they were at a time of the determination.

Alternatively, the separated transmission control means determines whether the image data for all pages in the group of image data to be printed are colored or black and white with a low resolution, and transmits image data that have been determined to be black and white with the resolution suitable for the first image forming apparatus, while transmitting image data that have been determined to be colored to the second image forming apparatus with the resolution suitable for the second image forming apparatus.

Typically, the controller receives image data from an external device and transmits the received image data to the plurality of image forming apparatuses.

To attain the above objects, in a fifth aspect of the present invention, there is provided an image forming apparatus for forming, on sheets, image data of a group of image data which are for pages corresponding to image data having a first attribute, the group of image data including image data having a second attribute for formation of images by another image forming apparatus, and the image data having the first attribute which is different from the second attribute, wherein the image forming apparatus selects one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which the image data of the group of image data which are for the pages corresponding to the image data having the first attribute are formed on sheets from the first feeding unit while the apparatus inhibits insertion of sheets from the another feeding unit which is different from the first feeding unit into the pages at the positions corresponding to the image data of the group of image data which have the second attribute.

Preferably, in selecting the insertion mode, the image forming apparatus selects one of a plurality of insertion modes depending on a command from a user, the insertion modes including a first insertion mode in which as many sheets as continuous pages corresponding to the image data of the group of image data which have the second attribute are fed from the another feeding unit and inserted into positions of the continuous pages corresponding to the image data having the second attribute, and a second insertion mode operating in a manner such that only one sheet from the another feeding unit is inserted even into the positions of the continuous pages corresponding to the image data of the group of image data which have the second attribute.

More preferably, in selecting the first insertion mode, either a mode for permitting image formation on sheets from the another feeding unit or a mode for inhibiting the image formation on the sheets from the another feeding unit is selected based on a command from the user.

Typically, the image data having the first attribute are black-and-white image data, and the image data having the second attribute are color image data, and the image forming apparatus is a black-and-white image forming apparatus, and the another image forming apparatus is a color image forming apparatus.

Alternatively, the image data having the first attribute are color image data, and the image data having the second attribute are black-and-white image data, and the image forming apparatus is a color image forming apparatus, and the another image forming apparatus is a black-and-white image forming apparatus.

To attain the above objects, in a sixth aspect of the present invention, there is provided a controller for controlling an image processing system comprising a plurality of image forming apparatuses including a first image forming apparatus, and a second image forming apparatus, comprising control means for causing the first image forming apparatus to form images on sheets with image data of a group of image data which are for pages corresponding to image data having a first attribute, the group of image data including the image data having the first attribute, and image data having a second attribute, and causes the second image forming apparatus to form images on sheets with image data for pages corresponding to the image data having the second attribute, wherein the control means controls the first image forming apparatus to operate by selecting one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which image data of the group of image data which are for the pages corresponding to the image data having the first attribute are formed on sheets from the first feeding unit while the control means inhibits insertion of sheets from the another feeding unit which is different from the first feeding unit into the pages at the positions corresponding to the image data of the group of image data which have the second attribute.

To attain the above objects, in a seventh aspect of the present invention, there is provided a control method of controlling an image processing system comprising a plurality of image forming apparatuses including a first image forming apparatus, and a second image forming apparatus, the method comprising the steps of transmitting a group of image data including image data having a first attribute for formation of images by the first image forming apparatus, and image data having a second attribute for formation of images by the second image forming apparatus, inputting a command instructing the first image forming apparatus to select one of a plurality of operation modes including an insertion mode in which image data of the group of image data which are for pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which image data of the group of image data which are for the pages corresponding to the image data having the first attribute are formed on sheets from the first feeding unit while the methods inhibits insertion of sheets from the another feeding unit which is different from the first feeding unit into the pages at the positions corresponding to the image data of the group of image data which have the second attribute, and transmitting the input command.

To attain the above objects, in an eighth aspect of the present invention, there is provided a computer readable storage medium storing a program for causing an image processing system comprising a plurality of image forming apparatuses including a first image forming apparatus, and a second image forming apparatus to execute the steps of transmitting a group of image data including image data having a first attribute for formation of images by the first image forming apparatus, and image data having a second attribute for formation of images by the second image forming apparatus, inputting a command instructing the first image forming apparatus to select one of a plurality of operation modes including an insertion mode in which image data of the group of image data which are for pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which image data of the group of image data which are for the pages corresponding to the image data having the first attribute are formed on sheets from the first feeding unit while the methods inhibits insertion of sheets from the another feeding unit which is different from the first feeding unit into the pages at the positions corresponding to the image data of the group of image data which have the second attribute, and transmitting the input command.

To attain the above objects, in a ninth aspect of the present invention, there is provided a controller method of controlling an image processing system comprising a plurality of image forming apparatuses, the method comprising the step of separating a group of image data to be printed into a plurality of groups and transmitting the groups to the plurality of image forming apparatuses, wherein the step provides such control that image processes are executed on the image data to be transmitted depending on printing attributes of the image forming apparatuses to which the image data are to be transmitted, in a manner such that different processes are executed for respective ones of the groups and the image data that have been processed for the respective ones of the groups are transmitted to respective corresponding ones of the image forming apparatuses.

To attain the above objects, in a tenth aspect of the present invention, there is provided a computer readable storage medium storing a program for causing an image processing system comprising a plurality of image forming apparatuses to execute the step of separating a group of image data to be printed into a plurality of groups and transmitting the groups to the plurality of image forming apparatuses, wherein the step provides such control that image processes are executed on the image data to be transmitted depending on printing attributes of the image forming apparatuses to which the image data are to be transmitted, in a manner such that different processes are executed for respective ones of the groups and the image data that have been processed for the respective ones of the groups are transmitted to respective corresponding ones of the image forming apparatuses.

To attain the above objects, in an eleventh aspect of the present invention, there is provided a control method for controlling an image forming apparatus for forming, on sheets, image data of a group of image data which are for pages corresponding to image data having a first attribute, the group of image data including image data having a second attribute for formation of images by another image forming apparatus, and the image data having the first attribute which is different from the second attribute, wherein the control method comprises selecting one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which the image data of the group of image data which are for the pages corresponding to the image data having the first attribute are formed on sheets from the first feeding unit while the method inhibits insertion of sheets from the another feeding unit which is different from the first feeding unit into the pages at the positions corresponding to the image data of the group of image data which have the second attribute.

To attain the above objects, in a twelfth aspect of the present invention, there is provided a computer readable storage medium storing a program for causing an image forming apparatus for forming, on sheets, image data of a group of image data which are for pages corresponding to image data having a first attribute, the group of image data including image data having a second attribute for formation of images by another image forming apparatus, and the image data having the first attribute which is different from the second attribute, to execute the step of selecting one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which the image data of the group of image data which are for the pages corresponding to the image data having the first attribute are formed on sheets from the first feeding unit while the method inhibits insertion of sheets from the another feeding unit which is different from the first feeding unit into the pages at the positions corresponding to the image data of the group of image data which have the second attribute.

To attain the above objects, in a thirteenth aspect of the present invention, there is provided a control method of controlling an image processing system comprising a plurality of image forming apparatuses including a first image forming apparatus, and a second image forming apparatus, the control method comprising the steps of causing the first image forming apparatus to form images on sheets with image data of a group of image data which are for pages corresponding to image data having a first attribute, the group of image data including the image data having the first attribute, and image data having a second attribute, and causing the second image forming apparatus to form images on sheets with image data for pages corresponding to the image data having the second attribute, and controlling the first image forming apparatus to operate by selecting one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which image data of the group of image data which are for the pages corresponding to the image data having the first attribute are formed on sheets from the first feeding unit while the control means inhibits insertion of sheets from the another feeding unit which is different from the first feeding unit into the pages at the positions corresponding to the image data of the group of image data which have the second attribute.

To attain the above objects, in a fourteenth aspect of the present invention, there is provided a computer readable storage medium storing a program for causing an image processing system comprising a plurality of image forming apparatuses including a first image forming apparatus, and a second image forming apparatus, to execute the steps of causing the first image forming apparatus to form images on sheets with image data of a group of image data which are for pages corresponding to image data having a first attribute, the group of image data including the image data having the first attribute, and image data having a second attribute, and causing the second image forming apparatus to form images on sheets with image data for pages corresponding to the image data having the second attribute, and controlling the first image forming apparatus to operate by selecting one of a plurality of operation modes depending on a command from a user, the operation modes including an insertion mode in which image data of the group of image data which are for the pages corresponding to the image data having the first attribute are formed on sheets from a first feeding unit while sheets from another feeding unit which is different from the first feeding unit are inserted into pages at positions corresponding to image data of the group of image data which have the second attribute, and a non-insertion mode in which image data of the group of image data which are for the pages corresponding to the image data having the first attribute are formed on sheets from the first feeding unit while the control means inhibits insertion of sheets from the another feeding unit which is different from the first feeding unit into the pages at the positions corresponding to the image data of the group of image data which have the second attribute.

The other objects and features of the present invention will be apparent from the following detailed description and the accompanying drawings.

BRIEF DESCRIPTION OF THE DRAWINGS

FIGS. 4A and 4B are block diagrams showing the detailed constructions of a scanner IP section in the case where the MFP is a color MFP and the case where it is a monochrome MFP, respectively;

FIG. 5 is a block diagram showing the detailed construction of a facsimile section of the MFP;

FIGS. 8A and 8B are block diagrams showing the detailed constructions of a printer IP section of the MFP;

FIG. 14 is a block diagram showing the detailed construction of a document server;

FIGS. 15A to FIG. 15C are views showing examples of description of PDL data;

FIG. 24 is a display screen view showing a user interface for a job status;

DESCRIPTION OF THE PREFERRED EMBODIMENTS

The present invention will now be described with reference to drawings showing preferred embodiments thereof.

Figure 1:
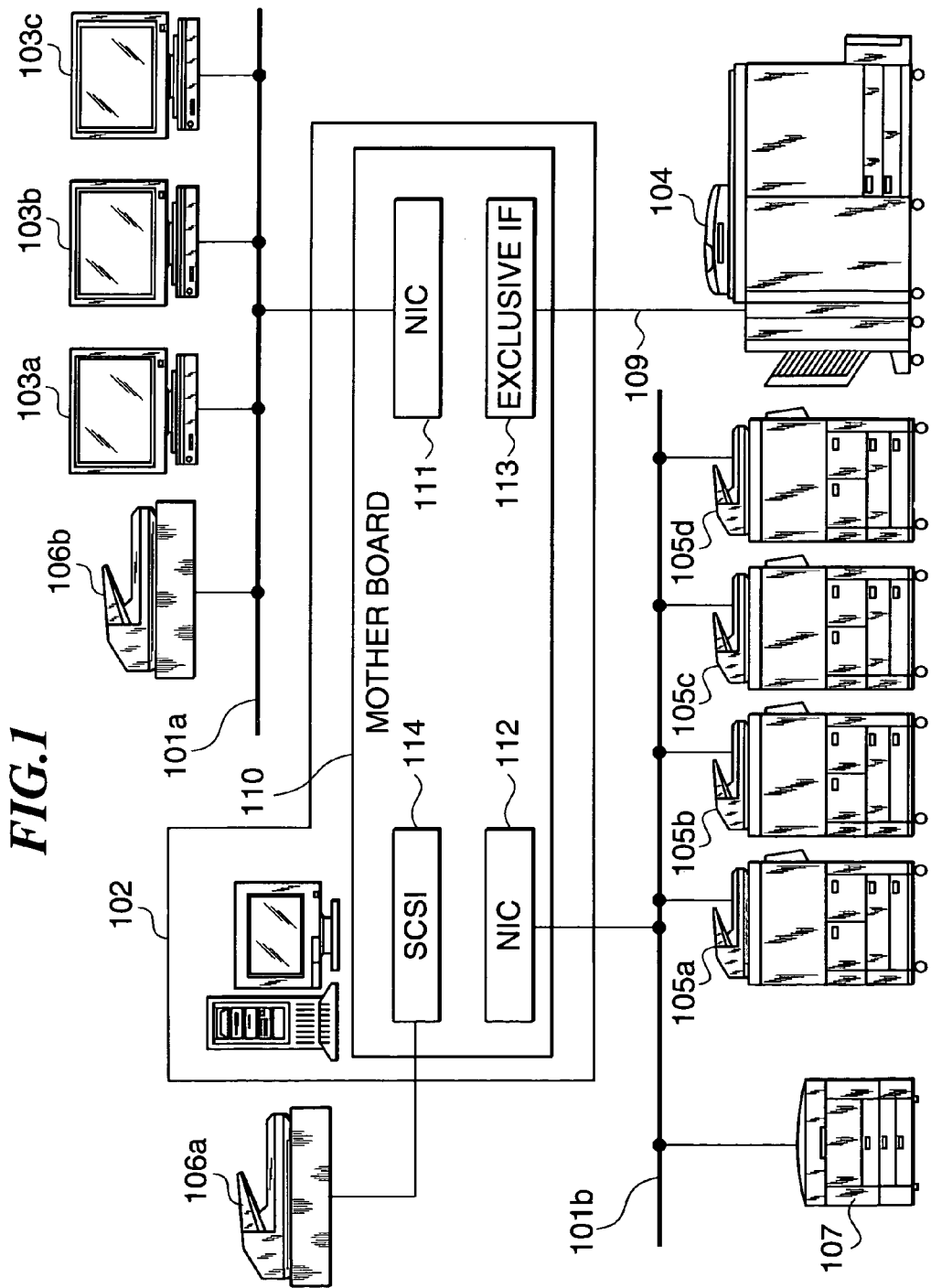
FIG. 1 is a view showing the construction of an image processing system according to an embodiment of the present invention.

FIG. 1 is a view of a system configuration showing the construction of an image processing system according to an embodiment of the present invention.

In the figure, reference numeral 102 denotes a document server, which includes a mother board 110 with a CPU, a RAM, an image disk (HDD) and others mounted thereon, to which are connected first and second NICs (Network Interface Cards) 111 and 112, an exclusive I/F card 113, and an SCSI card 114.

First to third client computers (hereinafter simply referred to as "the clients") 103a to 103c are connected to the first NIC 111 via public networks 101a. The first to third clients 103a to 103c operate application software executing what is called DTP (Desk Top Publishing), create and edit various documents/graphics, convert the created and edited documents/graphics into a Page Description Language (hereinafter referred to as "PDL"), and transfer the PDL to the document server 102 via the public networks 101a.

Scanners 106a and 106b capture image data on originals. The image data read by the scanner 106a are in transferred to the mother board 110 of the document server 102 via a SCSI 114, while the image data read by the scanner 106b are transferred to the mother board 110 via the public networks 101a and the first NIC 111.

A color MFP (Multi Function Peripheral) 104 as a color image forming apparatus has a copy mode, a facsimile mode, a printer mode, and other modes, and is capable of reading and printing image data in full colors with a high resolution and a high gradation. In the present embodiment, the color MFP 104 is connected to the exclusive I/F 113 via an exclusive 109 in order to accommodate an enormous amount of data. The color MFP 104 may be connected to the network 101, as black and white MFPs 105a to 105d are connected thereto. Moreover, the MFP 104 is configured to be able to transmit and receive various data, for example, it can transfer read color data to another apparatus. The first to fourth monochrome MFPs 105a to 105d as monochrome image forming apparatuses each have a copy mode, a facsimile mode, a printer mode, and other modes, and are capable of monochromatically reading and printing image data, as well as capable of performing simplified color scanning or printing with a low resolution or in binary. The first to fourth monochrome MFPs 105a to 105d are connected to the second NIC 112 via a private network 101b. The MFP 105 is configured to be able to perform a read process in colors as well as transmission and reception of various data such as transfer of image data read in colors to another apparatus as they are. In the present embodiment, the monochrome MFP 105 has a resolution of 600 dpi and the color MFP 104 has a resolution of 400 dpi.

A printer 107 is also connected to the private network 101b, and arbitrary communication equipment such as a facsimile machine can be connected to the private network 101b.

The color MFP 104 and the monochrome MFPs 105a to 105d (hereinafter sometimes collectively referred to as "the MFPs 104 and 105"), however, are connected to the document server 102 via the I/F 113 and the second NIC 112, respectively, as described above, so that they can communicate with the first to third clients 103a to 103c. The document server 102 and the first to third clients 103a to 103c have utility software operating on information from the MFPs 104 and 105, and the MFPs 104 and 105 are managed by the document server 102 or the client 103.

Figure 2:
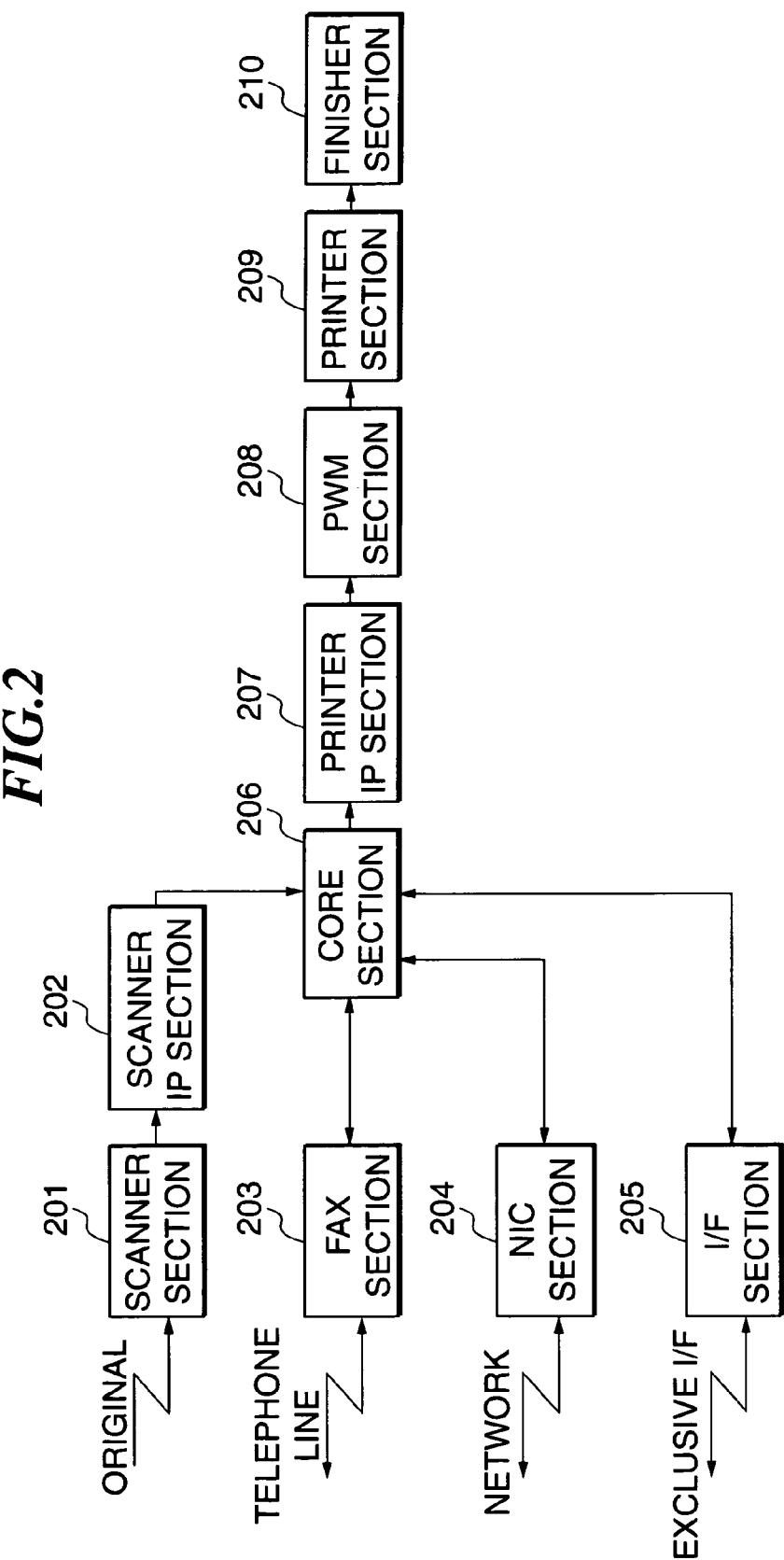
FIG. 2 is a block diagram showing the detailed construction of an MFP.

FIG. 2 is a block diagram showing the detailed construction of the MFPs 104 and 105. The MFPs 104 and 105 are each comprised of a scanner section 201 for reading image data, a scanner IP (Image Processing) section 202 for subjecting the image data read by the scanner section 201 to an image process, a facsimile transmitting/receiving section (hereinafter referred to as "a FAX section") 203 for transmitting and receiving images using a telephone line, a NIC section 204 for transmitting and receiving image data or apparatus information using the network, an I/F section 205 for exchanging information with the color MFP 104, and a core section 206 for temporarily saving an image signal and determining a transmission path for the image signal depending on an operation mode of the MFP 104 or 105.

Image data output from the core section 206 are transmitted to a printer section 209 via a printer IP section 207 and a PWM (Pulse Width Modulation) section 208. The printer section 209 then forms an image on recording paper, and the recording paper output from the printer section 209 is fed into a finisher section 210, which then classifies and finishes the recording paper.

The I/F section 205 is comprised of 4-color and 8-bit image data and communication lines. It performs an interface operation with the color MFP 104 by transmitting and receiving multi-valued bits of CMYK in parallel.

The reason why the exclusive I/F 113 and the document server 102 are connected together via the I/F section 205 is that if, for example, Ethernet cables are used for transmission and reception of data, a printing job may not be transmitted at a transmission rate corresponding to the maximum capability of the color MFP 104 or other devices connected to the network may have their capabilities degraded.

Next, the above described components 201 to 204 and 206 to 210 will be described with reference to FIGS. 3 to 10.

Figure 3:
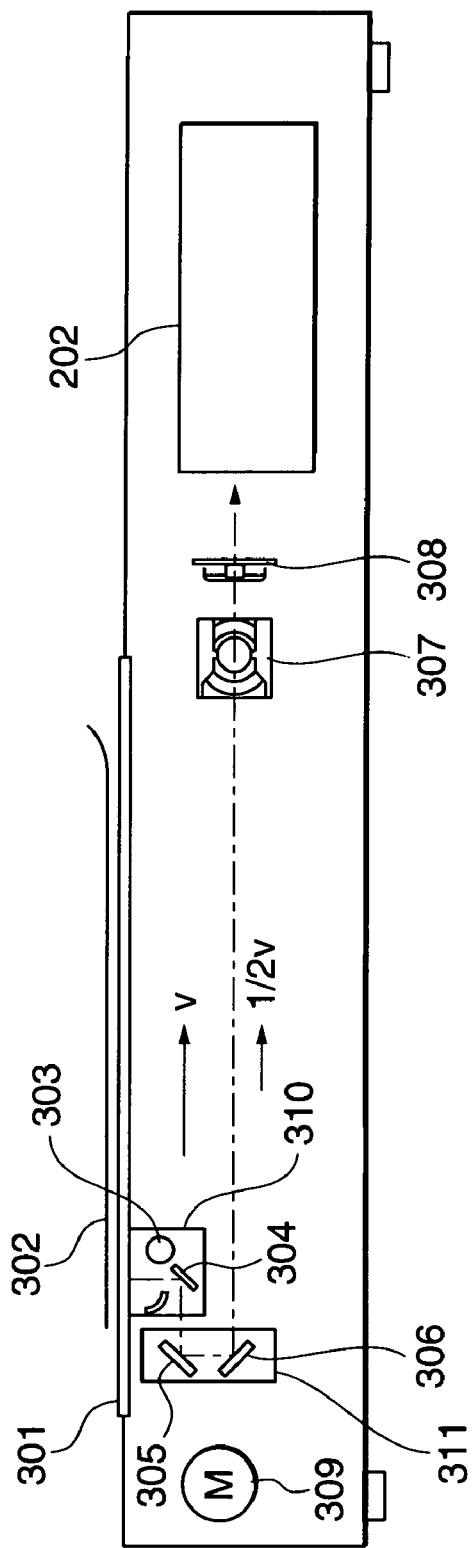
FIG. 3 is a view showing the detailed internal construction of a scanner section of the MFP.

FIG. 3 is a view showing the detailed internal construction of the scanner section 201 (and the scanner IP section 202). In the figure, reference numeral 301 denotes an original table glass on which an original 302 to be read is placed. The original 302 is irradiated with light by an illuminating lamp 303 and reflected light therefrom is collected on a lens 307 via first to third mirrors 304, 305, and 306, so that an image is formed on a CCD sensor 308. A first mirror unit 310 containing the first mirror 304 and the illuminating lamp 303 moves at a velocity V while a second mirror unit 311 containing the second mirror 305 and the third mirror 306 moves at a velocity ½V, to thereby scan the entire surface of the original 302. The first mirror unit 310 and the second mirror unit 311 are driven by a motor 309.

FIGS. 4A and 4B are block diagrams showing the detailed constructions of the scanner IP section 202.

In the case of the color MFP 104, as shown in FIG. 4A, an input optical signal is converted into an electric signal by the CCD sensor 308. The CCD sensor 308 is comprised of a color sensor with three lines for R. G, and B, so that image signals for the R, G, and B from the CCD sensor 308 are input to an A/D converting section 401. The A/D converting section 401 adjusts gain and offset and then converts the color signals into 8-bit digital image signals R0, G0, and B0. A shading correcting section 402 applies a well-known shading correction to each color signal, using a read signal from a reference white board, and a line-interpolating section 403 corrects a spatial deviation in a subscanning direction. That is, since the the CCD sensor 308 has color line sensors spaced from each other by a predetermined distance, the line-interpolating section 403 corrects the spatial deviation in the subscanning direction.

Then, an input masking section 404 converts a read color space determined by spectral characteristics of R, G, and B filters of the CCD sensor 308, into an NTSC standard color space. Specifically, the input image signals R0, G0, and B0 are converted into standard R, G, and B signals by executing a 3×3 matrix calculation using constants unique to the apparatus which are determined taking into account various characteristics such as a sensitivity characteristic of the CCD sensor 308 and a spectral characteristic of the illuminating lamp 303. A luminance/density converting section (LOG converting section) 405 retrieves a lookup table (LUT) to convert RGB luminance signals into density signals C1, M1, and Y1.

On the other hand, in the case of the monochrome MFP 105, as shown in FIG. 4B, the monochrome one-line CCD sensor 308 reads image data, the A/D converting section 401 converts the read image data into a digital signal, and the shading correcting section 402 corrects shading and then transfers the digital signal to the core section 206.

FIG. 5 is a block diagram showing the detailed construction of the FAX section 203. At the time of data reception, an NCU section 501 receives data transmitted through the telephone line to subject the data to voltage conversion, a demodulating section 504 of a modem section 502 subjects the data from the NCU 501 to A/D conversion and demodulation, and an expansion section 506 then expands the resulting data into raster data. The image data converted into raster data are temporarily stored in a memory section 507 and then transmitted to the core section 206 after it has been assured that the data contain no transfer error. On the other hand, at the time of data transmission, a compression section 505 compresses an image signal of a raster image transferred from the core section 206 into compressed data, and a modulating section 503 of the modem section 502 subjects the compressed data to D/A conversion and modulation and then transmits the resulting data to the telephone line via the NCU section 502. The above described compression and expansion processes in the compression section 505 and the expansion section 506 are performed using the run length method or the like.

Figure 6:
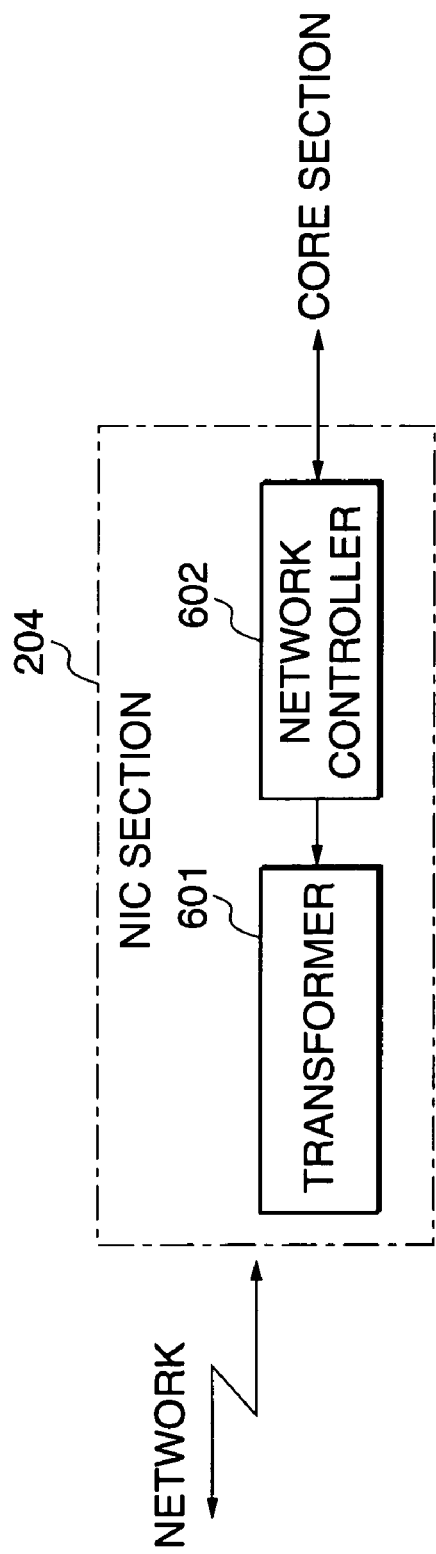
FIG. 6 is a block diagram showing the detailed construction of a NIC section of the MFP.

FIG. 6 is a block diagram showing the detailed construction of the NIC section 204. The NIC section 204 has an interface function for communication with the network 101 to obtain information from an external source or deliver information to an external destination, using an Ethernet cable, for example, 10Base-T/100Base-TX.

More specifically, if information is to be obtained from an external source, a transformer section 601 first subjects input data to voltage conversion and then transmits the resulting data to a network control section 602. The network control section 602 has two buffer memories (first and second buffer memories, not shown); the first buffer memory determines whether or not the external information is necessary information and if so, transfers the information to the second buffer memory, wherefrom the information signal is delivered to the core section 206.

On the other hand, if information is to be provided to an external destination, the network control section 602 adds required information to data transmitted from the core section 206 and transfers the resulting data to the network 101 via the transformer section 601.

Figure 7:
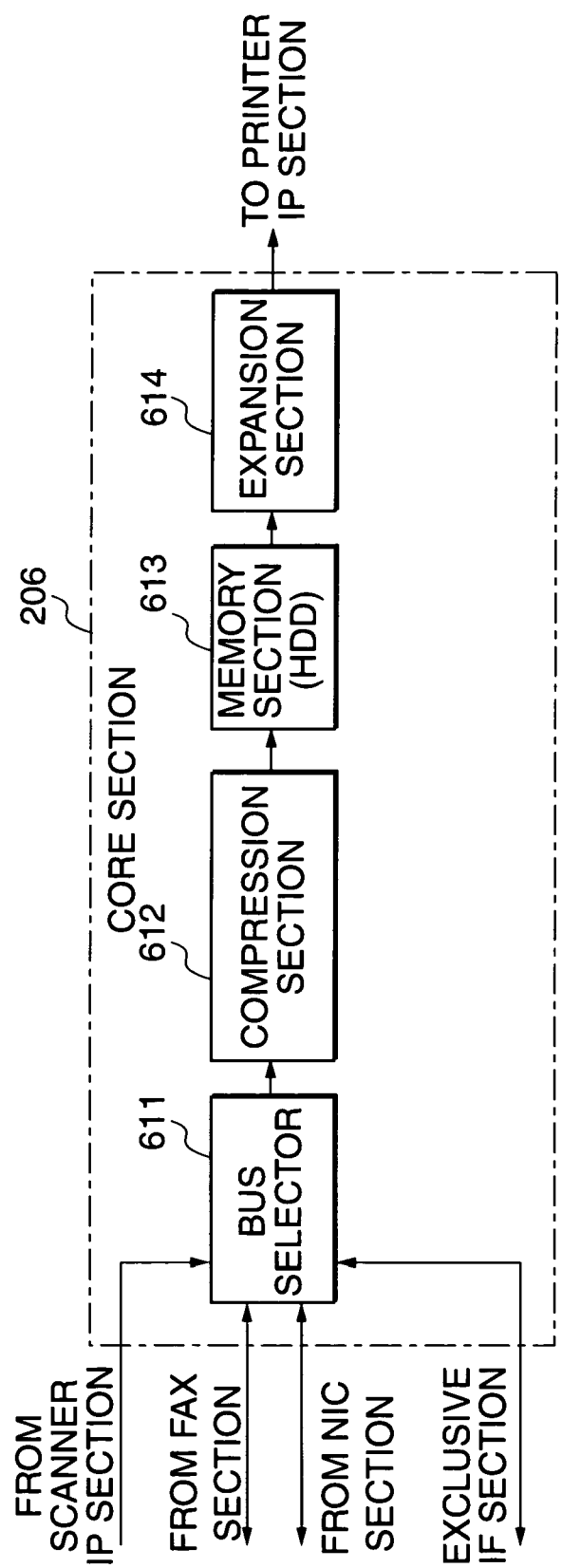
FIG. 7 is a block diagram showing the detailed construction of a core section of the MFP.

FIG. 7 is a block diagram showing the detailed construction of the core section 206. A bus selector section 611 of the core section 206 selects and switches buses depending on various functions of the MFP 104 or 105 such as copying, network scan, network print, facsimile transmission/reception, or display. Specifically, to execute the functions of the MFP 104 or 105, the bus switching is carried out as follows:

(1) Copying Function
Scanner section 201→core section 206→printer section 209
(2) Image Read Function
Scanner section 201→core section 206→NIC section 204
(3) Printing Function
NIC section 204→core section 206→printer section 209
(4) Facsimile Transmission Function
Scanner section 201→core section 206→FAX section 203
(5) Facsimile Reception Function
FAX section 203→core section 206→printer section 209

The data output from the bus selector section 611 are compressed by a compression section 612. The compression method used by the compression section 612 may be JPEG (Joint Photographic Coding Experts Group), JBIG (Joint Bi-level Image Experts Group), ZIP, and others. The compressed image data are managed for each job and stored in a memory section 613 with additional data such as file name, creator's name, creation date and time, and file size. The memory section 613 is comprised of a mass memory such as a hard disk (HDD), and can support what is called a personal box function by setting and storing a job number and a password in the memory section 613.

When an output command is then issued to a printing job stored in the memory section 613, the printing job is read from the memory section 613 and then subjected to image expansion to recover the raster image, which is then transmitted to the printer IP section 207.

FIGS. 8A and 8B are block diagrams showing the detailed constructions of the printer IP section 207.

In the case of the color MFP 104, as shown in FIG. 8A, an output masking/UCR circuit section 701 converts the density signals C1, M1, and Y1 obtained by the LOG converting section 405 (FIG. 4A) into signals C1, M1, Y1, and K1, using a matrix calculation, corrects these signals to C, M, Y, and K signals based on a spectral distribution characteristic of the toner, and outputs the resultant signals. Next, a gamma converting section 702 retrieves a lookup table (LUT) containing various tone characteristics of the toner to convert the C, M, Y, and K signals into C, M, Y, and K data for image G1, outputting, and a space filter 703 executes a sharpness or smoothing process on the C, M, Y, and K data, and the processed data are then transferred to the PWM section 208.

On the other hand, in the case of the monochrome MFP 105, as shown in FIG. 8B, the gamma converting section 702 executes a predetermined gamma process on monochrome data from the core section 206, the space filter 703 subjects the resultant data to the sharpness or smoothing process, and a binarization circuit 704 binarizes and then transfers the data to the PWM section 208.

Figure 9:
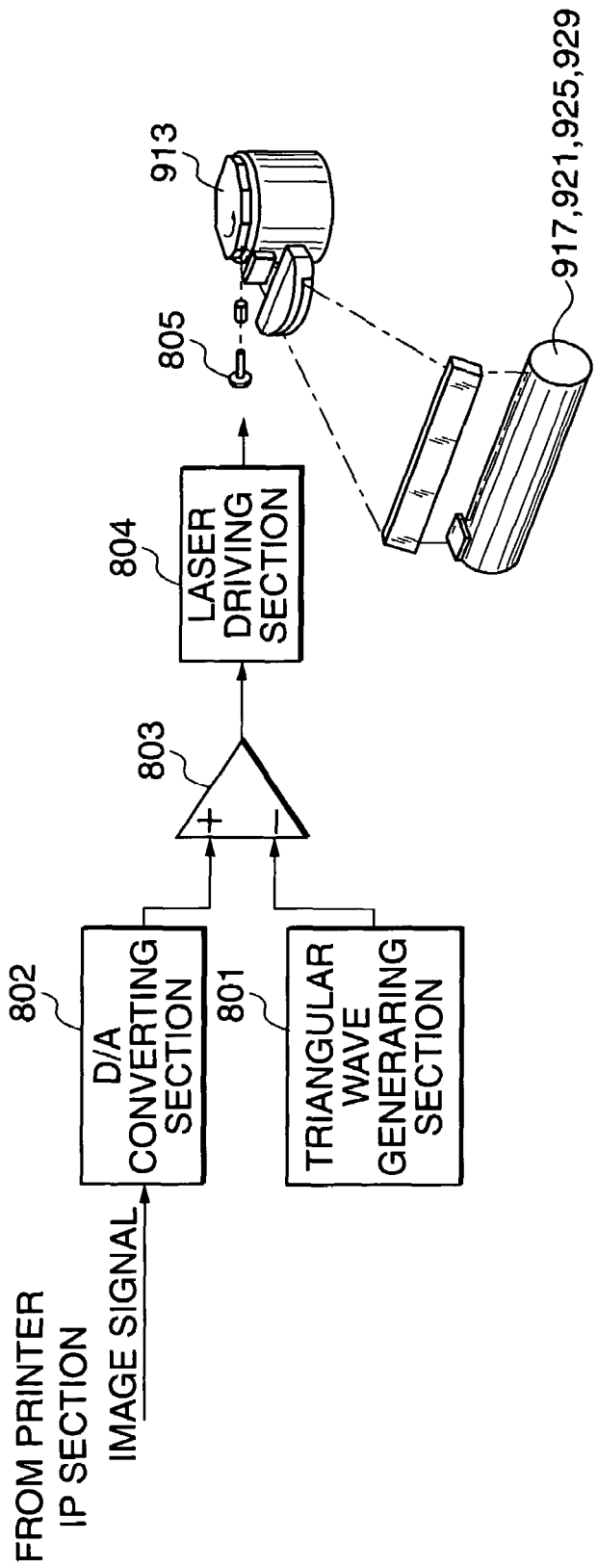
FIG. 9 is a block diagram showing the detailed construction of a PWM section of the MFP.
Figure 10:
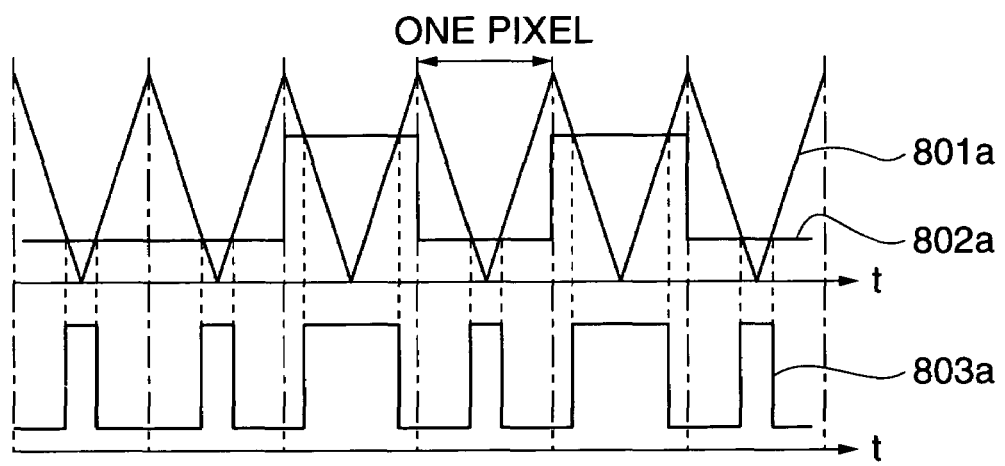
FIG. 10 is a waveform diagram showing signals generated by various portions of the PWM section.

FIG. 9 is a block diagram showing the detailed construction of the PWM section 208. In the figure, reference numeral 801 denotes a triangular wave generating section, and reference numeral 802 denotes a D/A converting section for converting an input digital image signal into an analog signal. A comparator 803 compares a signal (signal 801a in FIG. 10) from the triangular wave generating section 801 with a signal (signal 802a in FIG. 10) from the D/A converting section 802 to generate a signal 803a as shown in FIG. 10 and then transmits it to a laser driving section 804. In the laser driving section 804, lasers 805 for C, M, Y, and K convert the signal into laser beams. A polygon scanner 913 scans the laser beams, which are then applied to photosensitive drums 917, 921, 925, and 929.

Figure 11:
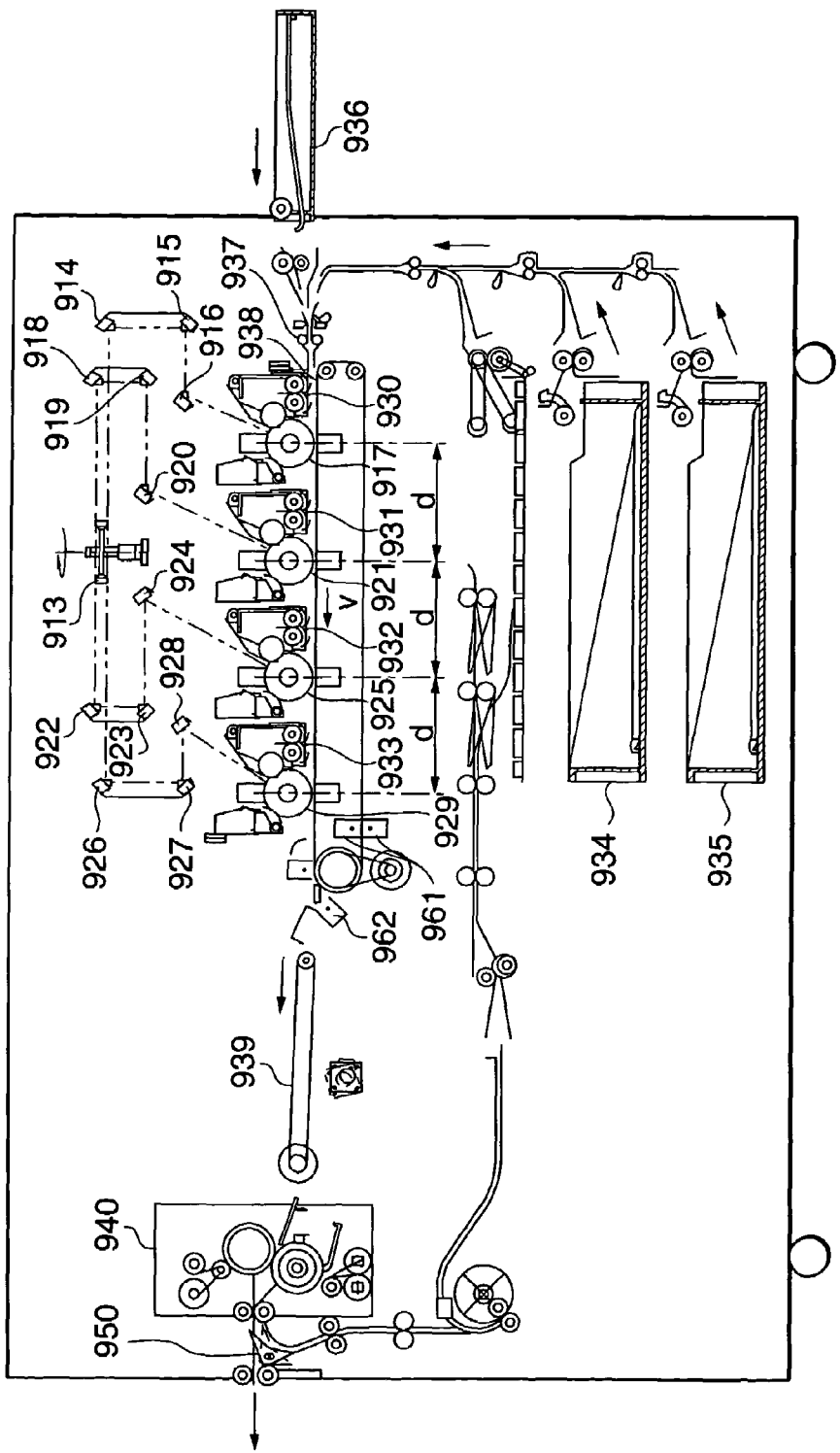
FIG. 11 is a view showing the detailed internal construction of a printer section of a color MFP.

FIG. 11 is a schematic view showing the detailed internal construction of the printer section 209, which is a color printer. In the figure, reference numeral 913 denotes the polygon scanner or polygon mirror that receives four laser beams (first to fourth laser beams) emitted from the four semiconductor lasers 805. The first laser beam scans the photosensitive drum 917 through mirrors 914, 915, and 916, the second laser beam scans the photosensitive drum 921 through mirrors 918, 919, and 920, the third laser beam scans the photosensitive drum 925 through mirrors 922, 923, and 924, and the fourth laser beam scans the photosensitive drum 929 through mirrors 926, 927, and 928.

Further, reference numeral 930 denotes a developer for supplying a yellow (Y) toner to form a yellow toner image on the photosensitive drum 917 in accordance with the laser beam. Reference numeral 931 denotes a developer for supplying a magenta (M) toner to form a magenta toner image on the photosensitive drum 921 in accordance with the laser beam. Reference numeral 932 denotes a developer for supplying a cyan (C) toner to form a cyan toner image on the photosensitive drum 925 in accordance with the laser beam. Reference numeral 933 denotes a developer for supplying a black (B) toner to form a black toner image on the photosensitive drum 929 in accordance with the laser beam.

On the other hand, the printer section 209 has a plurality of feeding cassettes (in FIG. 11, only first and second feeding cassettes 934 and 935 are shown), and a manual feeding tray 936. Recording paper fed from one of the feeding cassettes 934 and 935 or the feeding tray F936 reaches a resist roller 937, whereby the paper feeding timing is synchronized with the photosensitive drums 917, 921, 925, and 926, and then 4-color (Y, M, C, and K) toner images developed on the photosensitive drums 917, 921, 925, and 926 are transferred onto the recording paper, which is then adsorbed and conveyed by a transfer belt 938. The recording paper thus adsorbed and conveyed by the transfer belt 938 is separated therefrom by a separation section 962, and conveyed by a conveyance belt 939, and a fixing device 940 fixes the toner to the recording paper. The recording paper is then discharged from the fixing device 940 and guided downward by a flapper 950, and after its trailing end has left the flapper 950, the recording paper is switched back and discharged. The recording paper is thus discharged in a downwardly facing fashion (i.e. with its image forming surface facing downward) so that a desired page order is obtained when the paper is sequentially printed starting with a leading page.

In the printer section 209, the four photosensitive drums 917, 921, 925, and 929 are spaced from each other by a distance d, the recording paper is conveyed at the constant velocity V by the transfer belt 939, and the four semiconductors 805 are driven in synchronism in timing with each other.

Figure 12:
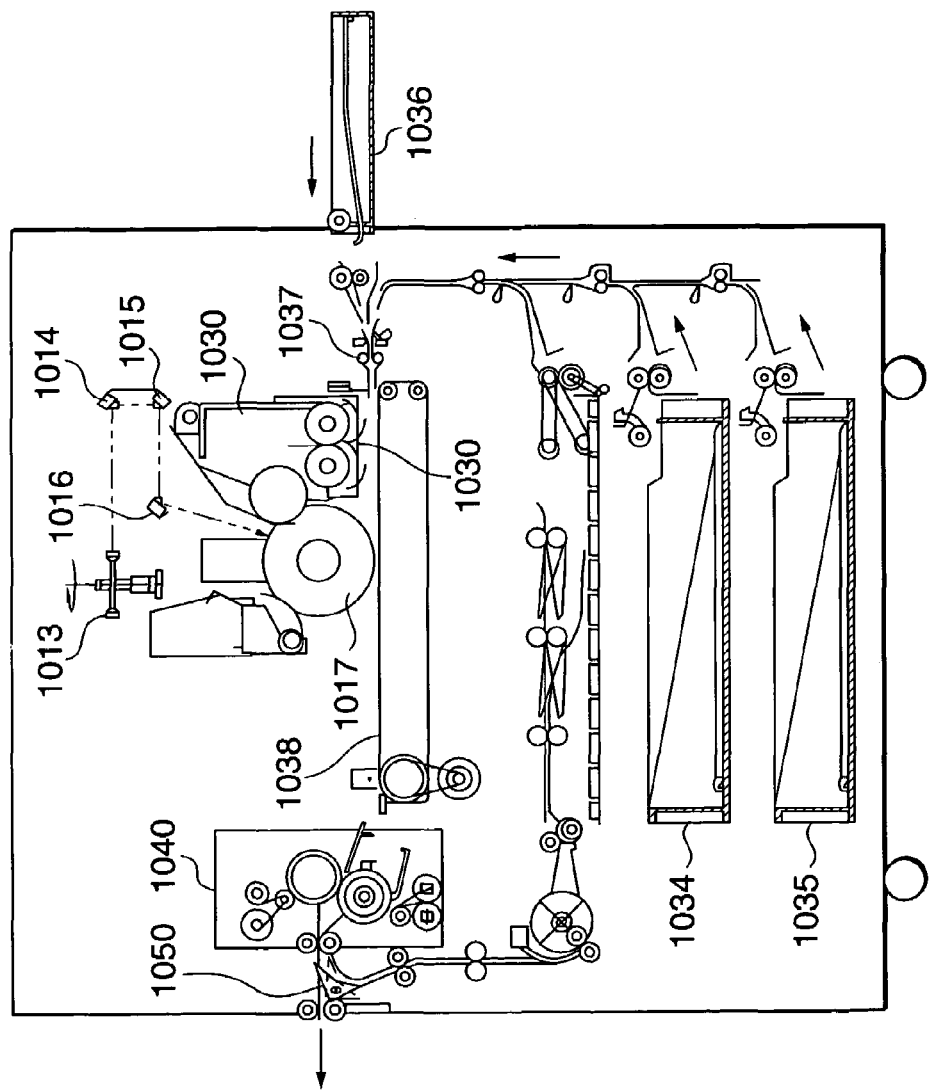
FIG. 12 is a view showing the detailed internal construction of a printer section of a monochrome MFP.

FIG. 12 is a schematic view showing the detailed internal construction of the printer section 209, which is a monochrome printer. In the figure, reference numeral 1013 denotes a polygon mirror for receiving laser beams emitted from the four semiconductor lasers 805. The first laser beams scan a photosensitive drum 1017 through mirrors 1014, 1015, and 1016. Further, reference numeral 1030 denotes a developer for supplying a black toner to form a black toner image on the photosensitive drum 1017 in accordance with the laser beam.

On the other hand, in the case of the monochrome MFP 105, the printer section 209 also has a plurality of feeding cassettes (first and second feeding cassettes 1034 and 1035), and a manual feeding tray 1036. Recording paper fed from one of the feeding cassettes 1034 and 1035 or the feeding tray 1036 reaches a resist roller 1037, whereby the paper feeding timing is synchronized with the photosensitive drum 1017. The black toner image developed on the photosensitive drum 1017 is transferred onto the recording paper, and the recording paper is then conveyed by a conveyance belt 1038, and the toner image is fixed to the recording paper by a fixing device 1040. The recording paper is then discharged from the fixing device 1040 and guided downward by a flapper 1050. After its trailing end has left the flapper 1050, the recording paper is switched back and discharged. The recording paper is thus discharged in a downwardly facing fashion so that a desired page order is obtained when the paper is sequentially printed starting with a leading page.

Figure 13:
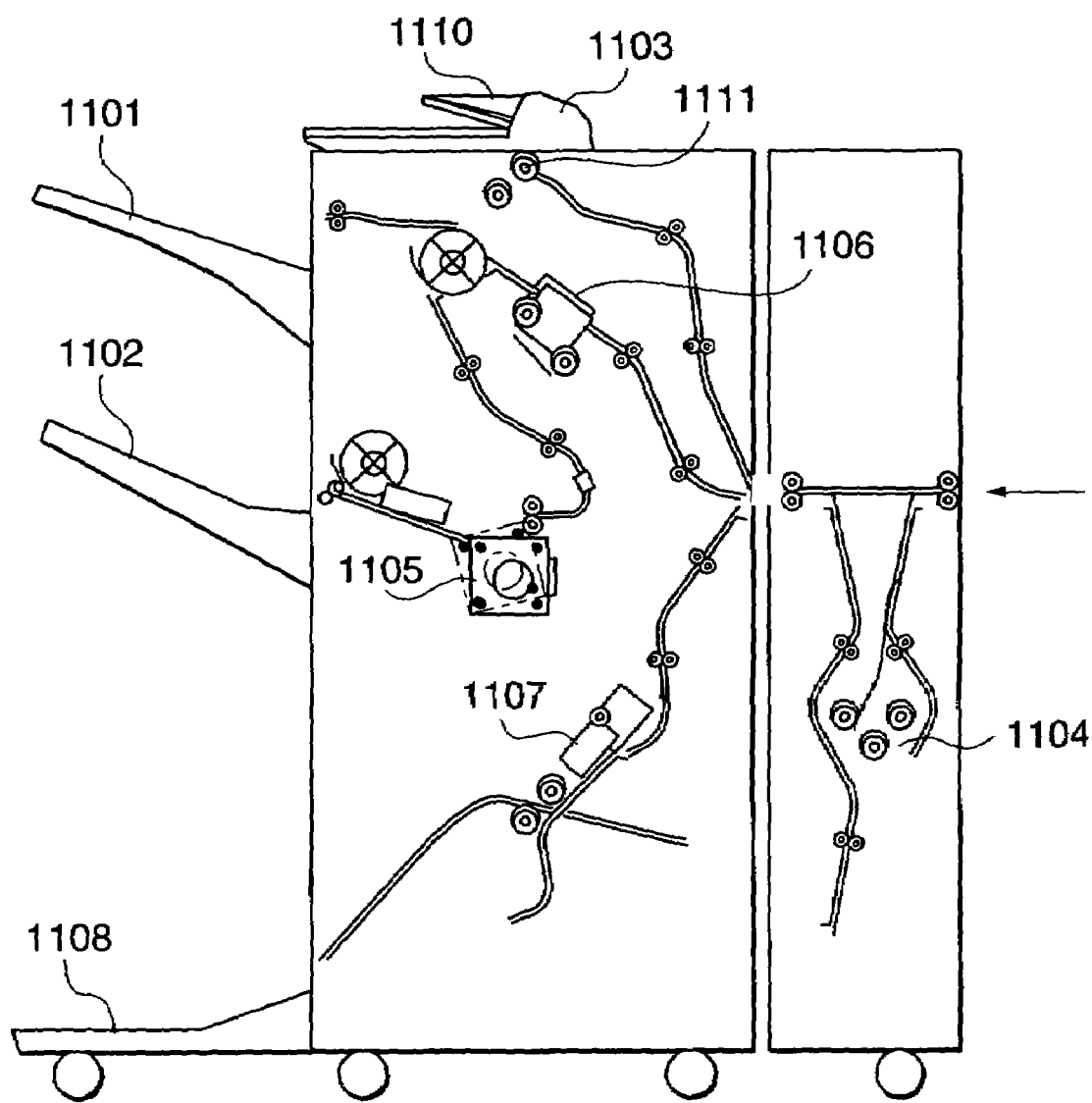
FIG. 13 is a block diagram showing the detailed construction of a finisher section of the MFP.

FIG. 13 is a schematic view showing the detailed internal construction of the finisher section 210. The recording paper discharged from the fixing device 940 or 1040 of the printer section 209 is supplied to the finisher section 210. The finisher section 210 has two discharge trays (a sample tray 1101 and a stack tray 1102) that are switched for discharge depending on the type of a job or the number of sheets of recording paper discharged.

A sort method employed by the present embodiment includes a bin sort method of sorting paper sheets into a plurality of bins, an electronic sort function using the mass memory section 613, which can store image data corresponding to a large number of pages, and a shift sort method of shifting the bins (or the discharge trays) in the lateral directions to sort output sheets of recording paper for each job. The electronic sort function is also called "collate function", and since the core section 206 has the mass memory section 613, the discharge order can be changed to a buffered page order using the memory section 613 (for example, input image data are read in an order reverse to that in which the data have been input or a necessary portion of the data is repeatedly read to prepare a plurality of output copies).

The finisher section 210 further has a grouping function of sorting sheets of recording paper for each page. If sheets of recording paper are to be discharged onto a stack tray 1102, the sheets to be discharged onto the stack tray 1102 can be stored for each job so as to be bound by a stapler 1105 immediately before they are discharged. Further, before the above described discharge tray (the sample tray 1101 or the stack tray 1102) are provided a Z folding mechanism 1104 for folding paper in the form of the character Z and a puncher 1106 for punching paper for filing. The Z folding mechanism 1104 and the puncher 1106 can execute their own processes depending on the type of the job. A saddle stitcher 1107 binds recording paper at two positions in a central portion thereof and then causes rollers to sandwich the central portion therebetween to fold the recording paper in half to thereby create a booklet such as a weekly magazine or a pamphlet. The recording paper book bound by the saddle stitcher 1107 is discharged onto a booklet tray 1108. An inserter 1103 supplies recording paper set on a feeding tray 1110 to one of the discharge trays 1101, 1102, and 1108 instead of feeding it to the printer. This enables the sheet of recording paper set on the inserter 1103 to be inserted between sheets of recording paper fed to the finisher section 210. Sheets of recording paper are set on the discharge tray 1110 of the inserter 1103 by a user in a fashion facing upward, and a pickup roller 1111 feeds the sheets of recording paper therefrom starting with a top sheet. Accordingly, by directly conveying the recording paper from the inserter 1103 to the discharge tray 1101 or 1102, it is discharged in a downwardly facing fashion. When the recording paper is to be conveyed to the saddle stitcher 1107, it is first fed toward the puncher 1106, switched back, and then fed to the saddle stitcher 1107 so as to face in the appropriate direction.

Although not shown, a binding function using a glue or a trimming function of trimming, after binding, ends of sheets opposite to the binding side in such a manner that the ends are flush with one another can be provided as required.

FIG. 14 is a block diagram showing the detailed construction of the document server 102. The document server 102 can remotely execute management of various devices (103, 104, 105, 106, and others) connected to the document server 102 via-data communication paths, arbitration among them, control of them, and other processes. A printing job input from the first NIC 111 or the SCSI 114 is supplied to an input job control section 1202 via an input device control section 1201. The input control section 1202 manages a list of jobs requested by the client 103 or the like and creates a job list to access individual printing jobs supplied to the document server 102. Furthermore, the input job control section 1202 has a job routing function of determining an output route for a printing job, a job splitting function of determining whether or not a printing job is to be divided or split depending on its printing attribute so as to be expanded into bit map data, that is, whether or not RIP (Rasterize Image Processing) is to be carried out, and a job scheduling function of determining the order in which printing jobs are executed.

A printing job output from the input job control section 1202 is supplied to rasterize image processing (RIP) sections 1203a, 1203b, . . . . That is, there are a plurality of RIP sections 1203 such that parts of the printing job obtained by splitting it depending on the number of divisions determined by the input job control section 1202 are supplied to the RIP sections 1203a, 1203b, . . . , which then carry out predetermined RIP. That is, the RIP sections 1203 subject PDL data of various printing jobs to the RIP to create bit map data of appropriate size and resolution (this will be described later). The RIP can use various formats such as PostScript (Adobe, USA), PCL, TIFF (Tag Image File Format), JPEG, and PDF (Portable Data Format).

A data converting section 1204 then compresses the bit map data created through the RIP by the RIP section 1203 or converts the format of the data to select an optimal image data type compatible with the output device 104, 105, or 107. If, for example, the printing job is to be processed for each page, the RIP section 1203 rasterizes the JIEF, the JPEG, or the like, and the data converting section 1204 executes a process such as addition of a PDF header to the rasterized bit map data or edition thereof into PDF data.

An output control section 1205 detects image data for each page of the printing job, determines how the image data are to be processed based on command settings, and controls the determined processing. The image data are transferred to an output device control section 1206 or stored in an image disk 1207. In this regard, it can be determined whether or not the processed job is to be saved in the image disk 1207, and if it is to be saved, it can be read again.

The output device control section 1206 determines an output device or devices to which the printing job is to be output and controls outputting the printing job to the determined output device or sets clustering for the determined output devices (the clustering refers to a mode where a plurality of output devices are connected together so as to concurrently execute printing. For example, an image forming apparatus is caused to print the first to fiftieth pages of printing data of 100 pages, and another image forming apparatus is caused to print the fifty-first to hundredth pages. Alternatively, if 100 copies of printing data of 10 pages are to be prepared, an image forming apparatus is caused to print 50 copies, and another image forming apparatus is caused to print the remaining 50 copies. In this manner, in this mode, printing data output from a single source of image data are distributed to a plurality of image forming apparatuses for printing.), and transfers the printing job to the second NEC 112 or/and the exclusive I/F 113.

In this case, the output device control section 1206 monitors a state of the output device or devices to obtain a device status.

Next, the above described PDL data will be explained. The PDL is classified into three elements:

(1) Description of images in character codes (character information)
(2) Description of images in graphic codes (graphic information)
(3) Description of images in terms of raster image data (raster image information)

That is, the PDL means a language describing an image comprised of a combination of the above elements, and data described in the PDL are PDL data.

FIG. 15A shows an example of description of character information 1301.

L1311 is a description for designating a character color (char_color), and 0.0, 0.0, 0.0, 1.0 in parentheses sequentially indicate the densities of cyan, magenta, yellow, and black. That is, for the character color, "0.0" represents a minimum density, while "1.0" represents a maximum density. Accordingly, the present embodiment shows a case where the character color L1311 is set as black.

L1312 indicates that a string to be printed is written as a variable (string 1). The present embodiment shows a case where a string "IC" is written as the variable (string 1).

L1313 indicates a string layout (put_char) and in the present embodiment, (0.0, 0.0, 0.3, 0.1, string 1) is written as the string layout. That is, if the parameters written as the string layout L1313 are referred to as first to fifth parameters, the first and second parameters (0.0, 0.0) indicate start position coordinates (X, Y) on recording paper on which the string "IC" is to be printed, the third parameter (0.3) indicates the size of the characters, the fourth parameter (0.1) indicates the character spacing, and the fifth parameter (string 1) indicates the string "IC" to be printed. Accordingly, the character information R1301 causes the string "IC" to be printed from coordinates (0.0, 0.0) on the recording paper with a character size of 0.3 and a character spacing of 0.1.

FIG. 15B shows an example of description of graphic information R1302.

L1321 indicates a line color (line_color) and in the present embodiment, (1.0, 0.0, 0.0, 0.0) is written as the line color, and thus cyan is designated.

L1322 indicates a line layout (put_line), and in the present embodiment, (0.9, 0.0, 0.9, 1.0, 0.1) is written as the line layout. If the parameters written as the line layout L1322 are referred to as first to fifth parameters, the first and second parameters (0.9, 0.0) indicate line start point coordinates (X1, Y1) on recording paper, the third and fourth parameters (0.9, 1.0) indicate line end point coordinates (X2, Y2) on recording paper, and the fifth parameter (0.1) indicates the thickness of the line.

FIG. 15C shows an example of description of raster image information R1303.

L1331 indicates that a raster image to be printed is written as a variable (image 1). In the present embodiment, (CMYK, 8, 5, 5, C0, M0, Y0, K0, . . . , C24, M24, Y24, K24) is written as the variable L1331 (image 1). If the parameters written as the variable (image 1) are sequentially referred to as a first parameter, a second parameter, . . . , the first parameter (CMYK) indicates the image type of the raster image and the number of color components thereof, the second parameter indicates the number of bits per color component, the third and fourth parameters (5, 5) indicate the image sizes of the raster image in X and Y directions, and the fifth and subsequent parameters (C0, M0, Y0, K0, . . . , C24, M24, Y24, K24) indicates raster image data. The number of data in the raster image data equals the number of color components constituting one pixel multiplied by the image sizes in the X and Y directions. Consequently, in the present embodiment, the raster image is comprised of four color components including cyan, magenta, yellow, and black, so that the raster image data contains 100 (=4×5×5) data.

L1332 indicates an image layout (put_image) and in the present embodiment, (0.0, 0.5, 0.5, 0.5, image 1) is written as the image layout. If the parameters written as the image layout L1332 are referred to as first to fifth parameters, the first and second parameters (0.0, 0.5) indicate start position coordinates (X3, Y3) on recording paper on which the image data are to be printed, the fourth parameter (0.5) indicates the size of the image data, and the fifth parameter (image 1) indicates the printed image data. Accordingly, the raster image information R1303 causes the image data image 1 to be printed from coordinates (0.0, 0.5) on the recording paper with a size of 0.5×0.5.

Figure 16:
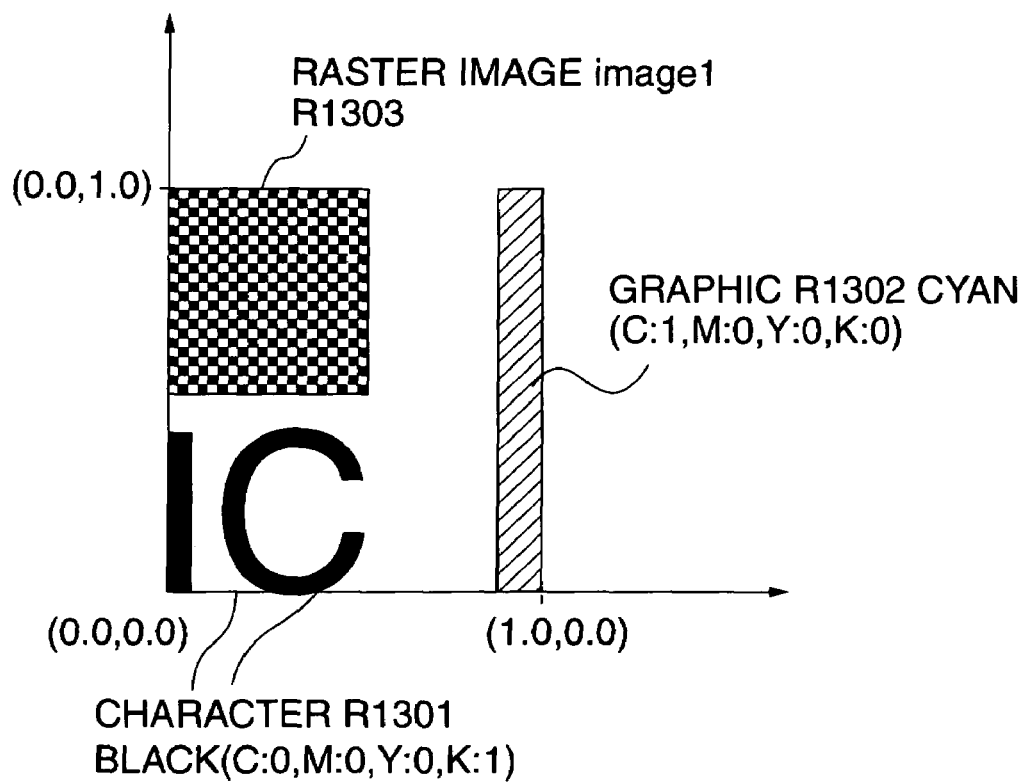
FIG. 16 is a view showing PDL data after rasterization.

FIG. 16 shows how the PDL data comprised of the above described character information R1301, graphic information R1302, and raster image information R1303 are interpreted and rasterized, that is, subjected to the RIP.

These image data have been expanded into a RAM 1208 or the image disk 1207 for each of CMYK color components. For example, for the character information R1301, C=0, M=0, Y=0, and K=255 are each written into a corresponding one of the CMYK RAMs 1208, and for the graphic information, C=255, M=0, Y=0, and K=0 are each written into the corresponding RAM 1208. In the document server 102, the PDL data transmitted from the client 103 or the document server 102, which have been subjected to the PDL data processing or the RIP, are written into the RAM 1208 or the image disk 1207 as they are, and are saved therein as required.

Figure 17:
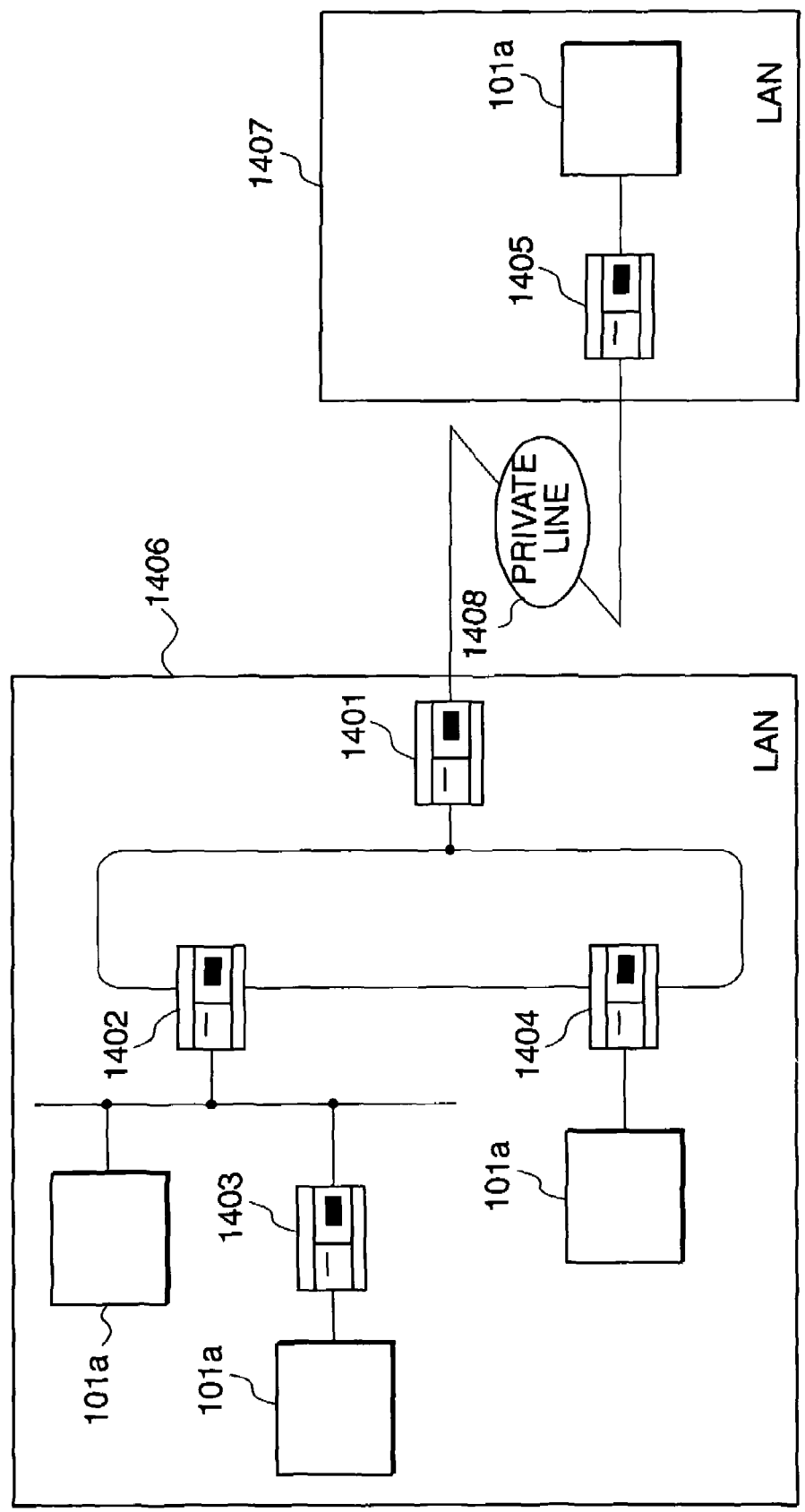
FIG. 17 is a view showing an example of a network connection.

FIG. 17 is a block diagram showing how the public networks 101a are connected to each other.

The public networks 101a are connected to each other via a plurality of routers 1401 to 1404 to constitute a first LAN (Local Area Network) 1406, which in turn connects to a router 1405 to constitute a second LAN 1407. The first LAN 1406 and the second LAN 1407 are connected together via a private line 1408.

Figure 18:
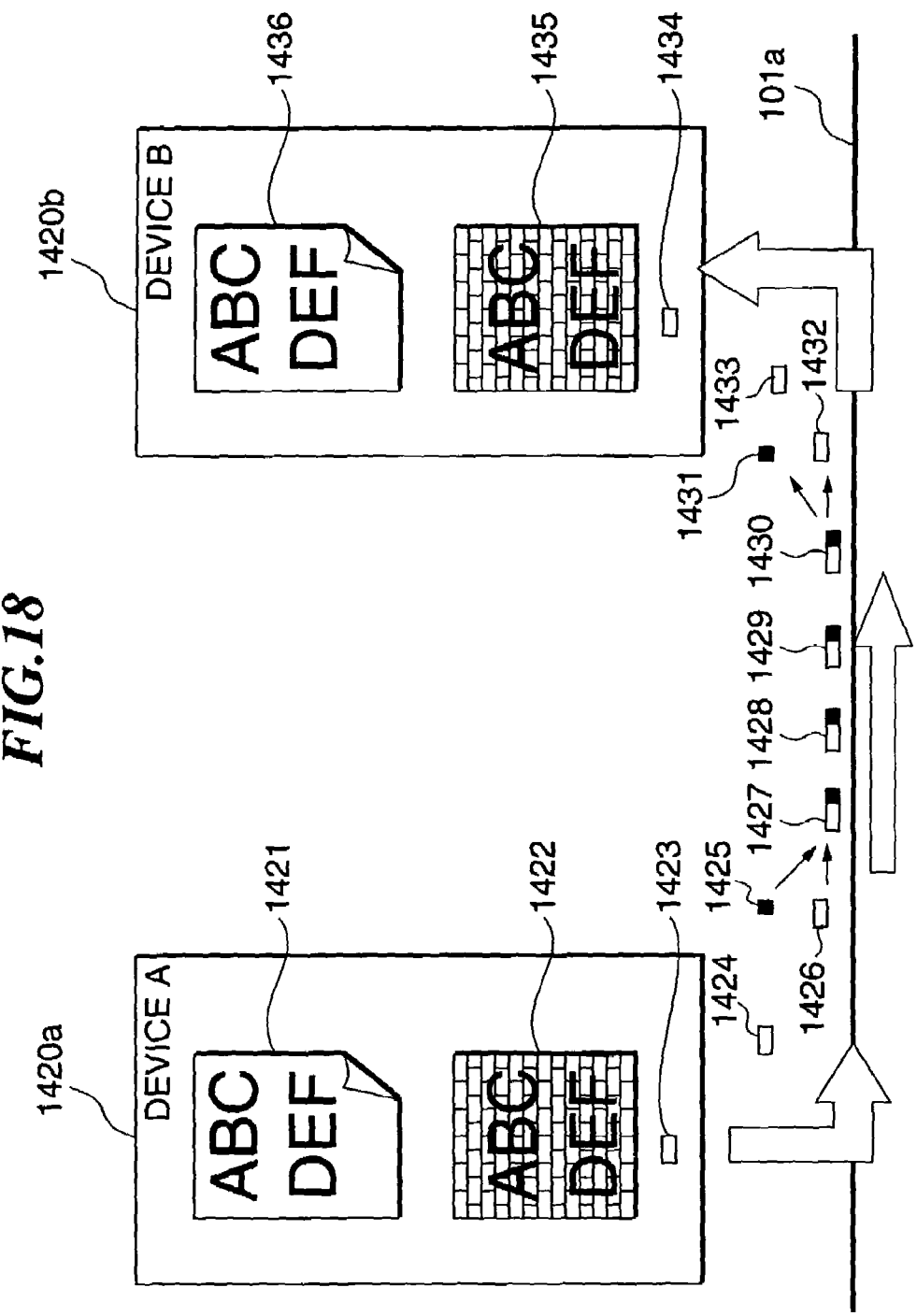
FIG. 18 is a view showing a data transfer for a printing job on a network.

In the public networks 101a connected together as described above, as shown in FIG. 18, if, for example, data 1421 from a source device 1420a (device A) are to be transferred to a destination device 1420b (device B), regardless of whether they are image data, the PDL data, or program data, the data 1421 are divided into a group of split data 1422, and split data 1423, 1424, and 1426 each have a destination address (if the TCP/IP protocol is used, the IP address of the destination) added to a header 1425 thereof. The split data each with the destination address imparted are sequentially transmitted over the network 101a as packets 1427.

When the address of the device 1420a matches a header 1431 of a packet 1430, data 1432 is separated from the header and recovered to a data state in the device 1420a.

Figure 19:
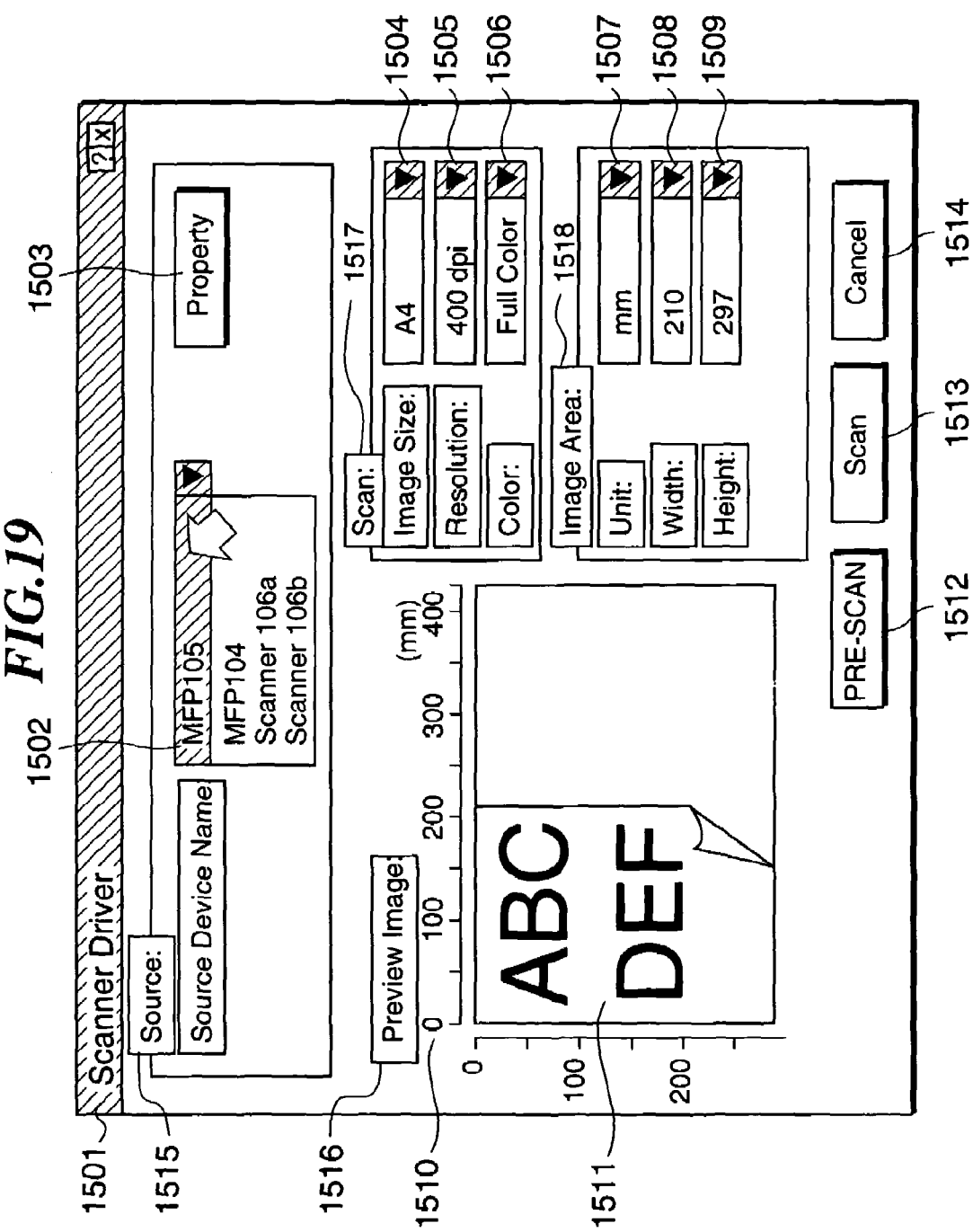
FIG. 19 is a display screen view showing a user interface for a scanner driver.

FIG. 19 shows a user interface for a scanner driver which is installed in the document server 102 or the client 103 and displayed on a display screen to drive the scanners 106a and 106b and on which display screen the user can set and designate desired parameters to convert images into data.

That is, reference numeral 1501 denotes a scanner driver window comprised of a source device display section for displaying a source of image data, a preview image display section 1516 for previewing an input image, a read attribute display section 1517 for displaying a read attribute of a read image, and an image area display section 1518 for displaying an image area of the read image.

The source device display section 1515 is comprised of a source device selection display section 1502 for selecting the source device of the image data, and a property key 1503 for setting details of the selected source device. In the source device selection display section 1502, the scanner 106a or 106b or the MFP 104 or 105 is generally selected but a digital camera or the like may be selected. Further, when the property key 1503 is operated (clicked with a pointing device such as a mouse), a different window is displayed in a fashion overlapping the display screen, so that setting information unique to the device can be input or a special image process (for example, a character mode/photograph mode) can be selected to make it possible to input an image in a process mode compatible with the input or selected information.

The read attribute display section 1517 is comprised of an image size display section 1504 for selecting and designating an image size, a resolution input section 1505, and a color mode setting section 1506.

Further, in the image area display section 1518, a unit setting section 1507 designates a length unit for the read image, an image width setting section for designating a width dimension for the image data, and an image height setting section 1509 for designating a height dimension for the image data.

When the user uses the above described setting sections 1504 to 1509 to make desired settings and then operates a prescanner 1512, the document server 102 or the client 103 commands the device selected in the source device selection display section 1502 to perform a read operation, and the device selected in the selection display section 1502 receives the command for the read operation to start inputting the image. In this prescan operation, the image data are read with a resolution set to a lower value than that in a main or production scan, and the obtained image is displayed in the preview image display section 1511 as a preview image. The preview display is performed on a scale 1510 depending on the setting status of the unit setting section 1507 of the image area display section 1518.

Figure 20:
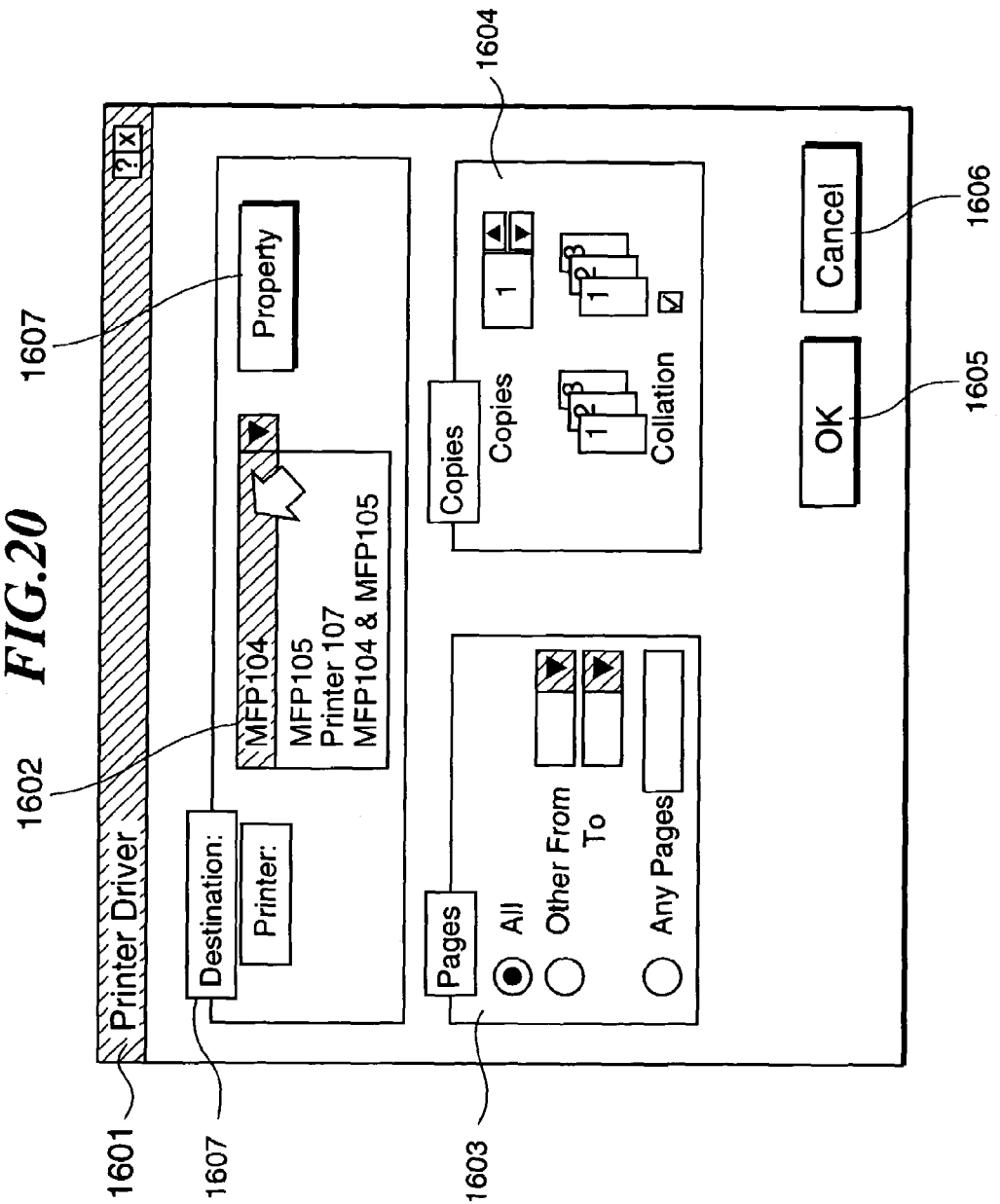
FIG. 20 is a display screen view showing a user interface for a printer driver.

If the user determines the preview image to be "OK", he operates a scan key 1513 to read image data in accordance with the setting in the resolution setting section 1505 at a resolution of, for example, 400 dpi. If the user determines the preview image to be "NG", he operates the prescan key 1512 again to check the image data to be read and operates a cancel key 1514 to stop or suspend the read operation. FIG. 20 shows a user interface for a printer driver, which is installed in the document server 102 or the client 103 and displayed on the display screen to drive a destination device such as the printer 107 or the like and on which display screen the user can set and designate desired parameters to transmit a desired image to the destination device.

That is, reference numeral 1601 denotes a printer driver window comprised of a destination device selection display section for selecting a destination, a page setting display section 1603 for selecting an output page of image data in the printing job, and a copy number setting display section 1604 for designating the number of copies.

The destination device display section 1607 is comprised of a destination device display section 1602, and a property key 1607 for setting detailed printing conditions for a destination device. In the present embodiment, the destination device display section 1602 shows a case where the MFP 104 has been selected from destination device candidates (the MFPs 104 and 105, the printer 107, a combination of the MFPs 104 and 105 (cluster print).

When the user operates the property key 1607, a different window is displayed in a fashion overlapping the display screen, so that setting information unique to the device can be input or parameters for a special image process, for example, those for the gamma converting section 702 or spatial filter section 703 in the printer IP section 207 of the MFP 104 or 105 can be changed to enable finer color reproduction or sharpness adjustments.

The page setting display section 1603 sets an output page for one of images to be printed which have been created by application software running on the document server 102 or the client 103.

When the user thus makes the desired settings and then operates the OK key 1605, printing is started. When he operates the cancel key 1606, the printing is stopped or canceled.

Figure 21:
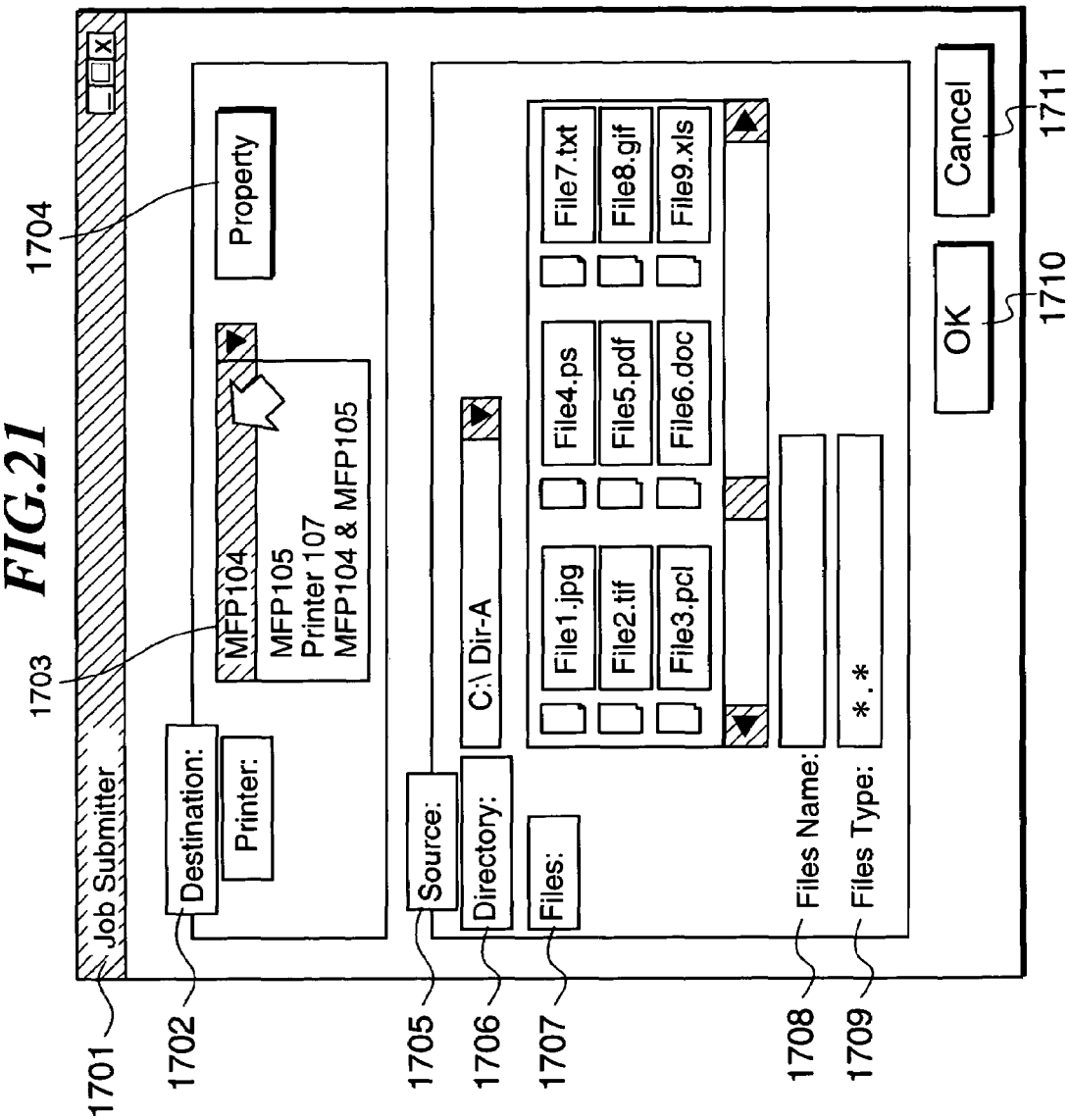
FIG. 21 is a display screen view showing a user interface for a job submitter.

FIG. 21 shows a user interface for a job submitter for transmitting data in various formats directly to the document server 102 from the client 103. This interface is installed in the document server 102 or the client 103 and displayed on the display screen so that the user can set and designate desired parameters on the display screen.

That is, reference numeral 1702 denotes a job submitter window comprised of a destination device selection display section 1702 for selecting a destination and a file data display section 1705 for displaying a data format or the like of a file transmitted to the document server 102.

The destination device display section 1702 is comprised of a destination device display section 1703, and a property key 1704 for setting detailed printing conditions for a destination device. In the present embodiment, the destination device display section 1703 shows a case where the MFP 104 has been selected from destination device candidates (the MFPs 104 and 105, the printer 107, a combination of the MFPs 104 and 105 (cluster print).

The file data display section 1705 is comprised of a directory setting section 1706 for designating a storage location in a storage medium of the apparatus where a printing job to be processed is saved, a data format display section 1707 for displaying the data format of each file contained in the printing job, a file name display section 1708 for displaying a file name, and a file type display section 1709 for displaying a file type.

The user checks the setting contents, and if they are correct, operates an OK key 1710 to transmit the printing job directly to the document server 102. To cancel the setting contents, the user operates a cancel key 1711 to stop or suspend the operation.

That is, while the above described print driver uses an application on the client 103 to start up the data to thereby convert them into a predetermined format and then transfers the converted data to the document server 102, the job submitter can transmit a file on the client 103 directly to the document server 102.

Figure 22:
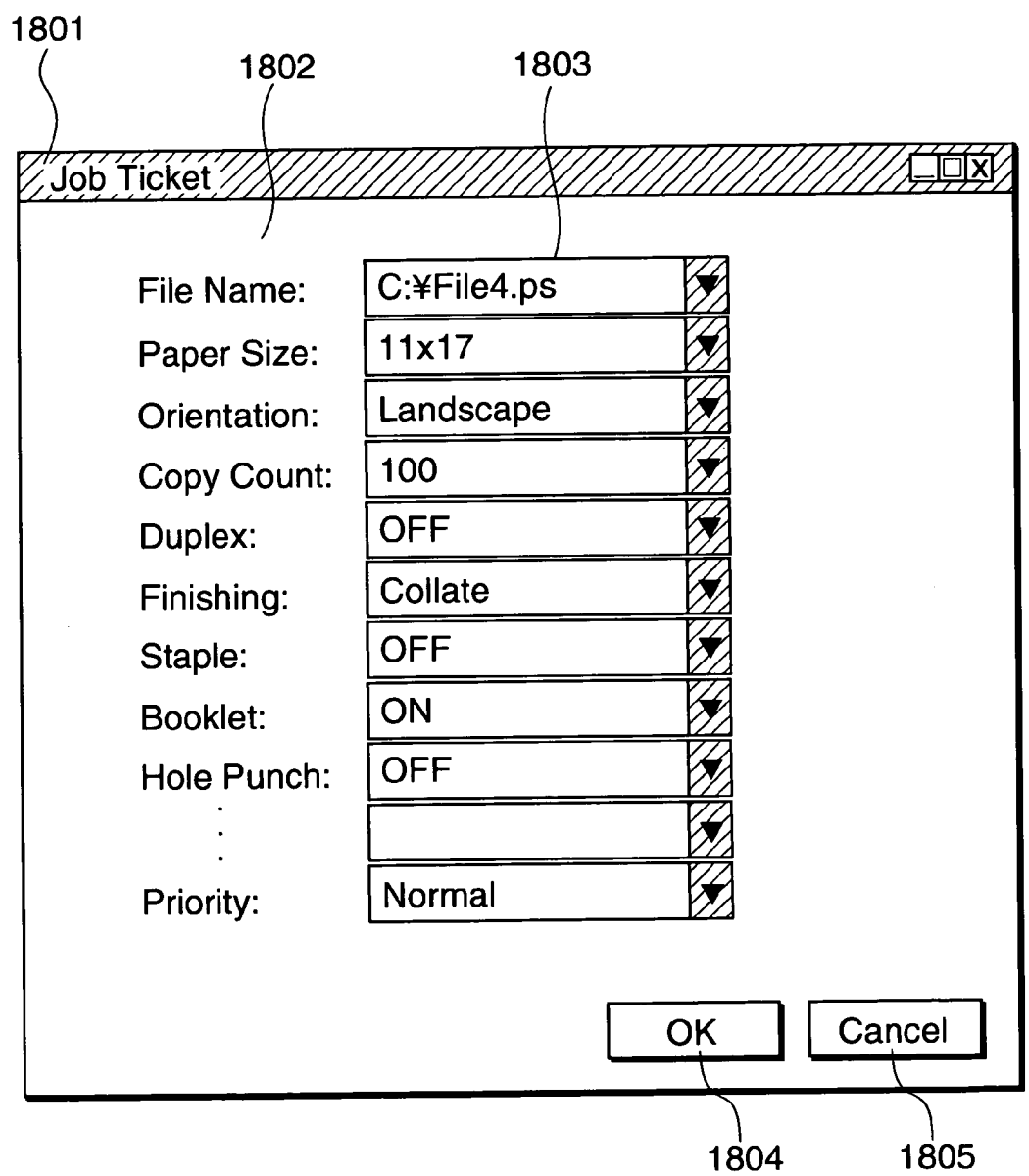
FIG. 22 is a display screen view showing a user interface for a job ticket.

FIG. 22 shows a display screen for a job ticket which displays printing conditions for the destination device. The display screen is displayed by actuating the property key 1607 or 1704 of the print driver (FIG. 20) or job submitter (FIG. 21), respectively.

A job ticket window 1801 is comprised of a setting item section 1802 for the destination device (for example, the color MFP 104), and a setting item display section 1803 for allowing the user of the client 103 to select and designate setting contents in a fashion corresponding to each setting item 1802.

The setting item section 1802 shows the names of setting items required for the printing conditions for the output device, such as image processing parameters, the number of copies, a recording paper size, and a finishing function so that the user can arbitrarily set the printing conditions. Those of the setting items which are not included in the output device are not displayed. If, for example, the output device without a duplex printing function is selected, a duplex printing section is not displayed.

In default setting items, settings which are frequently used are displayed. For example, the duplex printing section (Duplex) can be set to ON or OFF so that the ON setting enables the duplex printing whereas the OFF setting enables single-side printing. Since, however, the single-side printing is more frequently used than the duplex one, the OFF is selected and displayed as a default.

The user checks the setting contents and if they are correct, operates an OK key 1804 to transmit the printing job (including command data indicative of commands input by the user via the operation screens shown in FIGS. 20, 21, 22, and other figures, image data to be printed, and other data) directly to the document server 102. On receiving the printing job, the document server 102 controls the MFPs 104 and 105 to perform operations based on the commands from the user. To cancel the setting contents of the job ticket, the user can operate the cancel key 1805 to stop or suspend the process. The user can also make various settings for clustering, described later, as well as other settings (including various operation modes described later with reference to FIGS. 27, 28, 33, 35, 36, and other figures), using operation screens such as those shown in FIGS. 20, 21, and 22.

In the present embodiment, the NIC section 205 of each of the MFP 104 and 105 and a network I/F section (not shown) of the printer 107 have a standardized database called "MIB (Management Information Base)", and the above components can communicate with the document server 102 or the client 103 via an SNMP (Simple Network Management Protocol) as a network management protocol to enable devices on the networks 101a and 101b to exchange data.

For example, all static information can be obtained such as facility information on the MFPs 104 and 105, device status, network settings, the progress of jobs, and management and control of operation status; for example, functions of the finisher section 210 connected to the MFP 104 or 105 can be detected as the facility information on the MFPs 104 and 105, and whether or not an error or a jam is occurring, whether the device is printing or is idle, etc. can be detected as the device status (status information).

Figure 23:
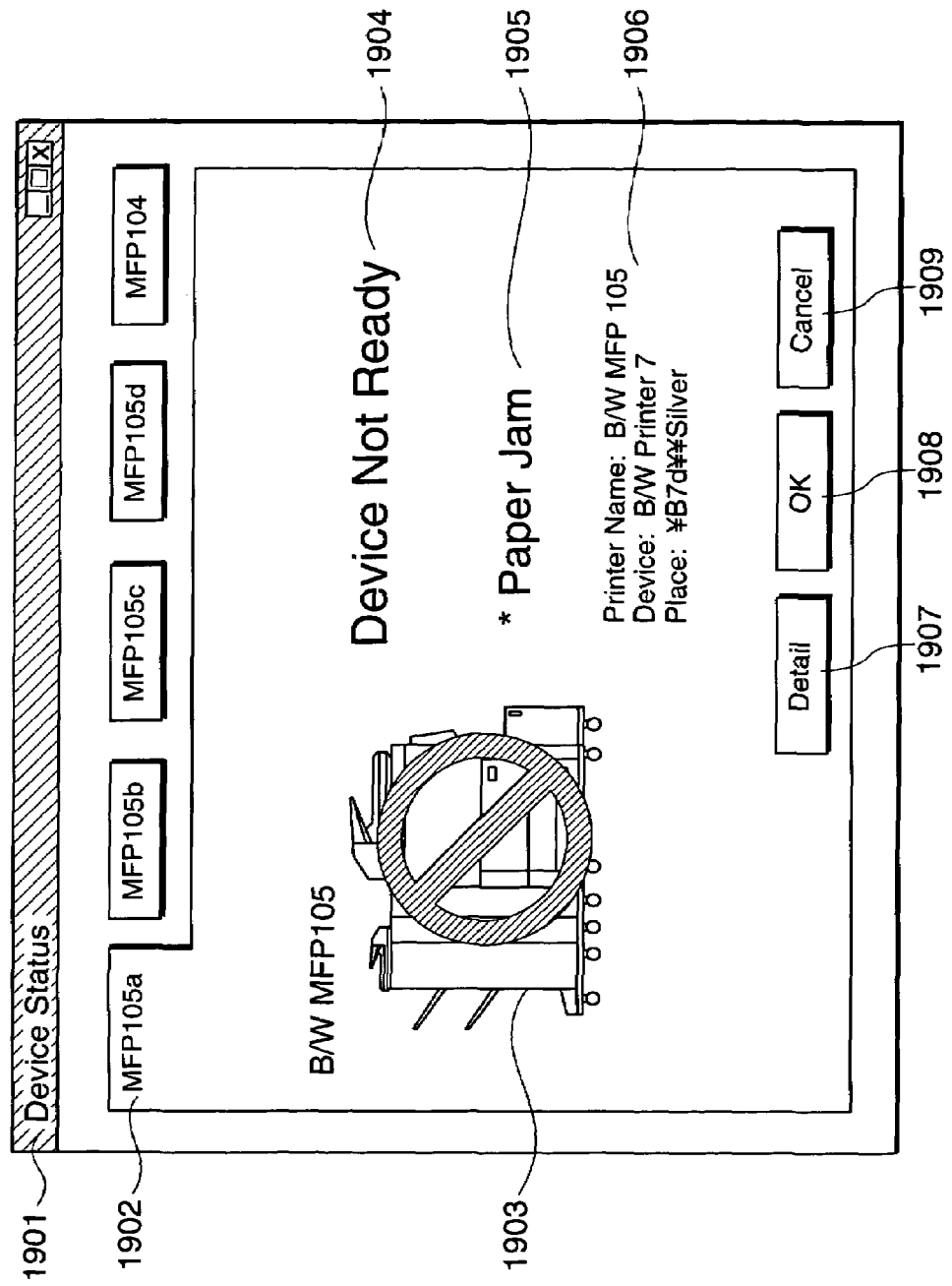
FIG. 23 is a display screen view showing a user interface for a device status.

FIG. 23 shows a user interface for the device status.

Reference numeral 1901 denotes a device status window, showing that the first monochrome MFP 105a has been selected as the destination device. The facility information on the first monochrome MFP 105a is displayed in a graphic display section 1903, the printer name, the device name, and others of the first monochrome MFP 105a are displayed in a device specification display section 1906, and the device status is displayed in device status display sections 1904 and 1905. In the present embodiment, the window shows that the destination device is not ready and that recording paper is jammed. The user of the client 103 can thus check information of a remote device such as the MFP 104 or 105.

Further, by actuating a detailed display key 1907, the user can display details of the facility information in a different window. If the device status indicates no problem, the user operates an OK key 1908 to start printing. If the device status indicates an error, the user operates a cancel key 1909 to stop or suspend the process.

FIG. 24 shows a user interface for a job status.

Reference numeral 2001 denotes a job status window comprised of a job status display section 2002 for displaying the status of printing jobs saved in the document server 102, a printing status display section 2003 for displaying the status of printing jobs transferred to the output device, and a finished job display section 2004 for displaying the histories of printing jobs that have been processed. The job status display section 2002 displays "Waiting" indicating that the RIP has not been started or "Ripping" indicating that the RIP is in progress, and after the RIP, the job status is passed to the printing status.

The finished job status section 2004 displays the histories of printing jobs: it displays "Printed" if the printing job has been normally finished or "Canceled" if the printing process has been suspended.

Figure 25:
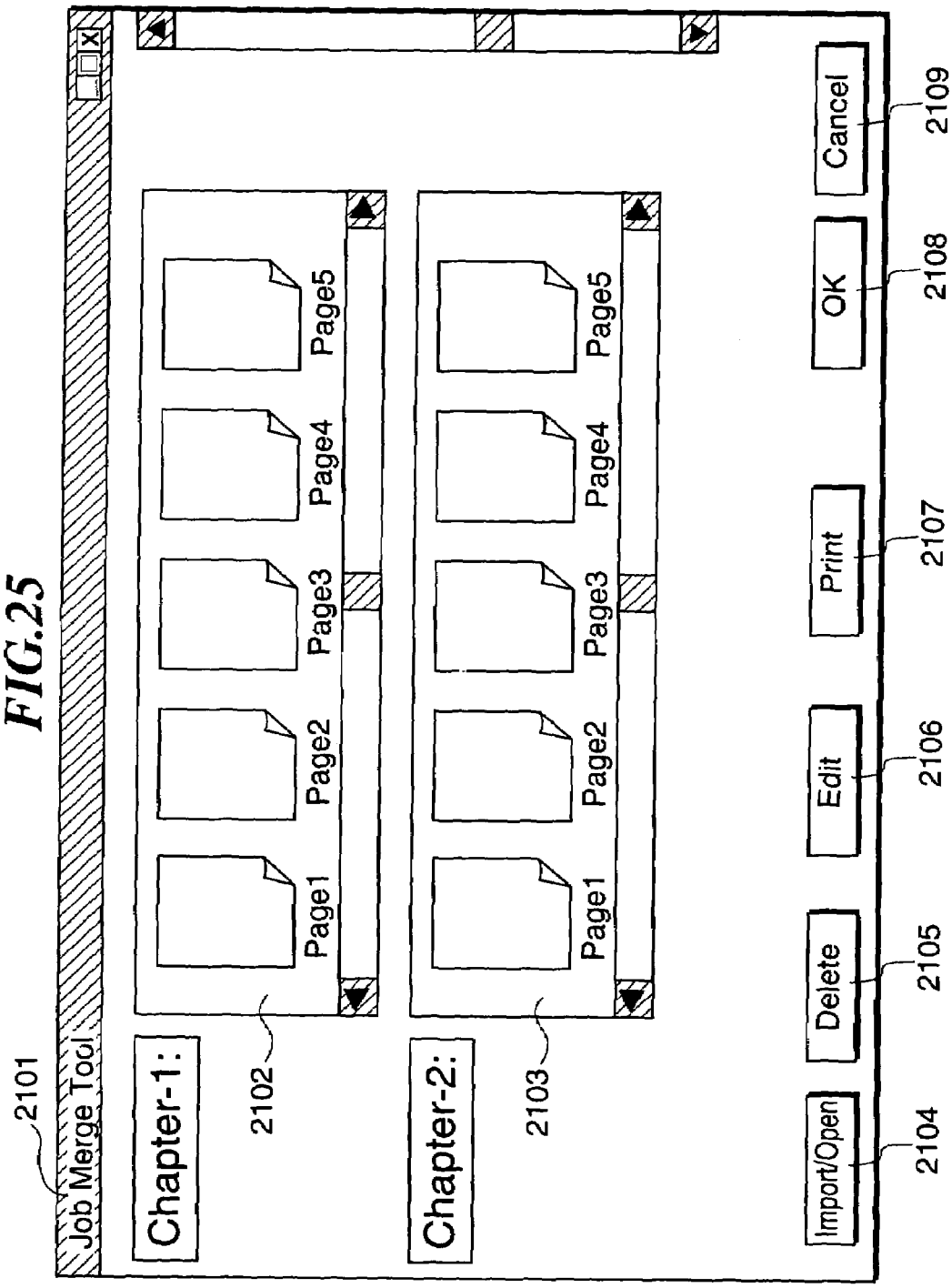
FIG. 25 is a display screen view showing a user interface for a job merge tool.

FIG. 25 shows a user interface for a job merge tool which is displayed on a printing requesting device, for example, the client 103 or the document server 102.

Reference numeral 2101 denotes a job merge window comprised of a first chapter display section (Chapter-1) 2102 for displaying each page of a first file, and a second chapter display section (Chapter-2) 2102 for displaying each page of a second file.

When the user operates an Import/Open key 2104, the first file saved in the document server 102, the client 103, or the like is read and its contents are displayed in the first chapter display section 2102. When the user again operates the Import/Open key 2104, the second file is read from the document server 102, the client 103, or the like and its contents are displayed in the second chapter display section 2103. The second file displayed in the second chapter display section 2103 is thus merged with the first file displayed in the first chapter display section 2102, so that the merged files are printed and output (that is, the plurality of files are bound and output as one printing job). The user then operates the Import/Open key 2104 while scrolling the merge tool window 2101 as required, to display a third file, a fourth file, . . . in a third chapter display section (Chapter-3), a fourth chapter display section (Chapter-4), . . . , thereby merging the files together for output.

A Delete key 2105 is operated to delete a particular chapter or page, and an Edit key 2106 is operated to add a header, a footer, renumbering, or the like to a file. Further, a Print key 2107 is operated to output merged printing jobs by actuating the printer driver to print and output data.

An OK key 2108 is operated to establish a merged status of files for printing jobs, and a cancel key 2109 is operated to stop or suspend the process.

The present image forming system, however, can execute cluster printing (a mode where printing data from a source of image data such as the document server 102, the client 103, or the scanner 106 are distributed to a plurality of image forming apparatuses for printing) where a plurality of output devices, that is, the MFP 104 or 105 or the printer 107 simultaneously print and output data based on a command from the document server 102. For example, of plural pages of printing data included in one group, color data can be printed and output by the color MFP 104, while black-and-white data can be printed and output by the monochrome MFP 105.

The cluster printing includes three types of data splitting transfer method.

(1) Job Splitting Method

This is a printing method of detecting idle output devices and allotting jobs to the output devices always evenly so as to disperse loads on the output devices so that a minimum number of printing jobs must wait, as in a case where a first job is transferred to the MFP 105a while a second job is transferred to the MFP 105b. When the user selects this mode via the above described user interface or the like and transmits, for example, a group of a job A for printing 100 copies of printing data A of 20 pages and a job B for printing one copy of printing data of 200 pages, from the client 103 to the server computer 102, the server computer 102 transfers the job A from the received data to the MFP 105a and the job B to the MFP 105b. Then, the MFP 105a prints 100 copies of the printing data A, while the MFP 105b prints one copy of the printing data B.

(2) Copy Splitting Method

This is a method of evenly assigning copies to be printed in one printing job, to output devices set for clustering (if, however, there is a remainder left, the remainder will be assigned to any of the output devices). When the user selects this mode via the above described user interface and if, for example, 150 copies of printing data C of 20 pages are to be prepared, the server computer 102, for example, causes the MFP 105a to print 50 copies of the printing data C, while causing another MFP 105b to print 50 copies and further MFP 105c to print 50 copies, based on cluster setting data received from the client 103 together with the printing data.

(3) Page Splitting Method

This is a method of evenly assigning pages in one printing job to output devices set for clustering (if, however, there is a remainder left, the remainder will be assigned to any of the output devices as in the copy splitting method). When the user selects this mode via the above described user interface, then based on cluster setting data received from the client 103 together with printing data D of 100 pages, the server computer 102, for example, causes the MFP 105a to print the 1st to 25th pages of the printing data D, the MFP 105b to print the 26th to 50th pages of the printing data D, the MFP 105c to print the 51th to 75th pages, and the MFP 105d to print the 76th to 100th pages.

Figure 26:
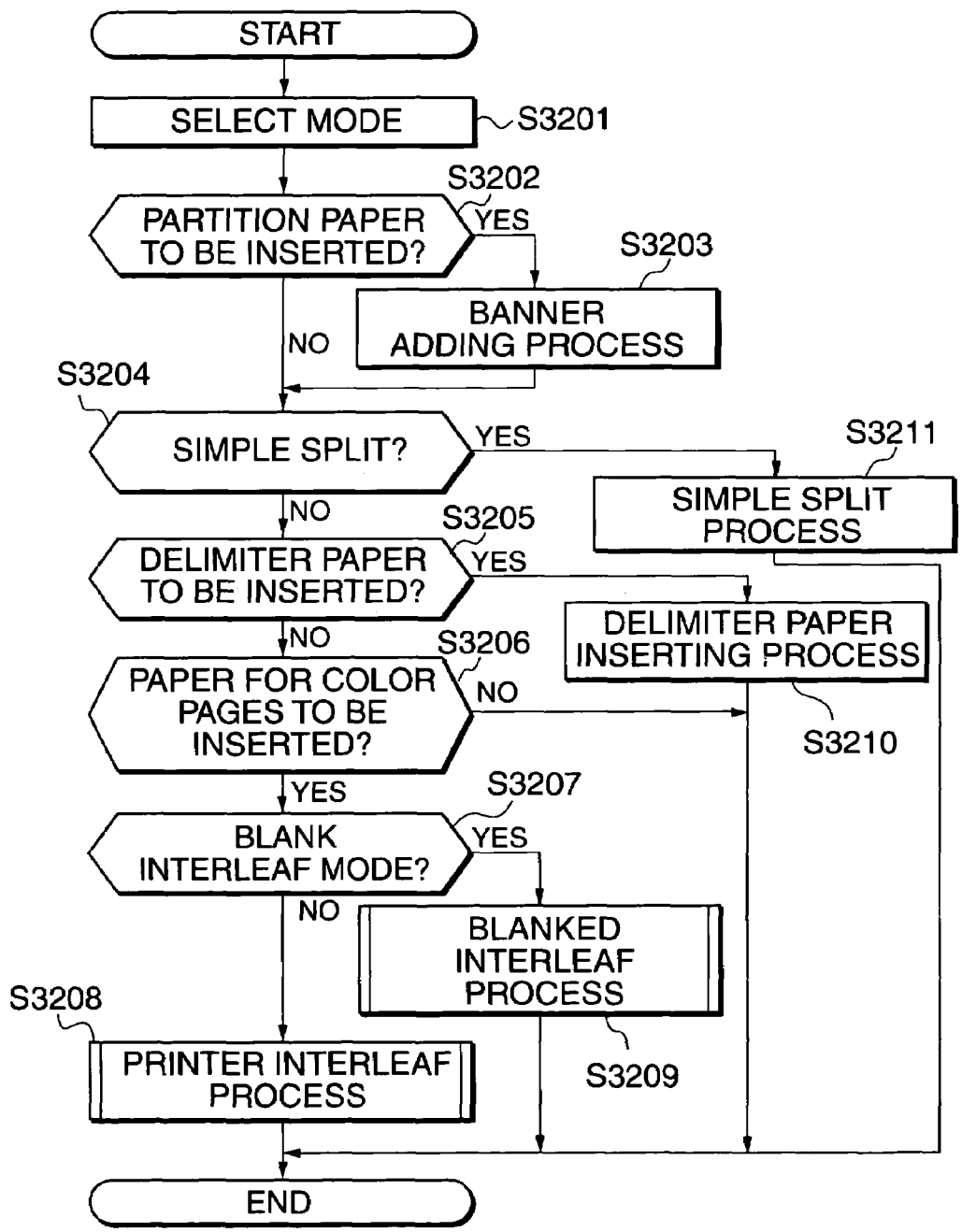
FIG. 26 is a flow chart showing a process procedure of a method of processing image data according to an embodiment of the present invention.

FIG. 26 is a flow chart showing a method of processing image data according to an embodiment of the present invention. The present program is previously stored in a memory in the document server 102 and is read and executed by a CPU thereof.

As a preliminary procedure, when the user select, in the destination device display sections 1607 and 1702, the color/black-and-white cluster print, for example, the color MFP 104 and the monochrome MFP 105 as output devices, using the pointing device, keys, or the like in the user interface (FIGS. 20, 21, etc.) for the printer driver or job submitter displayed on the display screen of the source of image data such as the document server 102 or the client 103, and then instructs starting printing using the OK key, command data from the user including original size data, output paper size data, scale data, output sheet number data, output copy number data, and destination setting data are transmitted with image data to the document server 102 as a printing job.

Then, at a step S3201, a setting mode is selected, and at a subsequent step S3202, it is determined whether or not partition paper is to be inserted between sheets of recording paper, based, for example, on the contents of the command data input by the user via the setting item section 1802 on the job ticket screen shown in FIG. 22. If the result of the determination is negative (No), the process proceeds to a step S3204, whereas if the result is affirmative (Yes), a command for execution of a banner adding process is issued (step S3203), and the process proceeds to a step S3204.

Figure 27:
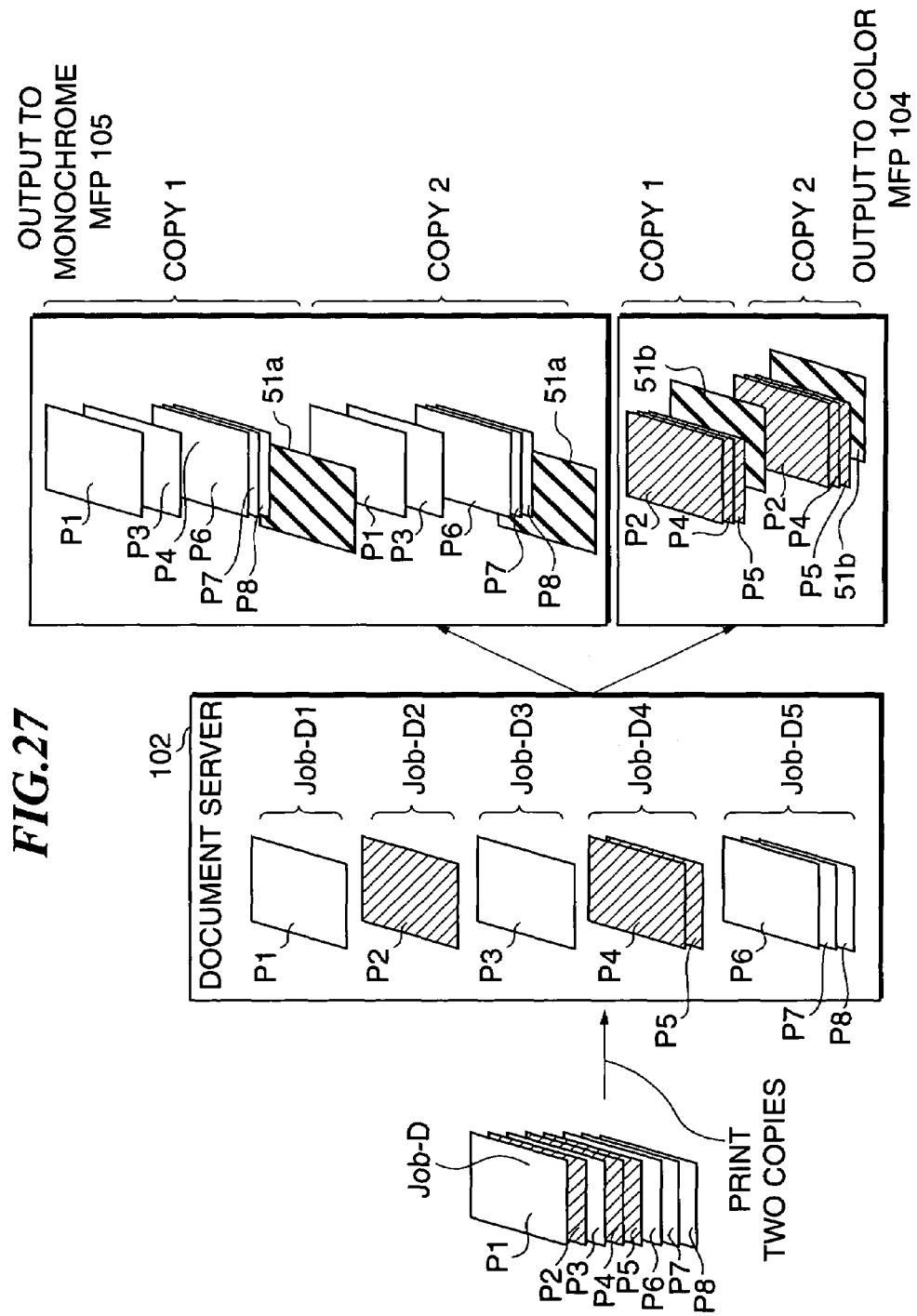
FIG. 27 is a schematic view showing how a banner adding process is carried out.

FIG. 27 is a schematic view showing how the banner adding process is carried out. If the color MFP 104 and/or the monochrome MFP 105 has no sorting mechanism for sorting each printing job, the document server 102 commands the MFP 104 or 105 to insert banner paper (partition paper) between sheets of recording papers to easily discriminate between copies.

For example, as shown in FIG. 27, if two copies of a printing job Job-D of 8 pages comprised of color data and black-and-white data mixed together are to be printed, the document server 102 splits the printing job Job-D into, for example, black-and-white jobs Job-D1 (corresponding to the first page), Job-D3 (corresponding to the third page), and Job-D5 (corresponding to the sixth to eighth pages), and color jobs Job-D2 (corresponding to the second page) and Job-D4 (corresponding to the fourth and fifth pages), as described later.

On the other hand, the first feeding cassettes 934 and 1034 of the color MFP (FIG. 11) and the monochrome MFP 105 (FIG. 12) have recording paper housed therein and on which image data are to be formed, and the second feeding cassettes 1035 of the monochrome MFP 105 has recording paper housed therein to be used as delimiter paper, described later, the recording paper being colored yellow. Thus, if the color MFP 104 and/or the monochrome MFP 105 has no sorting mechanism, banner paper is accommodated in another feeding cassette (not shown) installed in the color MFP 104 or the monochrome MFP 105 or in the feeding tray 1110 of the finisher section 210. The document server 102 issues a command for insertion of banner paper 51a between the black-and-white job Job-D5 for the first copy and the black-and-white job Job-D1 for the second copy, so that the banner paper 51*a* is inserted between the black-and-white job Job-D5 for the first copy and the black-and-white job Job-D1 for the second copy to thereby discharge the recording paper into the feeding tray 1101, 1102, or 1108 of the monochrome MFP 105. Likewise, the document server 102 issues a command for insertion of banner paper 51*b* between the color job Job-D5 for the first copy and the color job Job-D2 for the second copy, to insert the banner paper 51*b* between the color job Job-D5 for the first copy and the color job Job-D2 for the second copy to thereby discharge the recording paper into the feeding tray 1101, 1102, or 1108 of the monochrome MFP 105. One banner page is typically provided for one job, but if a plurality of copies are to be printed, banner paper is inserted between sheets of recording paper for different copies as a separator to further facilitate sorting.

Next, at a step S3204 (FIG. 26), it is determined whether or not the setting mode contained in the command data obtained from the printing requester such as the client 103 is a simple splitting mode, based, for example, on the contents of the command data input by the user via the setting item section 1802 on the job ticket screen shown in FIG. 22 or via another section. If the result of the determination is affirmative (Yes), a simple splitting process is executed (step S3211) to complete the process of the present program. That is, a printing job with color data and black-and-white data mixed therein is split into the color data and the black-and-white data, so that the output devices corresponding respectively to these image data output printing data.

On the other hand, if the result of the determination at the step S3204 is negative (No), the process proceeds to a step S3205 to determine whether or not the setting mode contained in the command data obtained from the printing requester such as the client 103 is a delimiter paper inserting mode, based, for example, on the contents of the command data input by the user via the setting item section 1802 on the job ticket screen shown in FIG. 22 or via another section. If the result of the determination is affirmative (Yes), a delimiter paper inserting process is executed (step S3210) to complete the process of the present program. That is, a printing job with color data and black-and-white data mixed therein is split into the color data and the black-and-white data, followed by putting together each of the color data and the black-and-white data into a set of continuous color data or black-and-white data. Then, delimiter paper, which is colored so as to easily discriminate between the sets is inserted between the set of continuous black-and-white data and the set of continuous color data, and printing data are output from the output device with the delimiter paper inserted therein (refer to a description provided later with reference to FIG. 33).

When the result of the determination at the step S3205 is negative (No), the process proceeds to a step S3206 to determine whether or not the setting mode contained in the command data obtained from the printing requester such as the client 103 is a color page-corresponding paper inserting mode, based, for example, on the contents of the command data input by the user via the setting item section 1802 on the job ticket screen shown in FIG. 22 or via another section. If the result of the determination is negative (No), the process of the present program is immediately terminated. On the other hand, if the result of the determination at the step S3206 is affirmative (Yes), the color page-corresponding paper inserting mode is executed. That is, the printing job with color data and black-and-white data mixed therein is split into the color data and the black-and-white data, and the color data are printed and output by the output device capable of outputting color output data, while as many sheets of recording paper as the color pages are output from the monochrome output device. In this case, those of the image data output from the monochrome output device whose original image data are colored are output on colored recording paper as black-and-white data (refer to a description provided later with reference to FIG. 35).

Specifically, it is determined whether or not the setting mode contained in the command data obtained from the printing requester such as the client 103 is a blank interleaf mode, based, for example, on the contents of the command data input by the user via the setting item section 1802 on the job ticket screen shown in FIG. 22 or via another section. If the result of the determination is affirmative (No), a non-image forming process is executed (step S3209) to complete the process of the present program. That is, for color pages, as many sheets of recording paper as the color pages are output from the monochrome MFP 105 without generating image data, the recording paper being blank and having no image data formed thereon (refer to a description provided later with reference to FIG. 36).

On the other hand, if the result of the determination at the step S3207 is negative (No), the process proceeds to a step S3208 to execute an image forming process to complete the process of the present program. That is, as in the step S3210, colored paper is subjected to black-and-white RIP based on image data corresponding to color data, to thereby change the color data into monochrome data, and the color paper with the monochrome data formed thereon is output from the monochrome MFP 105.

In this manner, the present embodiment allows the user of the printing requester such as the client 103 to select, for example, in the setting item section 1802 of the job ticket shown in FIG. 22, a desired one of a plurality of operation modes including the mode (the processing at the step S3203, the processing at the step S3210, or the processing from the step S3206 to the step S3209) in which when one (for example, the black-and-white MFP 105) of a plurality of MFPs that can be set to clustering is used for printing, the printer of this MFP is operated to insert sheets (for example, colored paper) at positions corresponding to pages to be printed by a different printer (for example, the color MFP 104), the sheets acting as marks when the user mixes all pages together later, and the mode (the processing at the step S3211) for inhibiting the above described insertion process by operating the printer so as not to insert the sheets. The above described mode for inserting the sheets acting as marks when the user mixes all pages together later includes a first insertion mode (the banner sheet inserting mode at the step S3203) described above with reference to FIG. 27, a second insertion mode (the processing at the step S3210) for operating the printer so as to execute the sheet inserting process in a manner shown in FIG. 33, described later, and a third insertion mode (the processing from the step S3206 to the step S3209) for operating the printer so as to execute the sheet inserting process in a manner shown in FIG. 35, described later. The user of the printing requester such as the client 103 can also select one of these modes in the setting item section 1802 on the job ticket screen shown in FIG. 22 or in another section. Further, the above described third insertion mode includes a mode (the processing at the step S3208) for forming a predetermined image on the sheet to be inserted as shown in FIG. 36, described later, a mode (the processing at the step S3209) for inhibiting the predetermined image from being formed on the sheet to be inserted.

The user of the printing requester such as the client 103 can also select one of these modes in the setting item section 1802 on the job ticket screen shown in FIG. 22 or in another section. Each of the MFPs 104 and 105 selects one of the above described plurality of modes for operation, that has been designated by the user. The insertion mode may be selected for each MFP in such a manner that, for example, the black-and-white MFP 105 executes the third insertion mode, while the color MFP 104 executes the first insertion mode. In this case as well, the user may designate the insertion mode for each MFP via the user interface on the screen of the printing requesting PC.

Figure 28:
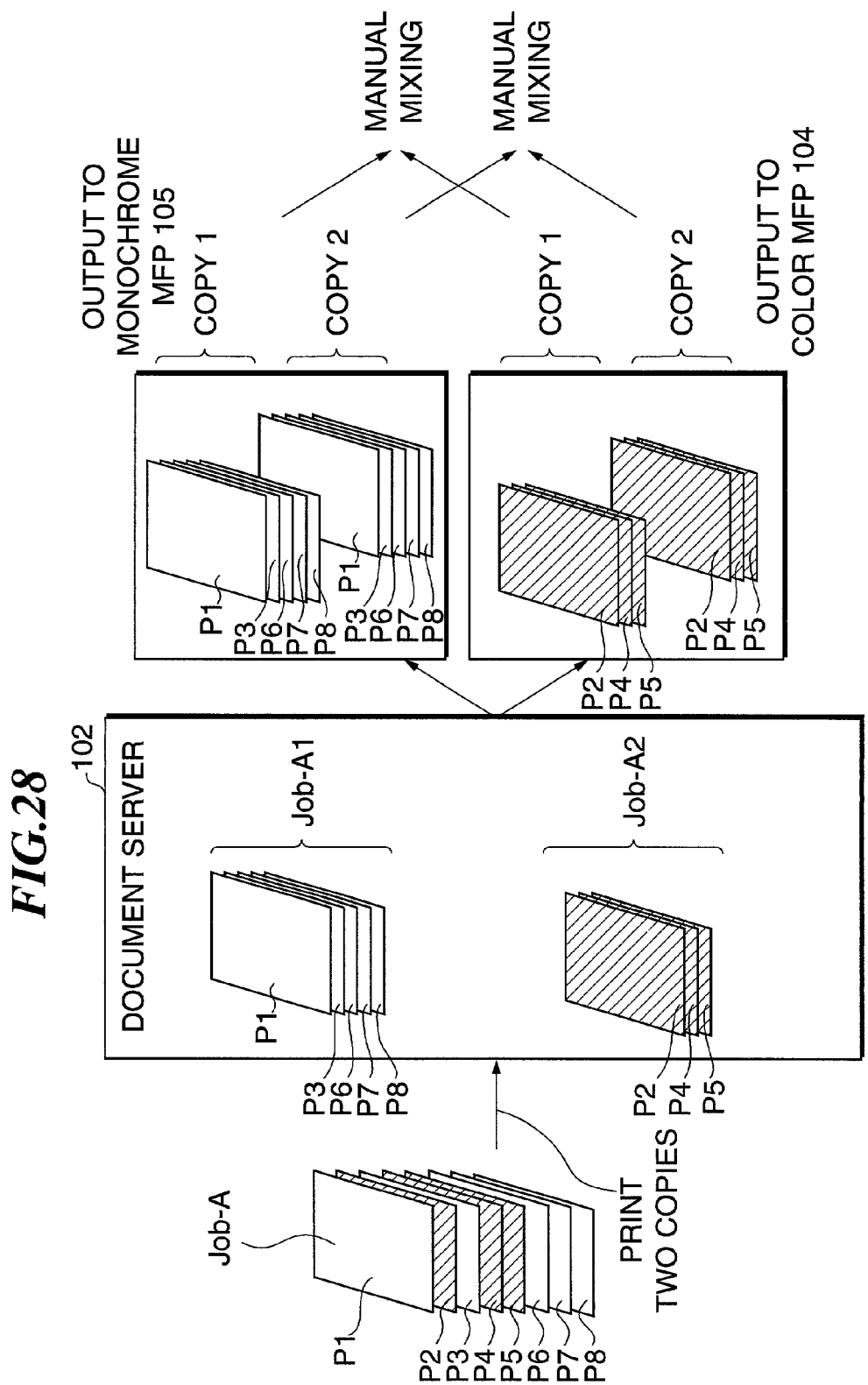
FIG. 28 is schematic view showing how a simple splitting process is carried out.

FIG. 28 is a schematic view showing how the simple splitting process is executed at the step S3211 (FIG. 26). The present embodiment shows a case where the color MFP 104 outputs color data, while the monochrome MFP 105 outputs black-and-white data. A process described with reference to FIG. 28 is carried out if the mode for inhibiting the partition paper or the like from being inserted at positions corresponding to pages to be printed by another MFP is selected.

That is, to print two copies of a printing job Job-A with color data and black-and-white data mixed therein, the document server 102 first splits the printing job Job-A into a black-and-white job (hereafter referred to as "the black-and-white job") Job-A1, and a color image job (hereafter referred to as "the color job") Job-A2. In the present embodiment, the first, third, sixth, seventh, and eighth pages constitute the black-and-white job (Job-A1), and the second, fourth, and fifth pages constitute the color job (Job-A2). Of the printing job split into the black-and-white job Job-A1 and the color job Job-A2, the black-and-white job Job-A1 is transferred to the monochrome MFP 105, and the color job Job-A2 is transferred to the color MFP 104. Printing data for two copies are thus output from each of the monochrome MFP 105 and the color MFP 104. Then, a copy 1 from the monochrome MFP 105 and a copy 1 from the color MFP 104 are manually mixed together, and a copy 2 from the monochrome MFP and a copy 2 from the color MFP 104 are also manually mixed together, thereby obtaining two copies of the printing data.

Figure 29:
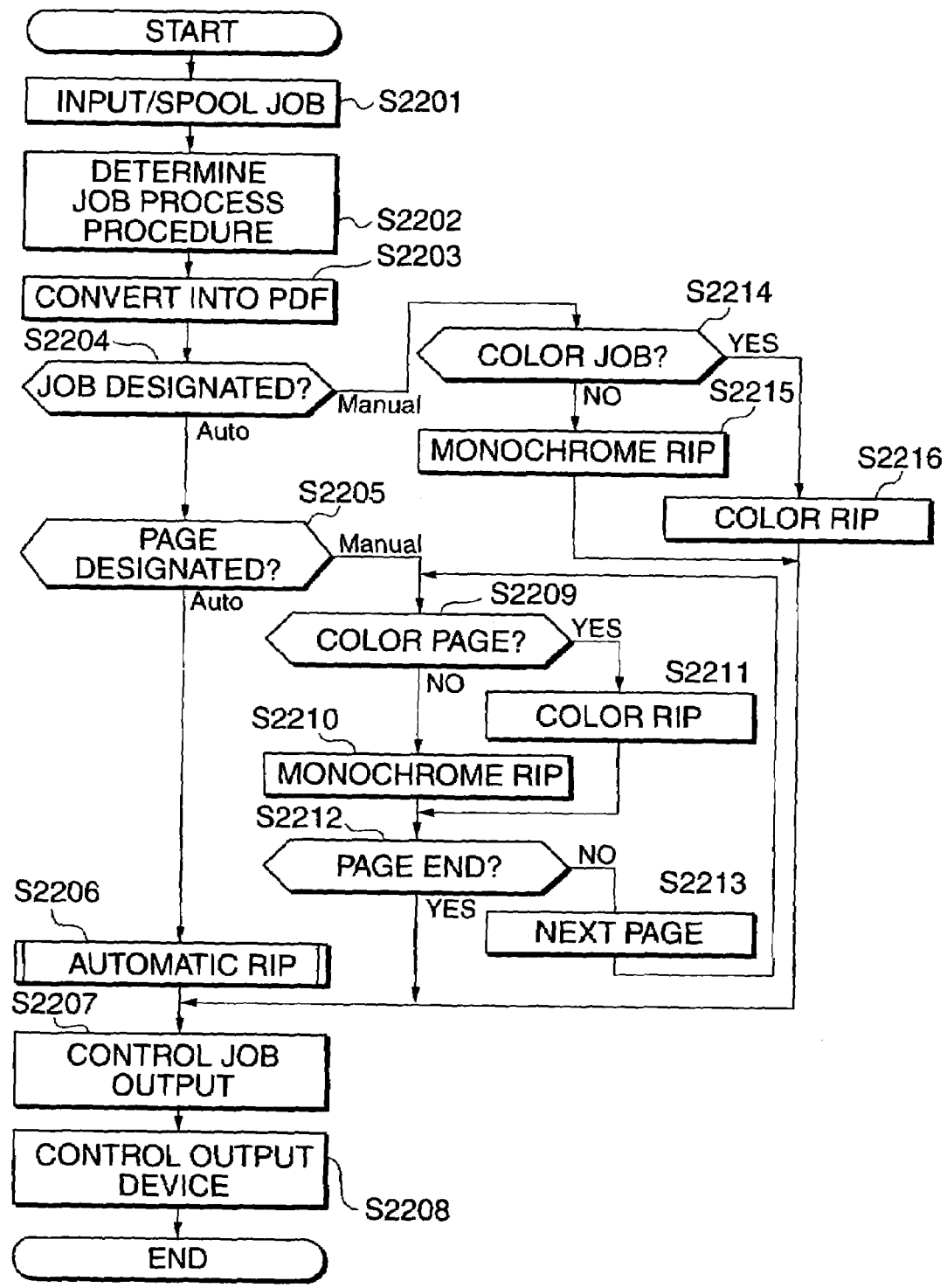
FIG. 29 is a flow chart showing a procedure of the simple splitting process.

FIG. 29 is a flow chart showing a procedure for the above described simple splitting process. At a step S2201, a printing job transferred from the client 103 is input to the input job control section 1202 via the first NIC 111 and the input device control section 1201 and is temporarily spooled therein. Then, at a step S2202, the process procedure is determined taking the priority of the printing job into consideration, and at the following step S2203, the printing job is converted into a format that allows each page to be managed, for example, PDF data so as to enable the RIP for each page. At a step S2204, it is determined whether the printing job has been designated for manual (Manual) processing or automatic (Auto) processing. If it has been designated for the manual processing, the process proceeds to a step S2214 to determine whether or not the entire printing job consists of color data. If the result of the determination is affirmative (Yes), the color RIP is executed (step S2216) and the process proceeds to a step S2207. If the result is negative (No), the black-and-white RIP is executed and the process proceeds to the step S2207. On the other hand, if it is determined at the step S2204 that the printing job has been designated for the automatic processing, the process proceeds to a step S2205 to determine whether a page to be subjected to the RIP has been designated for the manual processing or the automatic processing. If the page to be processed has been designated for the manual processing, the process proceeds to a step S2209 to determine whether or not this page is colored. If the result of the determination is affirmative (Yes), the color RIP is executed (step S2211). If the result of the determination is negative (No), the black-and-white RIP is executed (step S2210). At the following step S2212, it is determined whether or not there is any page to be processed, that is, a page end (last page) has been reached. If the result of the determination is negative (No), the process proceeds to the next page (step S2213) and the processing from the step S2209 to the step S2213 is repeated for each page. Once the RIP has been completed for all the pages, the result of the determination at the step S2212 becomes affirmative (Yes) and the process proceeds to a step S2207.

On the other hand, if the page to be processed has been designated for the automatic processing, the automatic RIP is executed at a step S2206, and the process proceeds to the step S2207. At the step S2207, the output job control section 1205 executes a predetermined control over the output job, and the output device control section 1206 then controls the output device intended to output the job and transfers (transmits) the processed image data to this desired output device.

The black-and-white data are thus output from the monochrome MFP 105 via the second NIC 112, while the color data are output from the color MFP 104 via the exclusive I/F 113.

Figure 30:
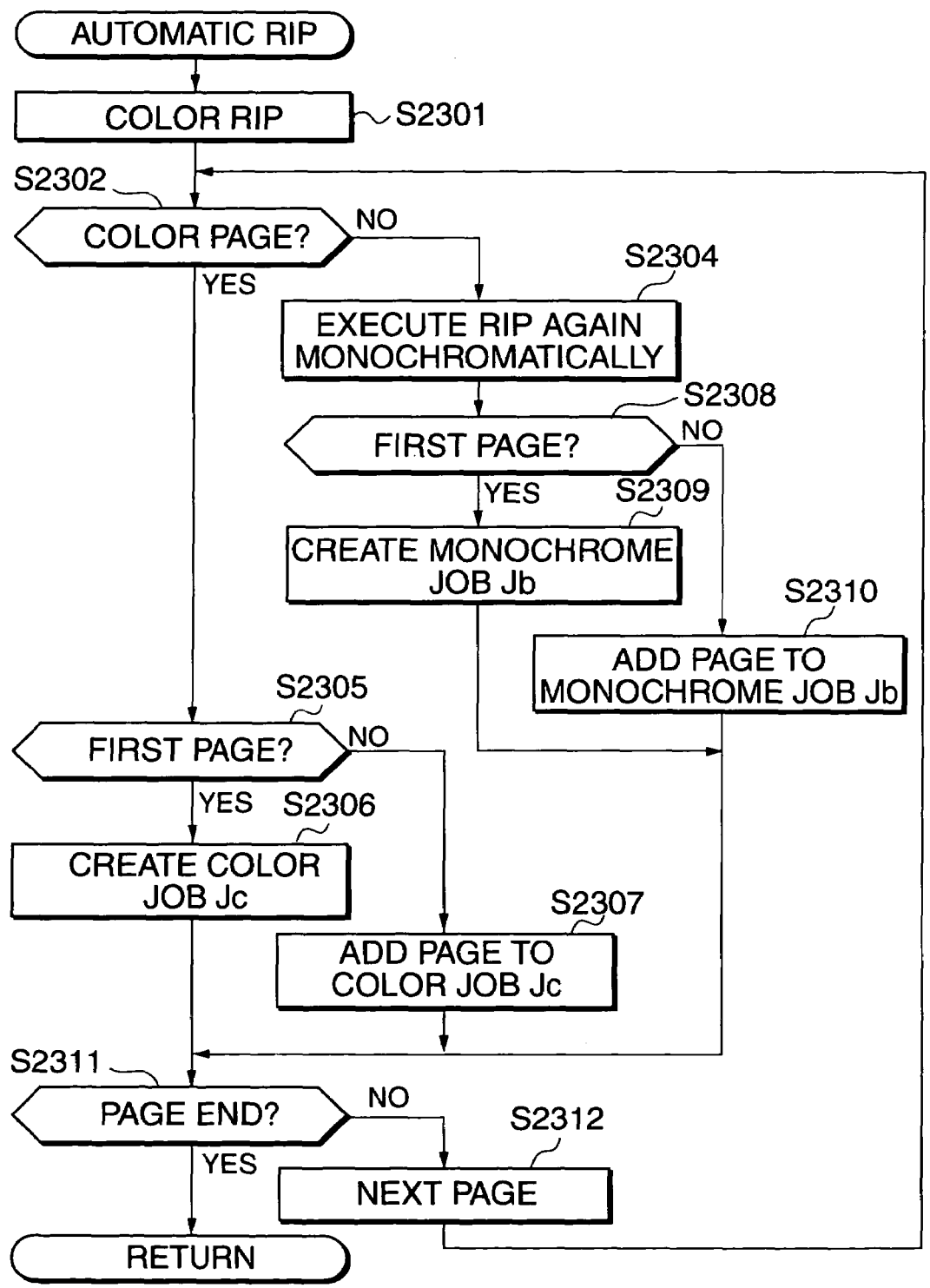
FIG. 30 is a flow chart showing a first embodiment of an automatic RIP routine.

FIG. 30 is a flow chart showing a first embodiment of the automatic RIP routine executed at the step S2206 (FIG. 29). At a step S2301, the color RIP is executed for all the pages of the printing job with a resolution of, for example, 400 dpi, corresponding to that of the color MFP 104. Once the RIP has been completed, the printing data are temporarily stored in the RAM 1208 in the document server 102 in the form of bit map data, so that it can be determined whether each page is colored or black or white. Therefore, it is determined at a step 2302 whether or not the present page is colored, and if the page is colored, it is then determined whether or not the present page is the first page (step S2305). Since the result of the determination at the step S2305 is affirmative (Yes) in the first loop, the process proceeds to the step S2306 to create a new color job Jc (step S2306). If it is determined at a step S2311 that the present page is not the last page, the process proceeds to the next page at a step S2312 to again determine whether or not the present page is colored. If the page is colored, the result of the determination at the step S2305 is negative (No) in the present loop, so that the process proceeds to a step S2307 to add the page to the color job Jc created at the step s2306. The process then proceeds to the step S2311.

On the other hand, if the result of the determination at the step S2302 is negative (No), that is, if the present page is black and white, the process proceeds to a step S2304 to execute the black-and-white RIP with a resolution of, for example, 600 dpi, corresponding to that of the black-and-white MFP 105, and it is determined whether or not the present page is the first page (step S2308). If the present page is the first page, a new black-and-white job Jb is created (step S2309). If it is determined at the step S2311 that the page is not the last page, the process proceeds to the next page at a step S2312, and it is again determined at the step S2302 whether or nor the present page is colored. If the page is not colored, the process proceeds to the step S2308 via the step S2304. Since the result of the determination at the step S2308 is negative (No) in the present loop, the process proceeds to a step S2310 to add the page to the black-and-white job Jb created at the step S2309. Then, the process proceeds to the step S2311.

In this manner, the above described process is executed on all the pages, and when the result of the determination at the step S2311 becomes affirmative (Yes), the process returns to the main routine in FIG. 29.

Once the process has thus been completed up to the last page, two RIP-expanded output jobs have been created from the color job Jc and the black-and-white job Jb.

That is, different output devices (for example, the color MFP 104 and the black-and-white MFP 105) may have different resolutions, and a single RIP may not be able to provide sufficient outputs for these plurality of different output devices.

In the present embodiment, as described above, the color RIP is first executed with a low resolution (for example, 400 dpi) corresponding to that of one of output device candidates for cluster printing, for example, the color MFP 104, and then the determination as to whether each page is colored or black and white is carried out on the pages thus subjected to the color RIP with the low resolution. If the present page after the color RIP with the low resolution is black and white, the black-and-white process is executed on the page with a high resolution (for example, 600 dpi) corresponding to that of the black-and-white MFP 105. Thus, complicated RIPs with different resolutions can be processed at high speed substantially simultaneously.

Attribute information (including information for determining whether the image forming apparatus is for colors or black and white, and information indicative of the resolution of the apparatus) on the plurality of output devices controlled by the document server 102 may be stored and managed in the memory of the document server 102 separately for each output device, and the stored attribute information may be used to process images based on printing attributes of the output device to which printing data are to be transmitted as described above. The following method is also possible. Once it has been determined to which output device the printing data are to be distributed, a request for the attribute information is given to this device via the network; and the attribute information data are received from the device in response to the request, to thereby perform the above described image process.

Figure 31:
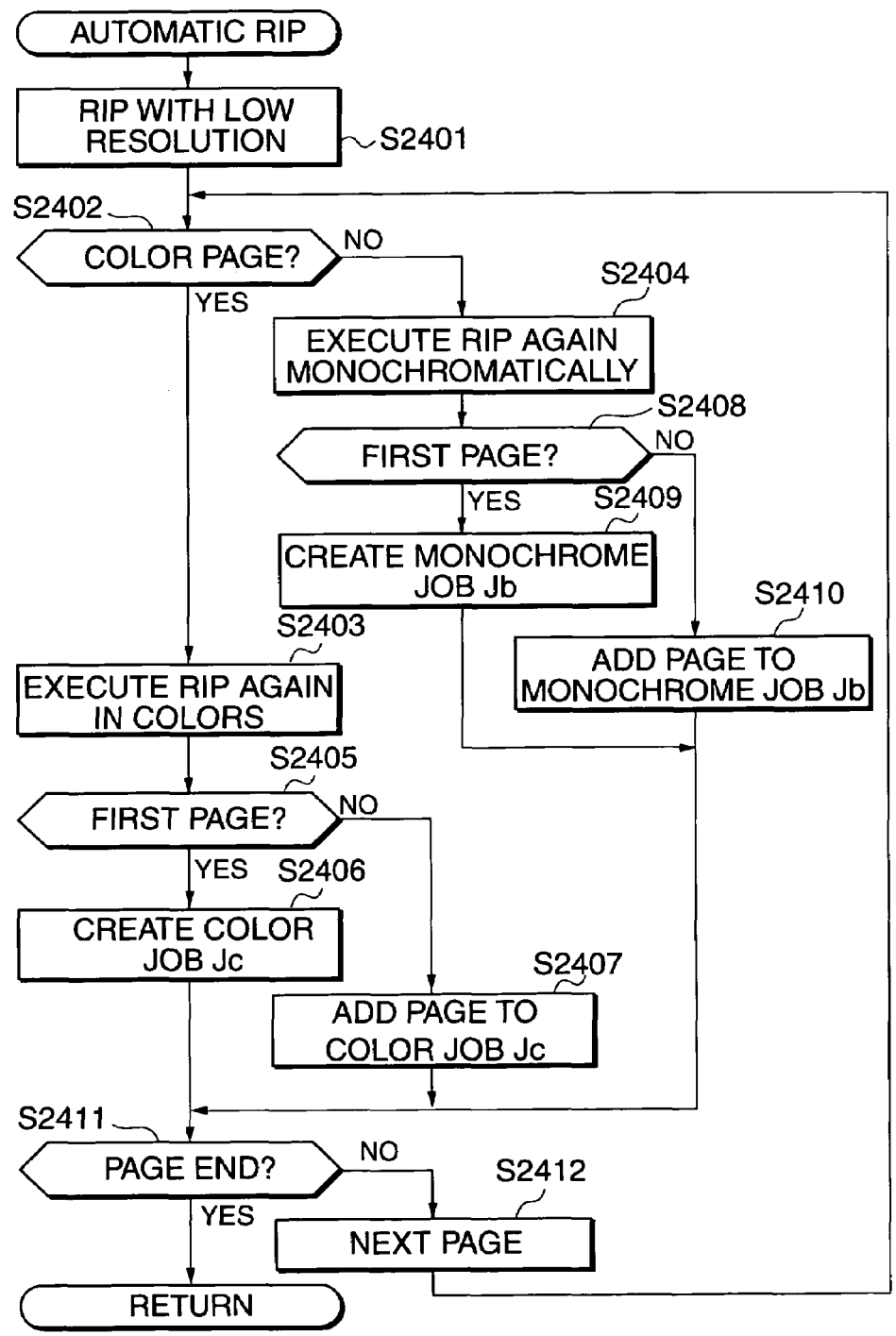
FIG. 31 is a flow chart showing a second embodiment of the automatic RIP routine.

FIG. 31 is a flow chart showing a second embodiment of the automatic RIP routine. In the second embodiment, the RIP is first carried out with a low resolution, and the data subjected to the RIP with the low resolution are used to determine whether the present page is colored or black and white. Subsequently, the color page is subjected to the color RIP with a resolution suitable for the color MFP 104, which is the destination, and the black-and-white page is subjected to the black-and-white RIP with a resolution suitable for the black-and-white MFP 105, which is the destination.

That is, at a step S2401, the RIP is executed on the printing job with a low resolution, for example, 72 dpi, and at a step S2402, it is determined whether or not each of the present pages is colored. If the page is a color page, the color RIP is executed with a resolution of 400 dpi, which is suitable for the color MFP 104, the destination (step S2403). Then, as in the first embodiment, if the present page is the first page, a new color job Jc is created (step S2405 to step S2406), and if the present page is not the first page, the page is added to the color job Jc created at the step S2406 (step S2405 to step S2407). On the other hand, if the present page is black and white at the step S2402, the process proceeds to a step S2404, where the black-and-white RIP is executed with a resolution of 600 dpi, which is suitable for the black-and-white MFP 105, the destination. If the present page is the first page, a new white-and-black job Jb is created (step S2405 to step S2406), and if the present page is not the first page, the page is added to the color job Jb (step S2408 to step S2410). The above described process is repeated up to the last page, and when the result of the determination at the step S2411 becomes affirmative (Yes), the process returns to the main routine in FIG. 26.

Once the process has thus been completed up to the last page, two RIP-expanded output jobs have been created from the color job Jc and the black-and-white job Jb.

That is, when a tool such as the job merge tool in FIG. 25 that can display a thumb nail image is available, an image that has been subjected to the RIP with a low resolution (for example, 72 dpi) is often used to create a thumb nail image. Therefore, in the second embodiment, the thumb nail display can be realized by first executing the RIP on all the pages and then determining whether the pages are colored or black and white, based on the result of the RIP. Further, by carrying out the color/black-and-white determination using an image that has been subjected to the RIP with a low resolution of, for example, 72 dpi, the amount of time required for this color/black-and-white determination can be reduced compared to a similar determination using an image that has been subjected to the RIP with a resolution of, for example, 400 dpi, as in the first embodiment.

Figure 32:
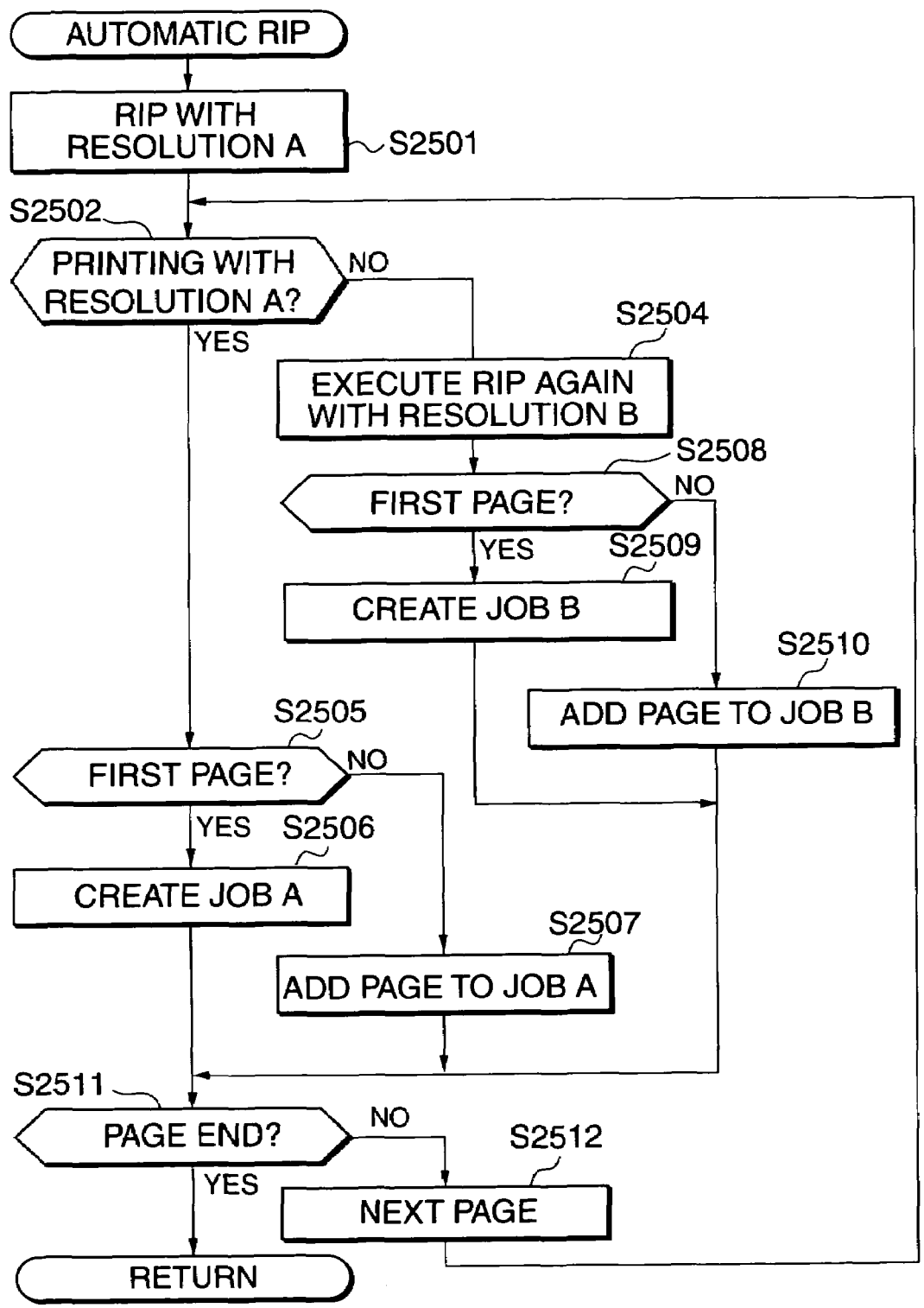
FIG. 32 is a flow chart showing a third embodiment of the automatic RIP routine.

FIG. 32 is a flow chart showing a third embodiment of the automatic RIP routine. In the third embodiment, two types of resolutions are used to carry out the RIP and the monochrome MFP 105a and 105b are used for cluster printing. In this regard, the monochrome MFP 105a is assumed to have a resolution A (for example, 200 dpi), and the monochrome MFP 105b is assumed to have a resolution B (for example, 300 dpi).

That is, a printing job consisting only of black-and-white data or color data is sometimes desired to be output from different output devices, but even with the same printing attribute (color/black and white) of the image data, these output devices may have different resolutions. In such a case, if the RIP is carried out with the same resolution, it will be difficult to obtain desired printing results from all the output devices.

Thus, in the third embodiment, two types of resolutions are used for the RIP.

At a step S2501, the black-and-white RIP is executed with a resolution A (for example, 200 dpi). It is determined whether or not the page is to be printed with the resolution A (step S2502), and if the result of the determination is affirmative (Yes), it is then determined whether or not the present page is the first page (step S2505). If the result of the determination at the step S2505 is affirmative (Yes), a job A is created (step S2506), and if it is further determined at a step S2511 that the page is not the last page, the process proceeds to the next page at a step S2512 to again determine whether or not the present page is to be printed with the resolution A. If it is determined that the present page is to be printed with the resolution A, the result of the determination at the step S2505 will be negative (No) in the present loop, so that the process proceeds to a step S2507 to add the page to the job A created at the step S2506. The process then proceeds to the step S2511.

On the other hand, if the result of the determination at the step S2502 is negative (No), that is, it is determined at this step that the present page is not to be printed with the resolution A, the black-and-white RIP is again executed on the page with a resolution B (for example, 300 dpi) which is different from the resolution A (step S2508). It is determined whether or not the present page is the first page (step S2508), and if the present page is the first page, a new job B is created (step S2509). If it is further determined at the step S2511 that the present page is not the last page, the process proceeds to the next page at the step S2512 to again determine whether or not the present page is to be printed with the resolution A. If it is determined that the present page is not to be printed with the resolution A, the page is again subjected to the RIP with the resolution B (step S2504). Then, the result of the determination at the step S2508 is negative (No) in the present loop, so that the process proceeds to the step S2510 to add the page to the job B created at the step S2509. The process then proceeds to the step S2511.

Thus, output jobs that have been subjected to the RIP with the resolutions A and B are transferred to the monochrome MFPs 105a and 105b, respectively, so that desired printing data are output from the monochrome MFPs 105a and 105b.

In this manner, when printing data from a source of image data such as the client 103 are distributed to a plurality of output devices from the document server 102 in order to cause the output devices to print the distributed printing data, the document server 102 executes different image processes for the respective output devices, to which the data are to be distributed, in separate manners depending on the printing attributes (resolution, and others) of these respective output devices, and distributes the image-processed data that have been separately processed to the respective output devices.

Figure 33:
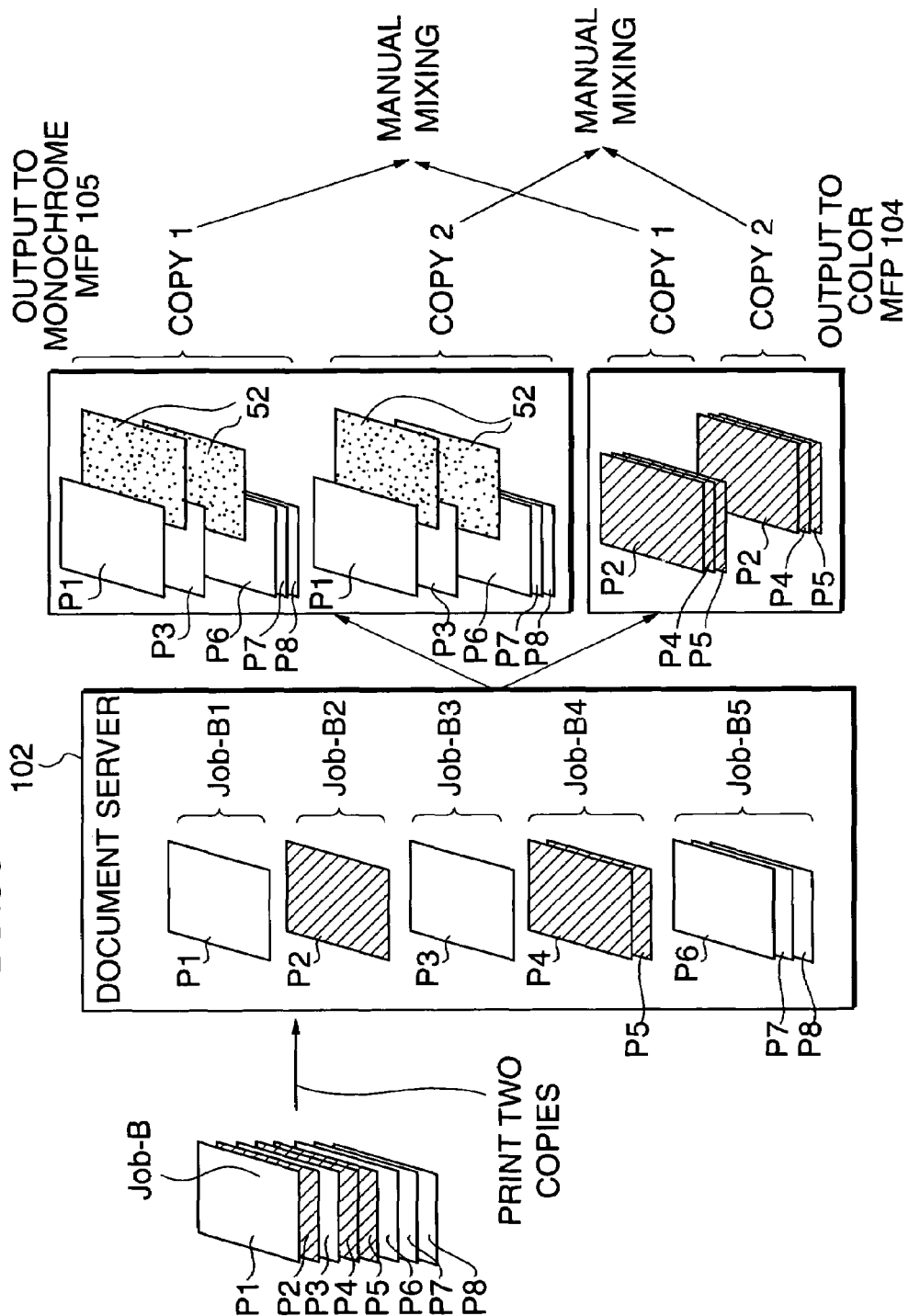
FIG. 33 is a schematic view showing how a separating paper inserting process is carried out.

FIG. 33 is a schematic view showing how the delimiter paper inserting process is carried out at the step S3211 (FIG. 26). A printing job with color data and black-and-white data mixed therein is divided into the color data and the black-and-white data, and the color data are output from the color MFP 104, whereas continuous data of the black-and-white data are put together into a set of continuous black-and-white data, the delimiter paper is inserted at the leading edge or the trailing edge of the set of continuous black-and-white data, and the set of continuous black-and-white data with the delimiter paper inserted are output from the monochrome MFP 105.

That is, when two copies of a printing job Job-B with color data and black-and-white data mixed therein are to be printed, the document server 102 first splits the printing job Job-B into black-and-white jobs Job-B1, Job-B3, and Job-B5 and color jobs Job-B2 and Job-B4. In the present embodiment, the first, third, sixth, seventh, and eighth pages are black and white, while the second, fourth, and fifth pages are colored. Of the black-and-white pages, the first page constitutes the job Job-B1, the third page constitutes the job Job-B3, and the sixth to eighth pages constitute the job Job-B5, and of the color pages, the second page constitutes the job Job-B2 and the fourth and fifth pages constitute the job Job-B4.

On the other hand, as previously described (FIG. 12), the monochrome MFP 105 has a plurality of feeding cassettes (for example, the first feeding cassette 1034 and the second feeding cassette 1035), and the first feeding cassette 1034 has white recording paper housed therein, while the second feeding cassette 1035 has colored recording paper, which is, for example, yellow, housed therein.

Then, in response to a command from the document server 102, for the black-and-white jobs Job-B1, Job-B3, and Job-B5, the monochrome MFP 105 forms image data on the white recording paper fed from the first feeding cassette 1034 to output the same, while for the color jobs Job-B2 and Job-B4, it feeds, at corresponding portions of the entire job, a single sheet of the yellow recording paper from the second feeding cassette 1035 as the delimiter paper (the job Job-B4 includes two continuous color pages P4 and P5, but in this insertion mode, the monochrome MFP 105 is operated to insert, also at a portion corresponding to the job Job-B4, a single sheet of the yellow recording paper from the second feeding cassette 1035, like a portion corresponding to the job Job-B2. As a result, the color MFP 104 outputs the color jobs Job-B2 and Job-B4, whereas the monochrome MFP 105 outputs the black-and-white jobs Job-B1, Job-B3, and Job-B5 with the delimiter paper 51 inserted therebetween. Printing data for two copies are output from each of the monochrome MFP 105 and the color MFP 104, and a copy 1 from the monochrome MFP 105 and a copy 1 from the color MFP 104 are manually mixed together, while a copy 2 from the monochrome MFP 105 and a copy 2 from the color MFP 104 are manually mixed together, to thereby obtain two copies of the printing data.

Figure 34:
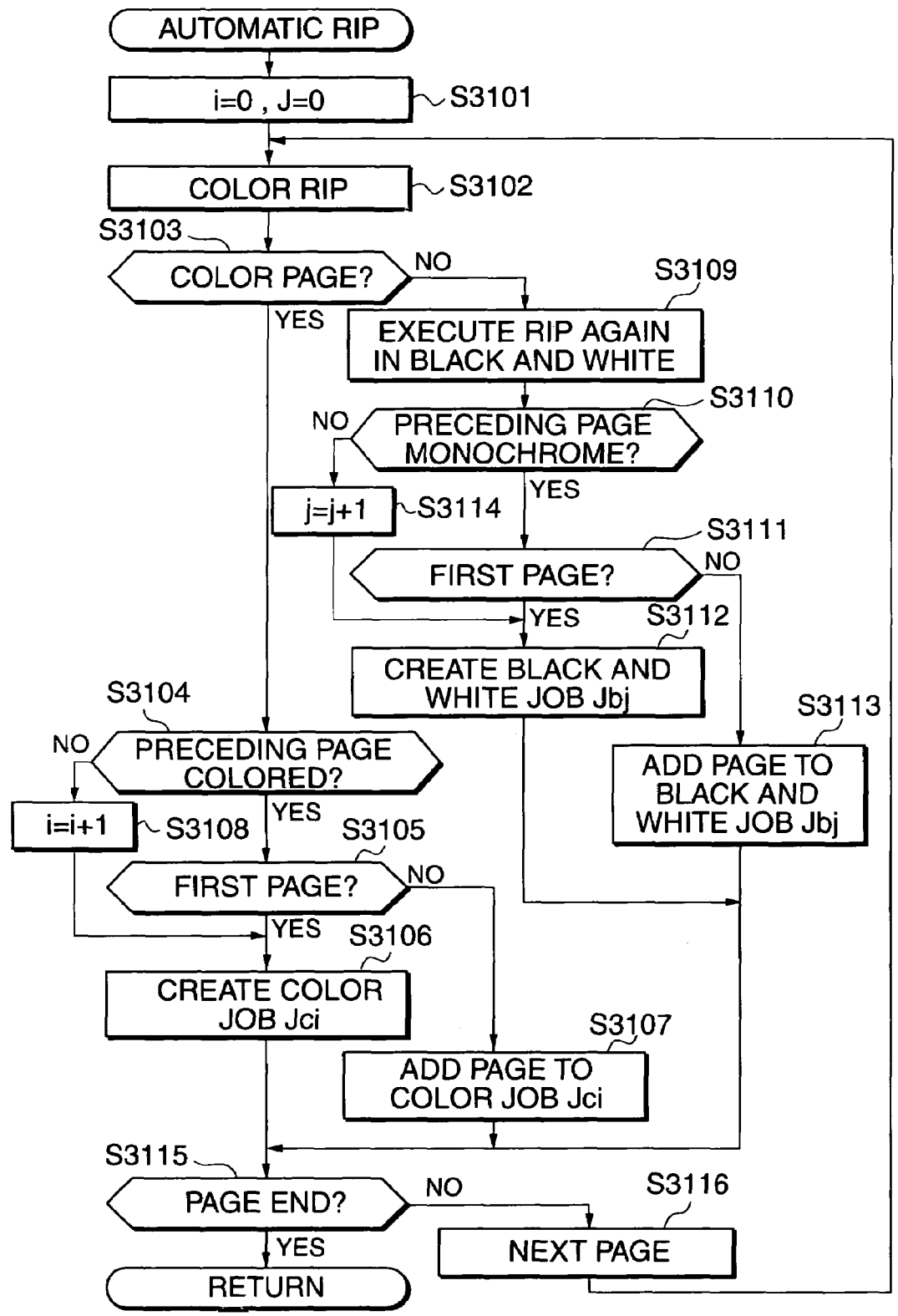
FIG. 34 is a flow chart showing a procedure of the separating paper inserting process.

FIG. 34 is a flow chart showing a procedure of the separating paper inserting process.

At a step S3101, a color page updating parameter i and a black-and-white updating parameter j are each initialized by setting these parameters to "0". Then, at a step S3102, the color RIP is executed on all the pages with a resolution of 400 dpi. It is determined at a step S3103 whether or not the present page is colored, and if the present page is colored, it is then determined whether or not the preceding page is colored (step S3104). Since the result of the determination at the step S3104 is affirmative (Yes) in the first loop, the process proceeds to a step S3105 to determine whether or not the present page is the first page (step S3105). Since the result of the determination at the step S3105 is affirmative (Yes) in the first loop, the process proceeds to a step S3106 to create a color job Jci. If it is determined at a step S3114 that the present page is not the last page, the process proceeds to the next page at a step S3115 to execute the RIP thereon (step S3102). If the present page is colored, it is determined whether or not the preceding page is colored (step S3104). Since the present page is not the first page in the first loop, the result of the determination at the step S3105 is negative (No), and the process proceeds to a step S3107 to add the page to the color job Jci created at the step S3106. The process then proceeds to the step S3114.

On the other hand, if the result of the determination at the step S3104 is negative (No), that is, if execution of a subsequent loop leads to a determination result that the preceding page is black and white, the color page updating parameter i is incremented by "1" (step S3108) and a new color job Jci is created. The process then proceeds to the step S3114. On the other hand, if the result of the determination at the step S3103 is negative (No), that is, if the present page is black and white, the black-and-white RIP is executed on the page with a resolution of, for example, 600 dpi, and it is then determined whether or not the preceding page is black and white (step S3110). Since the result of the determination at the step S3110 is affirmative (Yes) in the first loop, the process proceeds to a step S3111 to determine whether or not the present page is the first page. Since the result of the determination at the step S3111 is affirmative (Yes) in the first loop, the process proceeds to a step S3112 to create a new color job Jbi and then proceeds to the step S3114. Further, since the result of the determination at the step S3111 is negative (No) in a subsequent loop, the process proceeds to a step S3113 to add the page to the color job Jbi created at the step S3112. The process then proceeds to the step S3114.

On the other hand, if the result of the determination at the step S3110 is negative (No), that is, if the preceding page is colored, the process proceeds to the step 3114 to increment the black-and-white page updating parameter j is incremented by "1". The process then proceeds to the step S3112 to create a new color job Jci and then proceeds to the step S3114.

The above described process is thus carried out on all the pages of the printing job to cause the monochrome MFP 104 and the color MFP 105 to substantially simultaneously output a desired number of copies of the printing job using a set of continuous black-and-white image pages and color image pages as a job unit.

To mix together output jobs from the color MFP 104 and from the black-and-white MFP 105, the user, for example, takes out these output jobs from the discharge tray 1101, 1102, or 1108 (FIG. 13) of the MFPs 104 and 105, detects those positions between the output jobs taken out from the black-and-white MFP 105 where the yellow recording paper is inserted, removes the yellow recording paper from the output jobs, and instead inserts the output jobs from the color MFP 104 into these positions. The user carries out this replacing process (removing the yellow recording paper and inserting the sheets output from the color MFP into the corresponding positions) for each position where the yellow recording paper is inserted (that is, the operation is repeated until all the sheets of yellow recording paper are removed from the output jobs), thereby completing the operation of mixing together the output jobs from the color MFP 104 and from the black-and-white MFP 105.

Thus, in mixing together the output jobs from the color MFP 104 and from the black-and-white MFP 105, it can be easily determined where the color image pages output from the color MFP 104 are to be inserted between the black-and-white image pages output from the black-and-white MFP 105.

Although the present embodiment uses a configuration that the delimiter paper is inserted between the jobs output from the black-and-white MFP 105, alternatively, it may use a configuration that the delimiter paper is inserted between the jobs output from the color MFP 104, and subsequently the delimiter paper is replaced by the black-and-white image pages output from the black-and-white MFP 105, whereby the output jobs from the color MFP 104 and from the black-and-white MFP 105 are mixed together. In either case, the configuration has only to cause at least one of the MFPs to output the delimiter paper.

Figure 35:
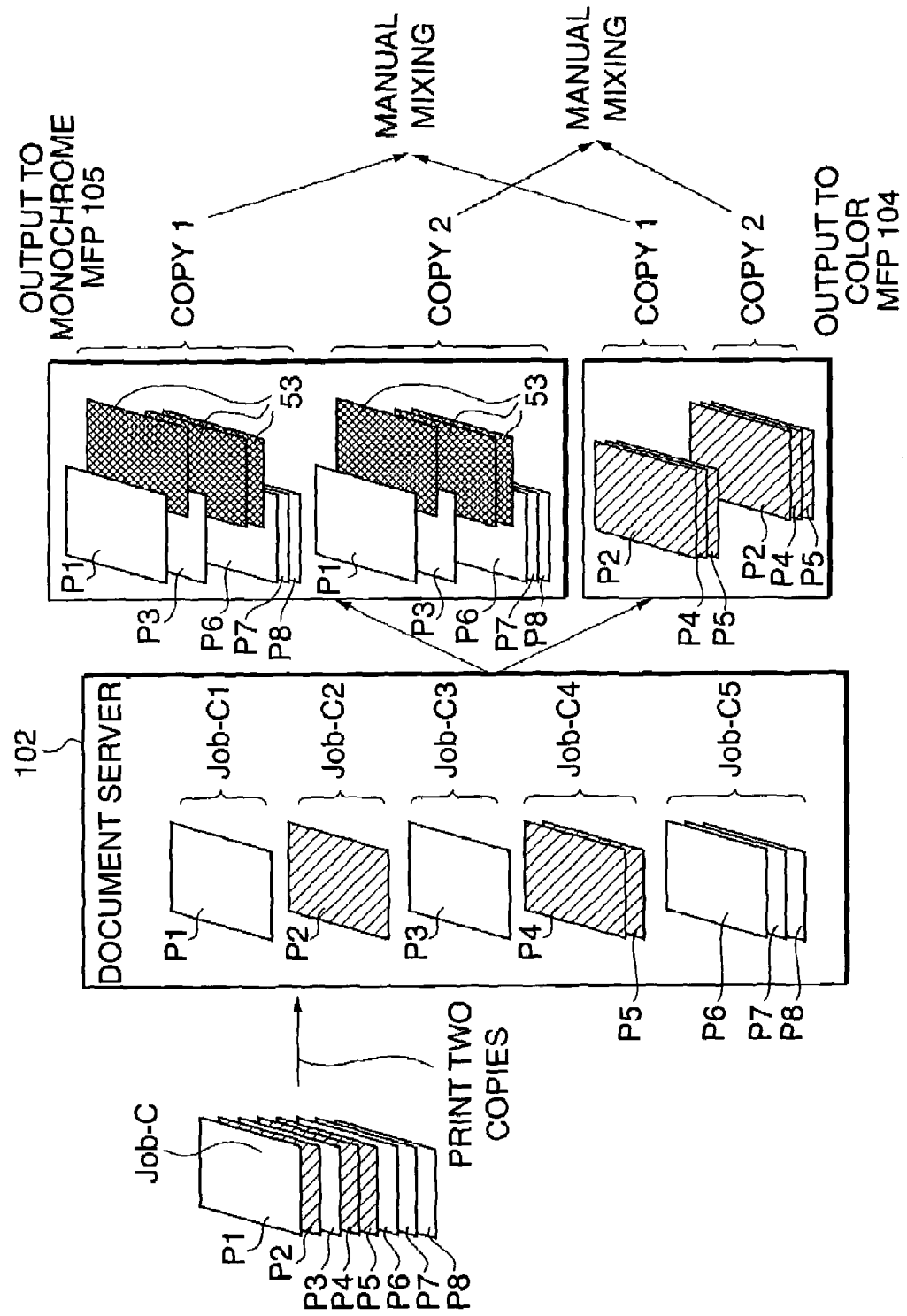
FIG. 35 is a schematic view showing the concept of a color page inserting process.
Figure 36:
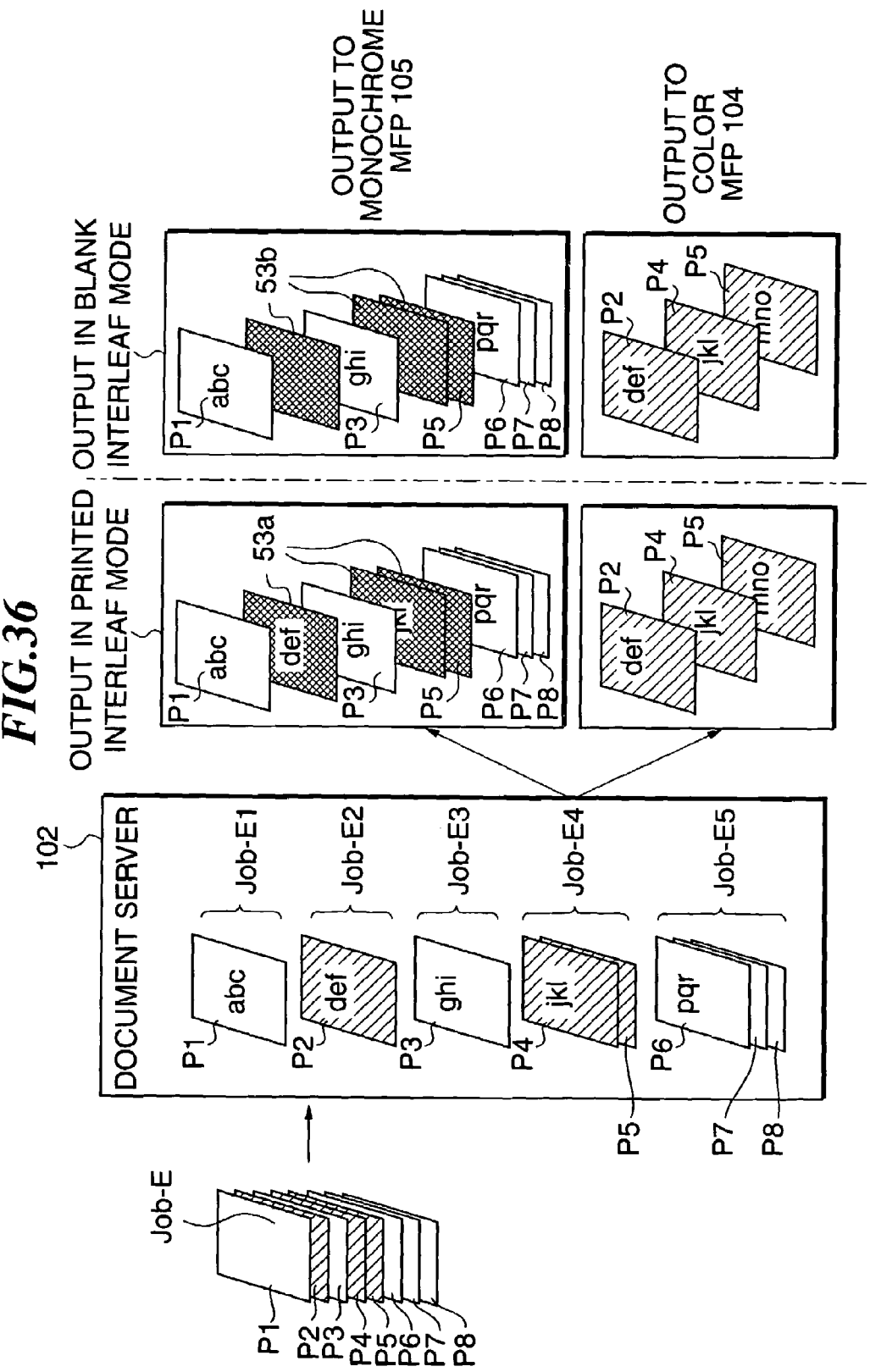
FIG. 36 is a schematic view showing how the color page inserting process is carried out in an image forming processing mode and in a non-image forming processing mode.

FIG. 35 is a view showing the concept of a process which is executed if the color page-corresponding paper inserting mode is set at the step S3206 (FIG. 26). A printing job with color data and black-and-white data mixed therein is split into the color data and the black-and-white data, so that the color data are printed and output by the color MFP 104, while as many sheets of recording paper 53 as the color pages are output from the monochrome output device 105.

That is, when two copies of a printing job Job-C with color data and black-and-white data mixed therein are to be printed, the document server 102 first splits the printing job Job-C into black-and-white jobs Job-C1, Job-C3, and Job-C5 and color jobs Job-C2 and Job-C4. In the present embodiment, of the black-and-white pages, the first page constitutes the job Job-C1, the third page constitutes the job Job-C3, and the sixth to eighth pages constitute the job Job-C5, and of the color pages, the second page constitutes the job Job-C2 and the fourth and fifth pages constitute the job Job-C4, as in the delimiter paper inserting process (FIG. 32).

On the other hand, the first feeding cassette 1034 of the monochrome MFP 105 (FIG. 12) has white recording paper housed therein, while the second feeding cassette 1035 has colored recording paper, which is, for example, yellow, housed therein.

Then, for the black-and-white jobs Job-C1, Job-C3, and Job-C5, the monochrome MFP 105 forms image data on the white recording paper fed from the first feeding cassette 1034 to output the same, while for the color jobs Job-C2 and Job-C4, the monochrome MFP 105 feeds a bundle 53 of as many sheets of the recording paper as continuous color pages from the second feeding cassette 1035. As a result, the color MFP 104 outputs the color jobs Job-C2 and Job-C4, whereas the monochrome MFP 105 discharges the black-and-white jobs Job-C1, Job-C3, and Job-C5 with the bundle of as many sheets of the recording paper as the color pages inserted therebetween, into the discharge tray 1102, 1102, or 1108, respectively (that is, in this insertion mode, as is distinct from the insertion mode described above with reference to FIG. 33, the monochrome MFP 105 is operated in such a manner that a single sheet from the second feeding cassette 1035 is inserted into the bundle at a position corresponding to the job Job-C2 containing one color page, and two sheets from the second feeding cassette 1035 are inserted at a position corresponding to the job Job-C4 containing two continuous color pages). Printing data for two copies are output from each of the monochrome MFP 105 and the color MFP 104, and a copy 1 from the monochrome MFP 105 and a copy 1 from the color MFP 104 are manually mixed together, while a copy 2 from the monochrome MFP 105 and a copy 2 from the color MFP 104 are manually mixed together, to thereby obtain two copies of the printing data.

Moreover, the color page-corresponding paper inserting mode is configured to allow the user to determine whether or not images are to be formed on the bundle 53 of sheets of the recording paper. In the image forming processing mode, the step S3208 is executed, and in the non-image forming processing mode, the step S3209 is executed.

FIG. 36 is a schematic view showing how the image forming process or the non-image forming process is carried out.

When two copies of a printing job Job-E with color data and black-and-white data mixed therein are to be printed, the document server 102 first splits the printing job Job-E into black-and-white jobs Job-E1, Job-E3, and Job-E5 and color jobs Job-E2 and Job-E4. In the present embodiment, of the black-and-white pages, the first page constitutes the job Job-E1, the third page constitutes the job Job-E3, and the sixth to eighth pages constitute the job Job-E5, and of the color pages, the second page constitutes the job Job-E2 and the fourth and fifth pages constitute the job Job-E4, similarly to the delimiter paper inserting process (FIG. 33).

On the other hand, the first feeding cassette 1034 of the monochrome MFP 105 (FIG. 12) has white recording paper housed therein, while the second feeding cassette 1035 has colored recording paper, which is, for example, yellow, housed therein.

Then, if the image forming processing mode (Printed Interleaf mode) is selected, the black-and-white RIP is executed on portions of the printing job JOB-E corresponding to the color jobs Job-E2 and Job-E4 to form images on a bundle 53a of sheets of recording paper fed from the second feeding cassette 1035, and the bundle 53a is discharged into the discharge tray 1101, 1102, or 1108 (that is, the monochrome MFP 105 is operated in such a manner that image data for the second page P2 are printed on a sheet from the second feeding cassette 1035 as a black-and-white image, and the printed sheet is then inserted into the bundle at a position corresponding to the job Job-E2. Then, two sheets are fed from the second feeding cassette 1035, and image data for the fourth page P4 are printed on one of the sheets as a black-and-white image, while image data for the fifth page P5 are printed on the other sheet as a black-and-white image. The two black-and-white-image printed sheets are inserted into the bundle at a position corresponding to the job Job-E4).

On the other hand, if the non-image forming processing mode (Blanked Interleaf mode) is selected, the black-and-white RIP is not executed on positions corresponding to the color jobs Job-E2 and Job-E4 to thereby form no images on a bundle 53*b* of sheets of recording paper fed from the second feeding cassette 1035, so that blank sheets are output onto the discharge tray 1101, 1102, or 1108 (that is, the monochrome MFP 105 is operated so that one sheet of colored paper is inserted into the bundle at a position corresponding to the job Job-E2, while two sheets of colored paper are inserted into the bundle at a position corresponding to the job Job-E4, without executing the image forming process in either case).

Thus, in the color page-corresponding paper inserting mode, in the non-image forming process, for color pages, only colored paper is output from the monochrome MFP 104 without forming any image data, whereas in the image forming process, color pages are output from the monochrome MFP 104 as black-and-white data.

That is, when sheets corresponding to color pages are printed and output, errors can be reduced in manually mixing the color-pages and the black-and-white pages together, but the bundle 53 of sheets of recording paper may be counted and billed as print pages though they are finally discarded. Besides, toner and recording paper are wastefully used.

Therefore, according to the present embodiment, it is made possible to determine whether the image forming processing mode (Printed or Blanked Interleaf mode) or the non-image forming processing mode (Blanked Interleaf mode) is to be executed on pages corresponding to color data that are to be interleaved.

If no image is to be formed on pages corresponding to color data that are to be interleaved, the bundle 53*b* of sheets of recording paper have no image formed thereon and can thus be reused. For example, once the output from each MFP has been completed and the mixing of the color pages and black-and-white pages has been completed, the delimiter paper 56 used by the monochrome MFP 105 are no longer useful. Therefore, by again storing the delimiter paper in the second cassette 1035 of the monochrome MFP 105 after the color pages and black-and-white pages have been mixed together, the delimiter paper can be reused to save resources and unwanted billing can be avoided to reduce printing costs.

The present invention is not limited to the above described embodiments. Although the color pages and black-and-white pages may be manually mixed together as described above, the pages may be automatically mixed together by providing an offline collator (a device for setting a plural groups of recording paper in the discharge tray and collating these groups as one output bundle) with a function of identifying the color of recording paper such that if the recording paper is identified as colored, the color pages, for example, yellow pages in the group of recording paper output from the monochrome MFP 105, are replaced with recording paper output from the color MFP 104. Alternatively, the separating paper may be output from both the MFPs (the black-and-white MFP 105 and the color MFP 104) so that output jobs from the MFPs with the delimiter paper inserted therein can be set in a collator such as one described above for automatic mixing.

As described above, according to the present embodiment, a plurality of image processing sections (RIP sections 1203*a*, 1203*b*, ...) are provided to perform image processing in a manner corresponding to printing attributes (for example, color pages are subjected to the color RIP with a resolution suitable for the resolution of the color MFP 104, as the destination device, whereas black-and-white pages are subjected to the black-and-white RIP with a resolution suitable for the resolution of the black-and-white MFP 105, as the destination device). As a result, for example, color pages in the printing job can be output from a color image processing apparatus, while black-and-white pages can be output from an image forming apparatus dedicated to monochrome image formation, thereby making it possible to reduce printing costs and hence enable a large amount of printing jobs to be inexpensively processed.

Further, even if image forming apparatuses with different resolutions are used for simultaneous outputs, desired printing data can be output from each of the image forming apparatuses by virtue of image processing depending on the resolution of the apparatus using image processing means.

Furthermore, by inserting the delimiter paper between image data with different printing attributes, printing portions of the data to be mixed together can be easily identified to thereby avoid the operation from being complicated even in the case of the manual mixing, thereby allowing the user to work more efficiently.

Still further, by issuing a command which instructs supplying to at least one of first and second image forming apparatuses a predetermined number of sheets of recording paper corresponding to a group of image data output to the other image forming apparatus at a portion or portions of the group of image data where printing attributes of the group of image data are to be switched, portions of the image data where the sheets of recording paper and the image data are to be replaced with each other can be easily visually identified.

Moreover, the user can determine whether or not the image data output to the other image forming apparatus are to be formed on the predetermined number of sheets of recording paper. A system can therefore be provided, which can be easily operated depending on an application or object of the present invention.

It is to be understood that the present invention may also be realized by supplying a system or an apparatus with a storage medium which stores the program code of software that realizes the functions of above described embodiments (the functions shown in FIGS. 26, 29, 30, 31, 32, and 34 and the functions for executing various printing processes, sheet inserting processes, and other processes performed by the printer as described with reference to FIGS. 27, 28, 33, 35, and 36), and causing a computer (or CPU, MPU) of the system or apparatus to read out and execute the program code stored in the storage medium.

In this case, the program code itself read out from the storage medium realizes the above described functions of the present invention, so that the storage medium storing the program code also constitutes the present invention.

The storage medium for supplying the program code may be selected, for example, from a floppy disk, hard disk, optical disk, magneto-optical disk, CD-ROM, CD-R, magnetic tape, non-volatile memory card, ROM, EEPROM, and silicon disk.

It is to be understood that the functions of the above described embodiments can be realized not only by executing a program code read out by a computer, but also by causing an operating system (OS) that operates on the computer to perform a part or the whole of the actual operations according to instructions of the program code.

Furthermore, the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiments.

Moreover, the present invention is applicable to a system comprised of a plurality of apparatuses or a single apparatus. It goes without saying that the present invention is applicable to a case where a program is supplied to the system or apparatus. In this case, the system or the apparatus can enjoy the effects of the present invention by reading a program from a storage medium which program is expressed by software for attaining the present invention.

Further, the system or the apparatus can enjoy the effects of the present invention by downloading a program which is expressed by software for attaining the present invention, from a database on a network by means of a communication program.

What is claimed is:

1. An image processing apparatus which selects at least one image forming apparatus from a plurality of image forming apparatuses including at least two types of image forming apparatuses having different printing attributes, said at least one image forming apparatus having predetermined printing attributes, and outputs image data to the selected at least one image forming apparatus, the image processing apparatus comprising:

input means for inputting a group of image data;

distributing means for distributing the input group of image data depending on printing attributes of the group of image data;

a plurality of image processing means for executing image processes corresponding respectively to printing attributes of the distributed image data, on the group of image data;

selecting means for selecting at least two image forming apparatuses from said plurality of image forming apparatuses, which have printing attributes compatible with results of the image processes executed by said image processing means; and output means for outputting the image data on which said image processes have been executed, to the selected at least two image forming apparatuses, wherein said printing attributes comprise at least a first printing attribute, and a second printing attribute, and said image processing means comprises first and second image processing means for executing image processes depending on said first printing attribute and said second printing attribute, respectively, wherein said image processing apparatus further comprises judging means for judging whether or not each of the image data of said group belongs to said first printing attribute after said first image processing means have executed the image process on all the image data of said group, and image process re-executing means for determining that each of the image data belongs to said second printing attribute and causing said second image processing means to again execute the image process on the each of the image data when a result of the judgment by said judging means is negative, and wherein said output mean outputs the image data on which said image processes have been executed by said first image processing means and said second image processing means, to said selected at least two image forming apparatuses, respectively.

2. An image processing apparatus which selects at least one image forming apparatus from a plurality of image forming apparatuses including at least two types of image forming apparatuses having different printing attributes, said at least one image forming apparatus having predetermined printing attributes, and outputs image data to the selected at least one image forming apparatus, the image processing apparatus comprising:

input means for inputting a group of image data;

distributing means for distributing the input group of image data depending on printing attributes of the group of image data;

a plurality of image processing means for executing image processes corresponding respective to printing attributes of the distributed image data, the group of image data;

selecting means for selecting at least two image forming apparatuses from said plurality of image forming apparatuses, which have printing attributes compatible with results of the image processes executed by said image processing means; and output means for outputting the image data on which said image processes have been executed to the selected at least two image forming apparatuses, wherein said printing attributes comprise at least a first printing attribute, and a second printing attribute, and said image processing means comprises first image processing means, and second and third image processing means for executing image processes depending on said first printing attribute and said second printing attribute, respectively, wherein said image processing apparatus further comprises judging means for judging whether or not each of the image data of said group belongs to said first printing attribute after said first image processing means have executed the image process on all the image data of said group, first image process re-executing means for determining that each of the image data belongs to said first printing attribute and causing said second image processing means to again execute the image process on the each of the image data when a result of the judgment by said judging means is affirmative, and second image process re-executing means for determining that each of the image data belongs to said second printing attribute and causing said third image processing means to again execute the image process on the each of the image data when a result of the judgment by said judging means is negative, and wherein said output means outputs the image data on which said image processes have been executed by said second image processing means and said third image processing means, to said selected at least two image forming apparatuses, respectively.

3. An image processing apparatus according to claim 2, wherein said first image processing means has a lower resolution than resolutions of said second and third image processing means.

4. An image processing apparatus according to claim 1, wherein said image processing means comprises first image processing means for executing an image process corresponding to a first resolution, and second image processing means for executing an image process corresponding to a second resolution, and wherein said output means outputs the image data on which said image processes have been executed by said first image processing means and said second image processing means, respectively, to said selected at least two image forming apparatuses which have printing attributes compatible to a result of the execution of the image process corresponding to said first resolution and a result of the execution of the image process corresponding to said second resolution, respectively.

5. An image processing apparatus according to claim 1, comprising managing means for managing said group of image data for each page, and wherein said distributing means distributes said group of image data for each page.

6. An image processing apparatus according to claim 5, comprising conversion means for converting said group of image data into a format that enables said group of image data to be managed for each page.

7. An image processing apparatus according to claim 1, wherein said printing attributes include at least color printing, and black-and-white printing.

8. An image processing system comprising an information processing apparatus directly operated by a user, a plurality of image forming apparatuses including at least two types of image forming apparatuses having different printing attributes, and an image processing apparatus for controlling said plurality of image forming apparatuses in response to a request from said information processing apparatus, said information processing apparatus, said plurality of image forming apparatuses, and said image processing apparatus being connected to each other, said image processing apparatus selecting at least one image forming apparatus from said plurality of image forming apparatuses, and outputting image data to the selected at least one image forming apparatus, wherein said image processing apparatus comprises input means for inputting a group of image data, distributing means for distributing the input group of image data depending on printing attributes of the group of image data, a plurality of image processing means for executing image processes corresponding respectively to printing attributes of the distributed image data, on the group of image data, selecting means for selecting at least two image forming apparatuses from said plurality of image forming apparatuses, which have printing attributes compatible with results of the execution of the image processes executed by said image processing means, and output means for outputting the image data on which said image processes have been executed, to the selected at least two image forming apparatuses, wherein said printing attributes comprise at least a first printing attribute, and a second printing attribute, and said image processing means comprises first and second image processing means for executing image processes depending said first printing attribute and said second printing attribute, respectively, wherein said image processing apparatus further comprises judging means for judging whether or not each of the image data of said group belongs to said first printing attribute after said first image processing means have executed the image process on all the image data of said group, and image process re-executing means for determining that each of the image data belongs to said second printing attribute and causing said second image processing means to again execute the image process on the each of the image data when a result of the judgment by said judging means is negative, and wherein said output means outputs the image data on which said image processes have been executed by said first image processing means and said second image processing means, to said selected at least two image forming apparatuses, respectively.

9. An image processing system comprising an information processing apparatus directly operated by a user, a plurality of image forming apparatuses including at least two types of image forming apparatuses having different printing attributes, and an image processing apparatus for controlling said plurality of image forming apparatuses in response to a request from said information processing apparatus, said information processing apparatus, said plurality of image forming apparatuses, and said image processing apparatus being connected to each other, said image processing apparatus selecting at least one image forming apparatus from said plurality of image forming apparatuses, and outputting image data to the selected at least one image forming apparatus, wherein said image processing apparatus comprises input means for inputting a group of image data, distributing means for distributing the input group of image data depending printing attributes of the group of image data, a plurality of image processing means for executing image processes corresponding respectively to printing attributes of the distributed image data, on the group of image data, selecting means for selecting at least two image forming apparatuses from said plurality of image forming apparatuses, which have printing attributes compatible with results of the execution of the image processes executed by said image processing means, and output means for outputting the image data on which said image processes have been executed, to the selected at least two image forming apparatuses, wherein said printing attributes comprise at least a first printing attribute, and a second printing attribute, and said image processing means comprises first image processing means, and second and third image processing means for executing image processes depending on said first printing attribute and said second printing attribute, respectively, wherein said image processing apparatus further comprises judging means for judging whether or not each of the image data of said group belongs to said first printing attribute after said first image processing means have executed the image process on all the image data of said group, first image process re-executing means for determining that each of the image data belongs to said first printing attribute and causing said second image processing means to again execute the image process on the each of the image data when a result of the judgment by said judging means is affirmative, and second image process re-executing means for determining that each of the image data belongs to said second printing attribute and causing said third image processing means to again execute the image process on the each of the image data when a result of the judgment by said judging means is negative, and wherein said output means outputs the image data on which said image processes have been executed by said second image processing means and said third image processing means, to said selected at least two image forming apparatuses, respectively.

10. An image processing system according to claim 9, wherein said, first image processing means has a lower resolution than resolutions of said second and third image processing means.

11. An image processing system according to claim 8, wherein said image processing means comprises first image processing means for executing an image process corresponding to a first resolution, and second image processing means for executing an image process corresponding to a second resolution, and wherein said output means outputs the image data on which said image processes have been executed by said first image processing means and said second image processing means, respectively, to said selected at least two image forming apparatuses which have printing attributes compatible to a result of the execution of the image process corresponding to said first resolution and a result of the execution of the image process corresponding to said second resolution, respectively.

12. An image processing system according to claim 8, comprising managing means for managing said group of image data for each page, and wherein said distributing means distributes said group of image data for each page.

13. An image processing system according to claim 12, comprising conversion means for converting said group of image data into a format that enables said group of image data to be managed for each page.

14. An image processing system according to claim 8, wherein said printing attributes include at least color printing, and black-and-white printing.

15. An image data processing method of processing image data using an image processing apparatus connected to a plurality of image forming apparatuses including at least two types of image forming apparatuses having different printing attributes, for controlling said plurality of image forming apparatuses, said image processing apparatus selecting at least one image forming apparatus having predetermined printing attributes from said plurality of image forming apparatuses, and outputting image data to the selected at least one image forming apparatus, the image data processing method comprising the steps of:

inputting a group of image data;

executing a distribution process of distributing the input group of image data depending on printing attributes of the group of image data;

executing a plurality of image processes corresponding respectively to printing attributes of the distributed image data, on the group of image data;

selecting at least two image forming apparatuses from said plurality of image forming apparatuses, which have printing attributes compatible with results of the execution of the image processes; and executing an output process of outputting the image data on which said image processes have been executed, to the selected at least two image forming apparatuses, wherein said printing attribute comprise at least a first printing attribute, and a second printing attribute, and said image processes comprise first and second image processes for executing image processes depending on said first printing attribute and said second printing attribute, respectively, wherein said image data processing method further comprises judging whether or not each of the image data of said group belongs to said first printing attribute after said first image process has been executed on all the image data of said group, determining that each of the image data belongs to said second printing attribute and again executing said second image process on the each of the image data when a result of the judgment by said judging step is negative, and wherein said output process comprises outputting the image data on which said first and second image processes have been executed, to said selected at least two image forming apparatuses, respectively.

16. An image data processing method processing image data using an image processing apparatus connected to a plurality of image forming apparatuses including at least two types of image forming apparatuses having different printing attributes, for controlling said plurality of image forming apparatuses, said image processing apparatus selecting at least one image forming apparatus having predetermined printing attributes from said plurality of image forming apparatuses, and outputting image data to the selected at least one image forming apparatus, the image data processing method comprising the steps of;

inputting a group of image data;

executing a distribution process of distributing the input group of image data depending on printing attributes of the group of image data;

executing a plurality of image processes corresponding respectively to printing attributes of the distributed image data, on the group of image data;

selecting at least two image forming apparatuses from said plurality of image forming apparatuses, which have printing attributes compatible with results of the execution of the image processes; and executing an output process of outputting the image data on which said image processes have been executed, to the selected at least two image forming apparatuses, wherein said printing attributes comprise at least a first printing attribute, and a second printing attribute, and said image processes comprise a first image process, and second and third image processes which are executed depending on said first printing attribute and said second printing attribute, respectively, wherein said image data processing method further comprises judging whether or not each of the image data of said group belongs to said first printing attribute after said first image process has been executed on all the image data of said group, determining that each of the image data belongs to said first printing attribute and again executing said second image process on the each of the image data when a result of the judgment by said judging step is affirmative, and determining that each of the image data belongs to said second printing attribute and again executing said third image process on the each of the image data, and wherein said output process comprises outputting the image data on which said second and third image processes have been executed, to said selected at least two image forming apparatuses, respectively.

17. An image data processing method according to claim 16, wherein said first image process has a lower resolution than resolutions of said second and third image processes.

18. An image data processing method according to claim 15, wherein said image processes comprise a first image process corresponding to a first resolution, and a second image process corresponding to a second resolution, and wherein said output process comprises outputting the image data on which said first and second image processes have been executed, respectively, to said selected at least two image forming apparatuses which have printing attributes compatible to a result of the execution of the first image process corresponding to said first resolution and a result of the execution of the second image process corresponding to said second resolution, respectively.

19. An image data processing method according to claim 15, comprising managing said group of image data for each page, and wherein said distributing process comprises distributing said group of image data for each page.

20. An image data processing method according to claim 19, comprising converting said group of image data into a format that enables said group of image data to be managed for each page.

21. An image data processing method according to claim 15, wherein said printing attributes include at least color printing, and black-and-white printing.

* * * * *